US007636573B2

(12) United States Patent
Walton et al.

(10) Patent No.: US 7,636,573 B2
(45) Date of Patent: Dec. 22, 2009

(54) MULTIPLE-ACCESS MULTIPLE-INPUT MULTIPLE-OUTPUT (MIMO) COMMUNICATION SYSTEM

(75) Inventors: Jay R. Walton, Westford, MA (US); Mark Wallace, Bedford, MA (US); Steven J. Howard, Ashland, MA (US)

(73) Assignee: Qualcomm Incorporated, San Diego, CA (US)

( * ) Notice: Subject to any disclaimer, the term of this patent is extended or adjusted under 35 U.S.C. 154(b) by 180 days.

(21) Appl. No.: 11/332,059

(22) Filed: Jan. 13, 2006

(65) Prior Publication Data

US 2006/0121946 A1 Jun. 8, 2006

Related U.S. Application Data

(63) Continuation of application No. 09/993,087, filed on Nov. 6, 2001, now abandoned.

(51) Int. Cl.
*H04W 72/00* (2009.01)
(52) U.S. Cl. .................. 455/454; 455/450; 455/455; 455/464; 370/328; 370/338
(58) Field of Classification Search .................. 455/509, 455/517, 452.1, 450, 952.2, 454, 455, 464; 370/335, 342, 329, 336, 337, 338, 328
See application file for complete search history.

(56) References Cited

U.S. PATENT DOCUMENTS

| | | | |
|---|---|---|---|
| 5,056,109 A | 10/1991 | Gilhousen et al. | |
| 5,265,119 A | 11/1993 | Gilhousen et al. | |
| 5,274,836 A | 12/1993 | Lux | |
| 5,274,841 A * | 12/1993 | Natarajan et al. | 370/337 |
| 5,799,005 A | 8/1998 | Soliman | |

(Continued)

FOREIGN PATENT DOCUMENTS

EP 0951091 A2 10/1999

(Continued)

OTHER PUBLICATIONS

International Search Report-PCT/US02/035364, Internatioanl Search Authority—European Patent Office—Feb. 21, 2003.

(Continued)

*Primary Examiner*—Nghi H Ly
(74) *Attorney, Agent, or Firm*—Dmitry R. Milikovsky; Howard Seo

(57) ABSTRACT

Techniques to achieve better utilization of the available resources and robust performance for the downlink and uplink in a multiple-access MIMO system. Techniques are provided to adaptively process data prior to transmission, based on channel state information, to more closely match the data transmission to the capacity of the channel. Various receiver processing techniques are provided to process a data transmission received via multiple antennas at a receiver unit. Adaptive reuse schemes and power back-off are also provided to operate the cells in the system in a manner to further increase the spectral efficiency of the system (e.g., reduce interference, improve coverage, and attain high throughput). Techniques are provided to efficiently schedule data transmission on the downlink and uplink. The scheduling schemes may be designed to optimize transmissions (e.g., maximize throughput) for single or multiple terminals in a manner to meet various constraints and requirements.

33 Claims, 27 Drawing Sheets

U.S. PATENT DOCUMENTS

| | | | |
|---|---|---|---|
| 5,903,554 A | 5/1999 | Saints | |
| 6,097,972 A | 8/2000 | Saints et al. | |
| 6,141,393 A | 10/2000 | Thomas et al. | |
| 6,236,646 B1 * | 5/2001 | Beming et al. | 370/335 |
| 6,389,843 B2 | 5/2002 | McAllister et al. | |
| 6,473,467 B1 | 10/2002 | Wallace et al. | |
| 6,478,422 B1 | 11/2002 | Hansen | |
| 6,493,331 B1 | 12/2002 | Walton et al. | |
| 6,501,733 B1 * | 12/2002 | Falco et al. | 370/235 |
| 6,704,291 B2 * | 3/2004 | Mueckenheim et al. | 370/252 |
| 6,721,333 B1 * | 4/2004 | Milton et al. | 370/469 |
| 6,771,706 B2 | 8/2004 | Ling et al. | |
| 6,785,341 B2 | 8/2004 | Walton et al. | |
| 6,961,388 B2 | 11/2005 | Ling et al. | |
| 7,006,848 B2 | 2/2006 | Ling et al. | |
| 2002/0154705 A1 | 10/2002 | Walton et al. | |
| 2005/0099975 A1 * | 5/2005 | Catreux et al. | 370/329 |

FOREIGN PATENT DOCUMENTS

| | | |
|---|---|---|
| WO | 0171928 A2 | 9/2001 |
| WO | 0176110 A2 | 10/2001 |

OTHER PUBLICATIONS

P.W. Wolniansky et al., "V-Blast: An Architecture for Realizing Very High Data Rates Over the Rich-Scattering Wireless Channel," IEEE-1998 (pp. 295-300).

Sirikiat Leg Ariyavisitakul et al., "Optimum Space-Time Processors with Dispersive Interference: Unified Analysts and Required Filter Span," IEEE Trans. On Comm., vol. 47, No. 7, Jul. 1999 (pp. 1073-1083).

John A.C. Bingham, "Multicarrier Modulation for Data Transmission: An Idea Whose Time Has Come," IEEE Communications Magazine, May 1990 (pp. 5-14).

Fuyun Ling. "Optimal Reception, Performance Bound, and Cutoff Rat Analysis of References-Assisted Coherent CDMA Communications with Applications," IEEE Transactions on Communications, vol. 47, No. 10, Oct. 1999 (pp. 1583-1592).

Bjoern Ottersten, "Array Processing for Wireless Communications," IEEE 1996 (pp. 466-473).

* cited by examiner

MULTIPLE-ACCESS MULTIPLE-INPUT MULTIPLE-OUTPUT (MIMO) COMMUNICATION SYSTEM

CLAIM OF PRIORITY UNDER 35 U.S.C. §120

The present Application for Patent is a continuation of patent application Ser. No. 09/993,087 entitled "MULTIPLE-ACCESS MULTIPLE-INPUT MULTIPLE-OUTPUT (MIMO) COMMUNICATION SYSTEM" filed Nov. 6, 2001, now abandoned, and assigned to the assignee hereof and hereby expressly incorporated by reference herein.

BACKGROUND

I. Field

The present invention relates generally to data communication, and more specifically to a multiple-access multiple-input multiple-output (MIMO) communication system.

II. Background

Wireless communication systems are widely deployed to provide various types of communication such as voice, data, and so on. These systems may be multiple-access systems capable of supporting communication with multiple users (sequentially or simultaneously) by sharing the available system resources (e.g., bandwidth and transmit power). Such systems may be based on code division multiple access (CDMA), time division multiple access (TDMA), frequency division multiple access (FDMA), or some other multiple access technique.

In a wireless communication system (e.g., a cellular system, a broadcast system, a multi-channel multi-point distribution system (MMDS), and others), an RF modulated signal from a transmitter unit may reach a receiver unit via a number of propagation paths. The characteristics of the propagation paths typically vary over time due to a number of factors such as fading and multipath.

To provide diversity against deleterious path effects and improve performance, multiple transmit and receive antennas may be used. If the propagation paths between the transmit and receive antennas are linearly independent (i.e., a transmission on one path is not formed as a linear combination of the transmissions on other paths), which is generally true to at least an extent, then the likelihood of correctly receiving a data transmission increases as the number of antennas increases. Generally, diversity increases and performance improves as the number of transmit and receive antennas increases.

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel and corresponds to a dimension. The MIMO system can provide improved performance (e.g., increased transmission capacity) if the additional dimensionalities created by the multiple transmit and receive antennas are utilized.

The resources for a given communication system are typically limited by various regulatory constraints and requirements and by other practical considerations. However, the system may be required to support a number of terminals, provide various services, achieve certain performance goals, and so on.

There is therefore a need in the art for a multiple-access MIMO system capable of flexible operation and providing improved system performance.

SUMMARY

Aspects of the invention provide techniques that may be used to achieve better utilization of the available resources (e.g., transmit power and bandwidth) and robust performance for the downlink and uplink in a wireless communication system. These techniques may be advantageously employed in a MIMO system, a multiple-access system (e.g., a CDMA, TDMA, or FDMA system), an OFDM system, or a communication system that employs any combination of the above (e.g., a multiple-access MIMO system, a MIMO system that employs OFDM, and so on).

In an aspect, techniques are provided to adaptively process data prior to transmission in order to more closely match the data transmission to the capacity of the channel. With adaptive transmit processing, the coding and modulation scheme used for the data transmission may be selected based on the characteristics of the communication channel, which may be quantified by channel state information (CSI). The CSI may be determined at a receiver unit (e.g., a terminal) and reported to a transmitter unit (e.g., a base station). The transmitter unit may then adjust the coding and modulation of the data transmission based on the reported CSI.

In another aspect, techniques are provided to process a data transmission received via multiple antennas at a receiver unit. Various receiver processing techniques are described herein, including a channel correlation matrix inversion (CCMI) technique, a minimum mean square error (MMSE) technique, an MMSE linear equalizer (MMSE-LE) technique, a decision feedback equalizer (DFE) technique, and a successive cancellation receiver processing technique. These receiver processing techniques may be advantageously used in combination with the adaptive transmit processing to achieve high performance.

In yet another aspect, techniques are provided to operate the cells in the system in a manner to further increase the spectral efficiency of the system. Via adaptive reuse schemes and power back-off, the transmit power on the downlink and/or uplink may be limited in a structured manner to reduce interference, improve coverage, and attain high throughput.

In yet another aspect, techniques are provided to efficiently schedule data transmission on the downlink and uplink. These scheduling schemes may be designed to optimize transmissions (e.g., maximize throughput) for single or multiple terminals in a manner to meet various constraints and requirements (e.g., demand requirements, loading, fairness criteria, data rate capabilities, channel conditions, and so on). Certain properties of the system (e.g., multi-user diversity, receiver processing techniques, and so on) may also be exploited to provide improved performance.

These and other aspects, embodiments, and features of the invention are described in further detail below. The invention further provides methods, transmitter units, receiver units, base stations, terminals, systems, apparatus, program products, and so on that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

I. Overall System

Figure 1:
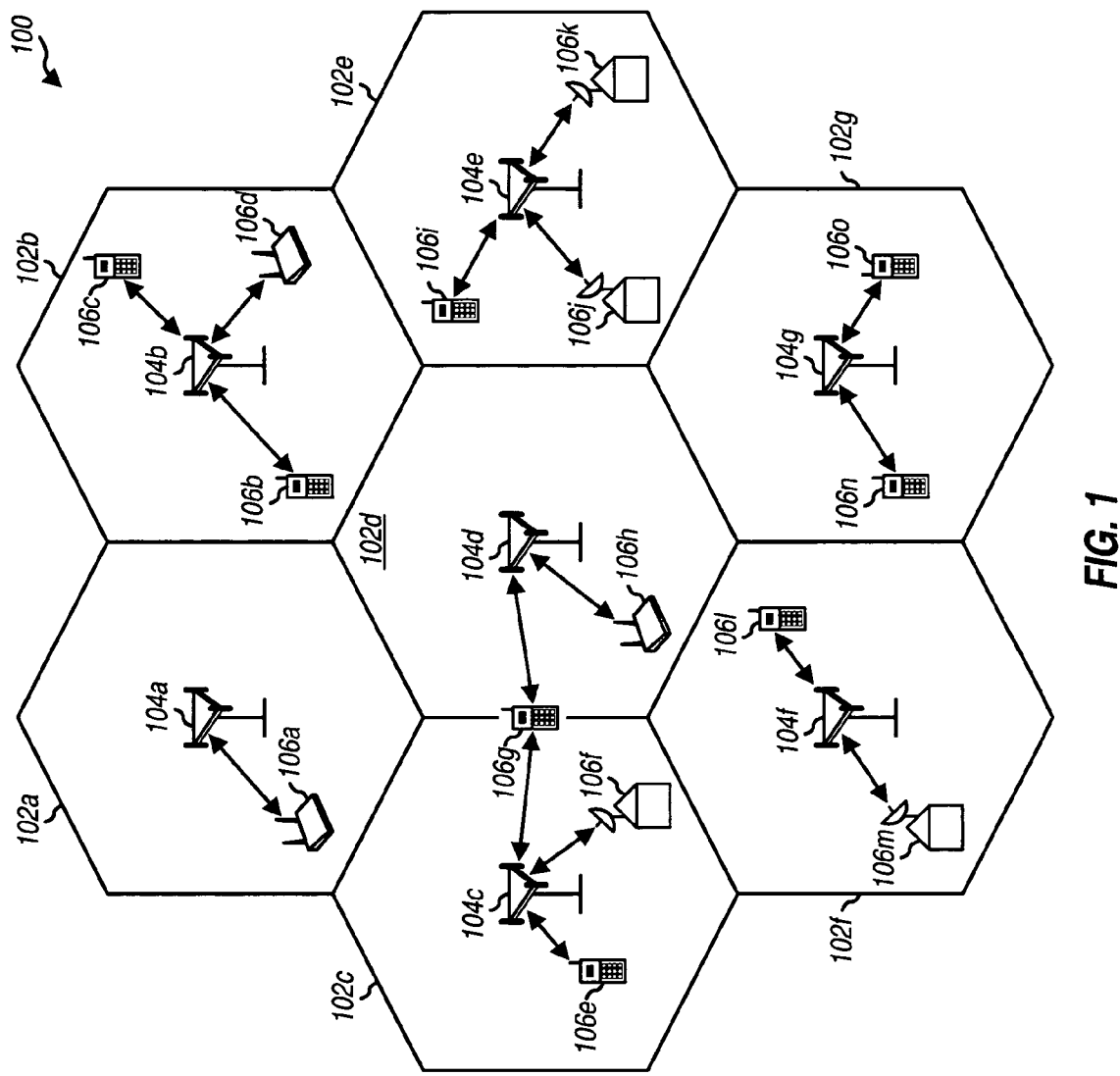
FIG. 1 is a diagram of a multiple-access communication system wherein various aspects and embodiments of the invention may be implemented.

FIG. 1 is a diagram of a multiple-access communication system 100 that supports a number of users and is capable of implementing various aspects and embodiments of the invention. System 100 provides communication for a number of coverage areas 102a through 102g, each of which is serviced by a corresponding base station 104 (which may also be referred to as an access point, a node B, or some other terminology). Each base station's coverage area may be defined, for example, as the area over which the terminals can achieve a particular grade of service (GoS). The base station and/or its coverage area are also often referred to as a "cell".

As shown in FIG. 1, various terminals 106 are dispersed throughout the system, and each terminal may be fixed (i.e., stationary) or mobile. Each terminal may communicate with one or possibly more base stations on the downlink and/or uplink at any given moment depending on whether or not it is active, whether or not "soft handoff" is employed, and so on. The downlink (forward link) refers to transmission from the base station to the terminal, and the uplink (reverse link) refers to transmission from the terminal to the base station. In FIG. 1, base station 104a communicates with terminal 106a, base station 104b communicates with terminals 106b, 106c, and 106d, base station 104c communicates with terminals 106e, 106f, and 106g, and so on.

System 100 may also be designed to implement any number of standards and designs for CDMA, TDMA, FDMA, and other multiple access schemes. The CDMA standards include the IS-95, cdma2000, IS-856, W-CDMA, and TS-CDMA standards, and the TDMA standards include the Global System for Mobile Communications (GSM) standard. These standards are known in the art and incorporated herein by reference.

System 100 may be a multiple-input multiple-output (MIMO) system that employs multiple ($N_T$) transmit antennas and multiple ($N_R$) receive antennas for data transmission. A MIMO channel formed by the $N_T$ transmit and $N_R$ receive antennas may be decomposed into $N_C$ independent channels, with $N_C \leq \min\{N_T, N_R\}$. Each of the $N_C$ independent channels is also referred to as a spatial subchannel of the MIMO channel. The MIMO system can provide improved performance (e.g., increased transmission capacity) if the spatial subchannels created by the multiple transmit and receive antennas are utilized.

System 100 may alternatively or additionally utilize orthogonal frequency division multiplex (OFDM), which effectively partitions the operating frequency band into a number of ($N_F$) frequency subchannels (i.e., frequency bins). At each time slot (which is a particular time interval that may be dependent on the bandwidth of the frequency subchannel), a modulation symbol may be transmitted on each of the $N_F$ frequency subchannels.

System 100 may be operated to transmit data via a number of "transmission" channels. For a MIMO system not utilizing OFDM, there is typically only one frequency subchannel and each spatial subchannel may be referred to as a transmission channel. For a MIMO system utilizing OFDM, each spatial subchannel of each frequency subchannel may be referred to as a transmission channel. And for an OFDM system not utilizing MIMO, there is only one spatial subchannel and each frequency subchannel may be referred to as a transmission channel.

The following channels and subchannels may be supported by the system:

channel—a transmission unit that may be a time slot in a TDMA system, a frequency subchannel in an FDMA or OFDM system, or a code channel in a CDMA system;

communication channel—the RF propagation channel between the transmit and receive antennas;

transmission channel—a spatial subchannel, a frequency subchannel, or a spatial subchannel of a frequency subchannel over which an independent data stream may be transmitted;

spatial subchannel—an independent channel formed by the spatial dimensionality of the communication channel between the transmit and receive antennas; and frequency subchannel—a frequency bin in an OFDM system.

The use of multiple antennas at both the transmitter unit and receiver unit (i.e., $N_R \times N_T$ MIMO) is an effective technique for enhancing the capacity of multiple-access systems (e.g., cellular, PCS, LAN, and so on). Using MIMO, a transmitter unit may send multiple independent data streams on the same communication channel to a single or multiple receiver units by exploiting the spatial dimensionality of the communication channel coupling the transmit and receive antennas.

System 100 may be designed to support a number of operating modes. In the system, each base station may be equipped with both multiple transmit and receive antennas for data transmission and reception, and each terminal may be equipped with a single transmit/receive antenna or multiple transmit/receive antennas for data transmission and reception. The number of antennas used for each terminal type may be dependent on various factors such as, for example, the services to be supported by the terminal (e.g., voice, data, or both), cost constraints, regulatory constraints, safety issues, and so on. Table 1 summarizes a matrix of operating modes that may be supported by system 100.

TABLE 1

| Transmit Antennas | Receive Antennas | |
|---|---|---|
| | 1 | $N_R$ |
| 1 | SISO | SIMO |
| $N_T$ | MISO | MIMO |

A brief description of the operating modes shown in Table 1 is given below:

SISO (Single-Input, Single-Output)—the RF link is characterized by a single transmit antenna and a single receive antenna.

SIMO (Single-Input, Multiple-Output)—the RF link is characterized by a single transmit antenna and multiple receive antennas. This operating mode may be used for receive diversity.

MISO (Multiple-Input, Single-Output)—the RF link is characterized by multiple transmit antennas and a single receive antenna. This operating mode may be used for transmit diversity.

MIMO (Multiple-Input, Multiple-Output)—the RF link is characterized by multiple transmit antennas and multiple receive antennas.

System 100 may further be designed to support the following operating modes when MIMO is employed:

Diversity only—the use of both multiple transmit and receive antennas (i.e., both transmit and receive diversity) to achieve highly reliable transmission of a single data stream.

Spatial multiplexing, single-user (single-user MIMO mode)—the use of both multiple transmit and receive antennas to achieve high data rates for a single terminal by creating multiple parallel transmission channels by exploiting the spatial dimensionality of the communication channel.

Spatial multiplexing, multi-user (multi-user MIMO mode)—the use of multiple transmit and receive antennas to accommodate communication with multiple terminals concurrently on the same channel.

Mixed mode—the use of multiple transmit and receive antennas to accommodate communication with a combination of SIMO and MIMO terminals concurrently on the same channel The above operating modes may be viewed as sub-categories of the MIMO mode.

The particular operating mode(s) supported by each base station and each terminal are dependent in part on the number of transmit and receive antennas available at the base station or terminal. A base station equipped with multiple transmit antennas and multiple receive antennas is able to support all operating modes listed above. A terminal may be designed with any number of transmit antenna and any number of receive antenna. On the downlink, a terminal with a single receive antenna (e.g., one designed exclusively for voice services) may support SISO and MISO modes, and a terminal with multiple receive antennas may support SIMO and MIMO modes. Some forms of transmit diversity (i.e., MISO) may be employed for some transmissions for single receive antenna terminals. On the uplink, single transmit antenna terminals may support SISO and SIMO modes, and multiple transmit antenna terminals may support MISO and MIMO modes.

1. Spatial Multiplexing in Multiple Access Networks

The spatial multiplexing modes associated with MIMO provide a great deal of system flexibility and further support a mixture of terminal types. The system configuration used for the downlink and uplink is likely to be different due to various factors such as, for example, different service requirements, cost constraints, and capabilities of different types of terminals.

With the multi-user MIMO mode, multiple parallel channels may be supported, where each such channel may be operated as SIMO, MIMO, or some combination. On the downlink, multiple transmit antennas at the base station may be used to send data to different terminals using parallel transmission channels. In this case, each terminal may employ multiple receive antennas along with spatial processing to null out the other terminals' signals and demodulate its own signal(s). On the uplink, the base station's receiver unit uses multiple receive antennas along with spatial processing to separately demodulate the transmissions from the individual terminals.

The multi-user MIMO mode is similar in form to Space Division Multiple Access (SDMA). With SDMA, "spatial signatures" associated with different terminals are exploited to allow multiple terminals to operate simultaneously on the same channel. A spatial signature constitutes a complete RF characterization of the propagation path between the transmit antenna(s) and the receive antenna(s). On the downlink, the spatial signatures may be derived at the terminals and reported to the base station. The base station may then process these spatial signatures to select terminals for data transmission on the same channel, and to derive mutually "orthogonal" steering vectors for each of the independent data streams to be transmitted to the selected terminals. On the uplink, the base station may derive the spatial signatures of the different terminals. The base station may then process these signatures to schedule terminals for data transmission and to further process the transmissions from the scheduled terminals to separately demodulate each transmission.

If the terminals are equipped with multiple receive antennas, then the base station does not need the spatial signatures of the terminals in order to obtain the benefit of SDMA. All that may be needed at the base station is a small amount of information from each terminal indicating the "post-processed" SNR associated with the signal from each base station transmit antenna, after demodulation at the terminal. The SNR estimation process may be facilitated by periodically transmitting a pilot from each base station transmit antenna, as described below.

For both the downlink and uplink, the base station may control access to the system by allocating and de-allocating resources to users (e.g., on a demand basis). When users are allocated resources, information may be provided to the users via a control channel to indicate the particular operating mode to use. Moreover, the system may adjust various operating parameters (e.g., the operating mode, channel, data rate, antenna(s) to transmit from, transmit power, and so on) in an adaptive manner based on system loading and/or some combination of performance metrics, as described below.

2. Base Station and Terminal Block Diagrams

Figure 2A:
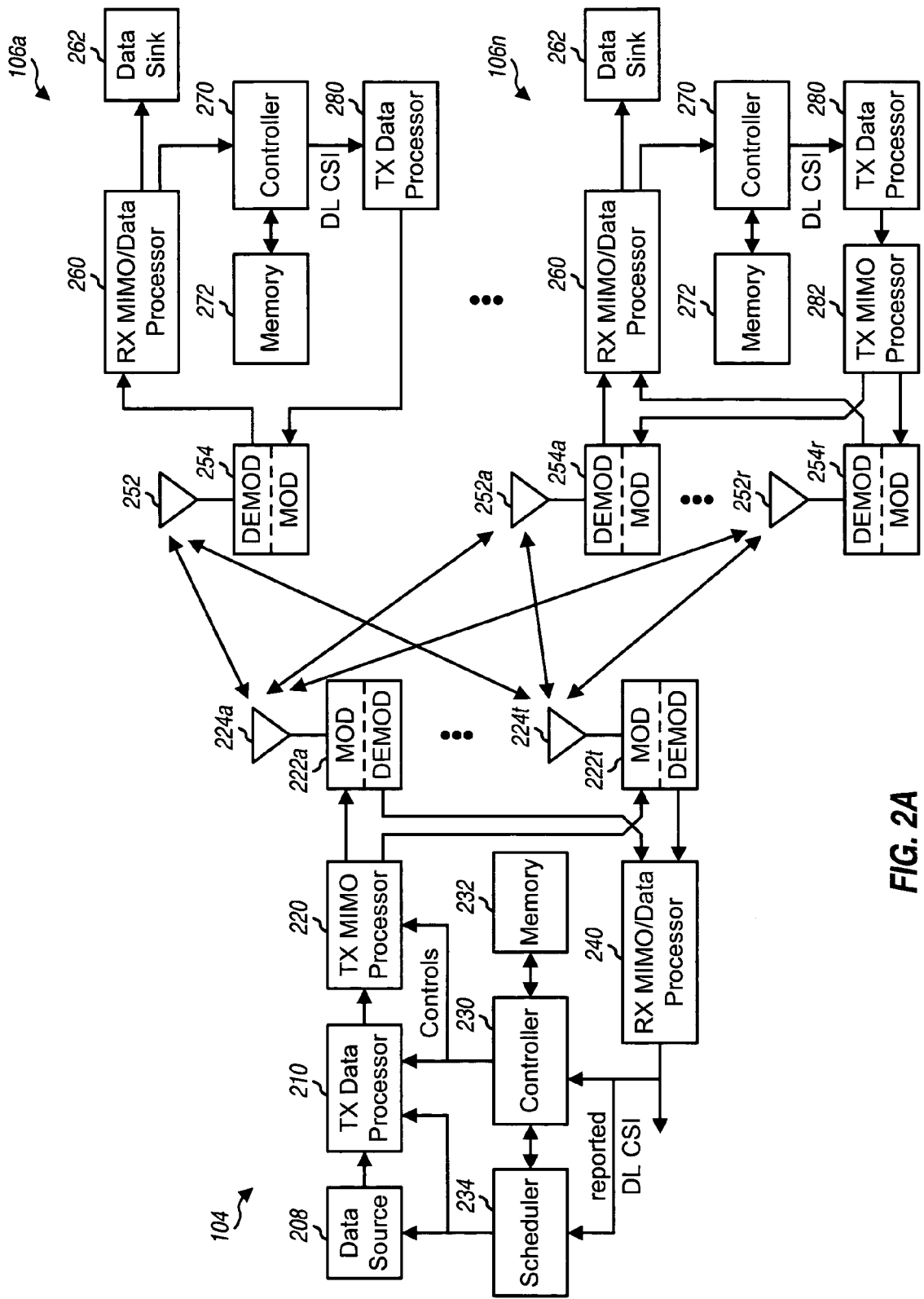
FIGS. 2A and 2B are block diagrams of a base station and two terminals for downlink and uplink data transmission, respectively.

FIG. 2A is a block diagram of a base station 104 and two terminals 106 within system 100 for downlink data transmission. At base station 104, a data source 208 provides data (i.e., information bits) to a transmit (TX) data processor 210. For each transmit antenna, TX data processor 210 (1) encodes the data in accordance with a particular coding scheme, (2) interleaves (i.e., reorders) the coded bits based on a particular interleaving scheme, and (3) maps the interleaved bits into modulation symbols for one or more transmission channels selected for use for data transmission. The encoding increases the reliability of the data transmission. The interleaving provides time diversity for the coded bits, permits the data to be transmitted based on an average SNR for the transmission channels, combats fading, removes correlation between coded bits used to form each modulation symbol, and may further provide frequency diversity if the coded bits are transmitted over multiple frequency subchannels. In an aspect, the coding and modulation (i.e., symbol mapping) may be performed based on control signals provided by a controller 230.

A TX MIMO processor 220 receives and demultiplexes the modulation symbols from TX data processor 210 and provides a stream of modulation symbols for each transmission channel (e.g., each transmit antenna), one modulation symbol per time slot. TX MIMO processor 220 may further precondition the modulation symbols for each transmission channel if full CSI (e.g., a channel response matrix $\underline{H}$) is available. MIMO and full-CSI processing is described in further detail below.

If OFDM is not employed, TX MIMO processor 220 provides a stream of modulation symbols for each transmit antenna used for data transmission. And if OFDM is employed, TX MIMO processor 220 provides a stream of modulation symbol vectors for each transmit antenna used for data transmission. And if full-CSI processing is performed (described below), TX MIMO processor 220 provides a stream of preconditioned modulation symbols or preconditioned modulation symbol vectors for each antenna used for data transmission. Each stream is then received and modulated by a respective modulator (MOD) 222 and transmitted via an associated antenna 224.

At each terminal 106 for which a data transmission is directed, one or multiple antennas 252 receive the transmitted signals, and each receive antenna provides a received signal to a respective demodulator (DEMOD) 254. Each demodulator (or front-end unit) 254 performs processing complementary to that performed at modulator 222. The modulation symbols from all demodulators 254 are then provided to a receive (RX) MIMO/data processor 260 and processed to recover one or more data streams transmitted for the terminal. RX MIMO/data processor 260 performs processing complementary to that performed by TX data processor 210 and TX MIMO processor 220 and provides decoded data to a data sink 262. The processing by terminal 106 is described in further detail below.

At each active terminal 106, RX MIMO/data processor 260 further estimates the conditions of the downlink and provides channel state information (CSI) (e.g., post-processed SNRs or channel gain estimates) indicative of the estimated link conditions. A controller 270 receives and may further transform the downlink CSI (DL CSI) into some other forms (e.g., data rates, coding/modulation schemes, and so on). A TX data processor 280 then receives and processes the downlink CSI, and provides processed data indicative of the downlink CSI (directly or via a TX MIMO processor 282) to one or more modulators 254. Modulator(s) 254 further condition the processed data and transmit the downlink CSI back to base station 104 via a reverse channel. The downlink CSI may be reported by the terminal using various signaling techniques, as described below.

At base station 104, the transmitted feedback signal is received by antennas 224, demodulated by demodulators 222, and provided to a RX MIMO/data processor 240. RX MIMO/data processor 240 performs processing complementary to that performed by TX data processor 280 and TX MIMO processor 282 (if any) and recovers the reported CSI, which is then provided to controller 230 and a scheduler 234.

Scheduler 234 uses the reported downlink CSI to perform a number of functions such as (1) selecting the best set of terminals for data transmission and (2) assigning the available transmit antennas to the selected terminals. Scheduler 234 or controller 230 further uses the reported downlink CSI to determine the coding and modulation scheme to be used for each transmit antenna. Scheduler 234 may schedule terminals to achieve high throughput and/or based on some other performance criteria or metrics, as described below.

Figure 2B:
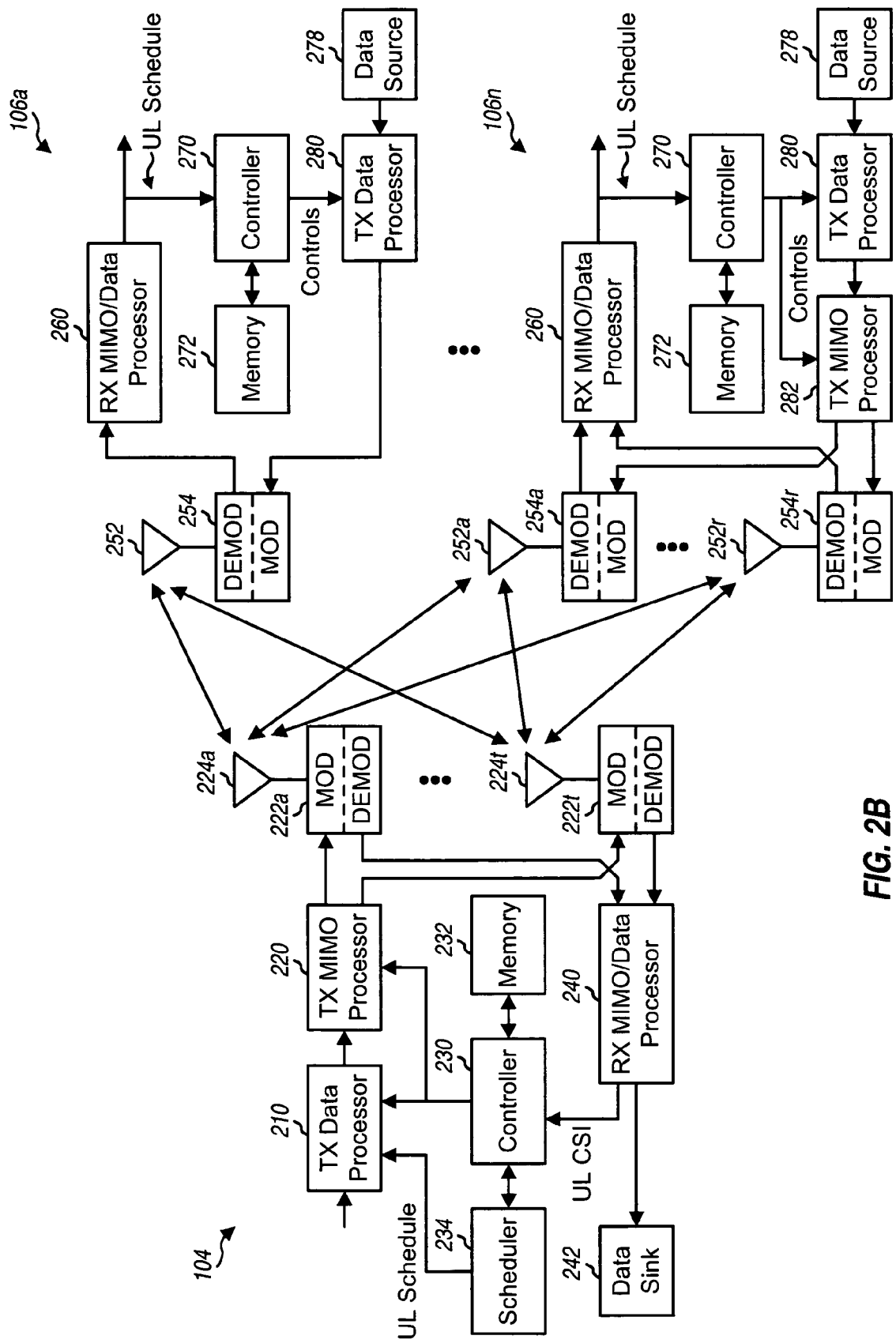

FIG. 2B is a block diagram of a base station 104 and two terminals 106 for uplink data transmission. At each terminal 106 scheduled for data transmission on the uplink, a data source 278 provides data to TX data processor 280, which encodes, interleaves, and maps the data into modulation symbols. If multiple transmit antennas are used for data transmission, TX MIMO processor 282 receives and further processes the modulation symbols to provide a stream of modulation symbols, preconditioned modulation symbols, modulation symbol vectors, or preconditioned modulation symbol vectors for each antenna used for data transmission. Each stream is then received and modulated by a respective modulator 254 and transmitted via an associated antenna 252.

At base station 104, a number of antennas 224 receive the transmitted signals, and each receive antenna provides a received signal to a respective demodulator 222. Each demodulator 222 performs processing complementary to that performed at modulator 254. The modulation symbols from all demodulators 222 are then provided to RX MIMO/data processor 240 and processed to recover the data streams transmitted by the scheduled terminals. RX MIMO/data processor 240 performs processing complementary to that performed by TX data processor 280 and TX MIMO processor 282 and provides decoded data to a data sink 242.

For each terminal 106 desiring to transmit in an upcoming transmission interval, RX MIMO/data processor 240 further estimates the channel conditions for the uplink and derives uplink CSI (UL CSI), which is provided to controller 230. Scheduler 234 may also receive and use the uplink CSI to perform a number of functions such as (1) selecting the best set of terminals for data transmission on the uplink, (2) determining a particular processing order for the signals from the selected terminals, and (3) determining the coding and modulation scheme to be used for each transmit antenna of each scheduled terminal. For each transmission interval, scheduler 234 provides an uplink schedule that indicates which terminals have been selected for data transmission and the assigned transmission parameters for each scheduled terminal. The transmission parameters for each transmit antenna of each scheduled terminal may include the date rate and coding and modulation scheme to be used.

TX data processor 210 receives and processes the uplink schedule, and provides processed data indicative of the schedule to one or more modulators 222. Modulator(s) 222 further condition the processed data and transmit the uplink schedule to the terminals via the wireless link. The uplink schedule may be sent to the terminal using various signaling and messaging techniques.

At each active terminal 106, the transmitted signals are received by antennas 252, demodulated by demodulators 254, and provided to RX MIMO/data processor 260. Processor 260 performs processing complementary to that performed by TX MIMO processor 220 and TX data processor 210 and recovers the uplink schedule for that terminal (if any), which is then provided to controller 270 and used to control the uplink transmission by the terminal.

In FIGS. 2A and 2B, scheduler 234 is shown as being implemented within base station 104. In other implementation, scheduler 234 may be implemented within some other element of system 100 (e.g., a base station controller that couples to and interacts with a number of base stations).

II. Transmitter Unit

A MIMO system can provide improved performance if the additional, dimensionalities created by the multiple transmit and receive antennas are utilized. Increased system efficiency and performance may be possible if the transmitter unit is provided with CSI descriptive of the transmission characteristics from the transmit antennas to the receive antennas (although this is not absolutely required). CSI may be categorized as either "full CSI" or "partial CSI".

Full CSI includes sufficient characterization (e.g., the amplitude and phase) across the entire system bandwidth (i.e., each frequency subchannel) for the propagation path between each transmit-receive antenna pair in the ($N_T \times N_R$) MIMO matrix. Full-CSI processing implies that (1) the channel characterization is available at both the transmitter and receiver units, (2) the transmitter unit derives the eigenmodes for the MIMO channel (described below), determines modulation symbols to be transmitted on the eigenmodes, linearly preconditions (filters) the modulation symbols, and transmits the preconditioned modulation symbols, and (3) the receiver unit performs a complementary processing (e.g., spatial matched filter) of the linear transmit processing based on the channel characterization to derive the $N_C$ spatial matched filter coefficients needed for each transmission channel (i.e., each eigenmode). Full-CSI processing further entails processing the data in accordance with a proper coding and modulation scheme selected for each transmission channel based on the channel's eigenvalue (described below) to derive the modulation symbols.

Partial CSI may include, for example, the signal-to-noise-plus-interference ratios (SNRs) of the transmission channels. The SNR for a particular transmission channel may be derived by detecting a data stream or a pilot transmitted on transmission channel. Partial-CSI processing may imply processing the data in accordance with a proper coding and modulation schemes selected for each transmission channel based on the channel's SNR.

On both the downlink and uplink, full or partial CSI may be used to adjust various operational parameters of the system. On the downlink, the terminals may derive the SNR for each transmission channel and report downlink CSI to the base station via a reverse channel. The base station would then use this information to schedule downlink transmission to the terminals, and to determine the channel and antenna assignments, the operating mode, the data rate, and the transmit power to be used. On the uplink, the base station may derive the SNRs corresponding to individual terminals and would then employ this information to schedule the uplink transmissions. The pertinent information (e.g., schedule, data rate, coding and modulation scheme, transmit power, and so on) may be communicated to the affected terminals via a control channel on the downlink.

1. MIMO Transmitter Unit with Partial-CSI Processing

Figure 3A:
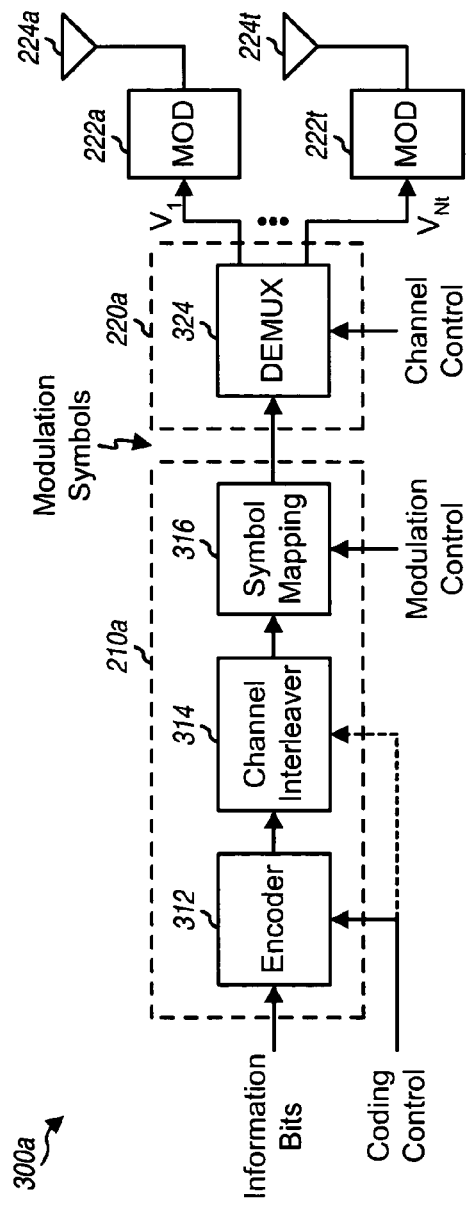
FIG. 3A is a block diagram of an embodiment of a MIMO transmitter unit capable of adjusting its processing based on the available partial CSI.

FIG. 3A is a block diagram of an embodiment of a MIMO transmitter unit 300a, which is one embodiment of the transmitter portion of base station 104 or terminal 106 in FIGS. 2A and 2B. Transmitter unit 300a is capable of adjusting its processing based on the available partial CSI (e.g., reported by the receiver unit). Transmitter unit 300a includes (1) a TX data processor 210a that receives and processes information bits to provide modulation symbols and (2) a TX MIMO processor 220a that demultiplexes the modulation symbols for the $N_T$ transmit antennas.

TX data processor 210a is one embodiment of TX data processors 210 and 280 in FIGS. 2A and 2B. In the specific embodiment shown in FIG. 3A, TX data processor 210a includes an encoder 312, a channel interleaver 314, and a symbol mapping element 316. Encoder 312 receives and encodes the information bits in accordance with a particular coding scheme to provide coded bits. The coding scheme may comprise a convolutional code, a Turbo code, a block code, a cyclic redundancy check (CRC), a concatenated code, or any other code or combination of codes. Channel interleaver 314 interleaves the coded bits based on a particular interleaving scheme to provide diversity. And symbol mapping element 316 maps the coded bits into modulation symbols for one or more transmission channels used for transmitting the data.

Although not shown in FIG. 3A for simplicity, pilot data (e.g., data of a known pattern) may also be encoded and multiplexed with the processed information bits. The processed pilot data may be transmitted (e.g., in a time division multiplexed (TDM) or a code division multiplexed (CDM) manner) in all or a subset of the transmission channels used to transmit the information bits. The pilot data may be used at the receiver to perform channel estimation, frequency and timing estimation, coherent data demodulation, and so on.

As shown in FIG. 3A, the encoding and modulation may be adjusted based on the available partial CSI, as reflected in the coding and modulation controls. In one embodiment, adaptive encoding is achieved by using a fixed base code (e.g., a rate ⅓ Turbo code) and adjusting the puncturing to achieve the desired coding rate, as supported by the SNR of the transmission channel used to transmit the data. For this coding scheme, the puncturing may be performed after the channel interleaving. In another embodiment, different coding schemes may be used based on the available partial CSI (e.g., each of the data streams may be coded with an independent code).

For each transmission channel, symbol mapping element 316 may be designed to group sets of interleaved bits to form non-binary symbols, and to map each non-binary symbol to a point in a signal constellation corresponding to a particular modulation scheme (e.g., QPSK, M-PSK, M-QAM, or some other scheme) selected for the transmission channel. Each mapped signal point corresponds to a modulation symbol.

The number of information bits that may be transmitted for each modulation symbol for a particular level of performance (e.g., one percent packet error rate (PER)) is dependent on the SNR of the transmission channel. Thus, the coding scheme and modulation scheme for each transmission channel may be selected based on the available partial CSI. The channel interleaving may also be adjusted based on the available partial CSI, as indicated by the dashed line for the coding control into block 314.

Table 2 lists various combinations of coding rate and modulation scheme that may be used for a number of SNR ranges. The supported bit rate for each transmission channel may be achieved using any one of a number of possible combinations of coding rate and modulation scheme. For example, one information bit per modulation symbol may be achieved using (1) a coding rate of ½ and QPSK modulation, (2) a coding rate of ⅓ and 8-PSK modulation, (3) a coding rate of ¼ and 16-QAM, or some other combination of coding rate and modulation scheme. In Table 2, QPSK, 16-QAM, and 64-QAM are used for the listed SNR ranges. Other modulation schemes such as 8-PSK, 32-QAM, 128-QAM, and so on may also be used and are within the scope of the invention.

TABLE 2

| SNR Range | # of Information Bits/Symbol | Modulation Symbol | # of Coded Bits/Symbol | Coding Rate |
|---|---|---|---|---|
| 1.5-4.4 | 1 | QPSK | 2 | ½ |
| 4.4-6.4 | 1.5 | QPSK | 2 | ¾ |
| 6.4-8.35 | 2 | 16-QAM | 4 | ½ |
| 8.35-10.4 | 2.5 | 16-QAM | 4 | ⅝ |
| 10.4-12.3 | 3 | 16-QAM | 4 | ¾ |
| 12.3-14.15 | 3.5 | 64-QAM | 6 | 7/12 |
| 14.15-15.55 | 4 | 64-QAM | 6 | ⅔ |
| 15.55-17.35 | 4.5 | 64-QAM | 6 | ¾ |
| >17.35 | 5 | 64-QAM | 6 | ⅚ |

The modulation symbols from TX data processor 210a are provided to a TX MIMO processor 220a, which is one embodiment of TX MIMO processors 220 and 282 in FIGS. 2A and 2B. Within TX MIMO processor 220a, a demultiplexer 324 demultiplexes the received modulation symbols into a number of ($N_T$) modulation symbol streams, one stream for each antenna used to transmit the modulation symbols. Each modulation symbol stream is provided to a respective modulator 222. Each modulator 222 converts the modulation symbols into one or more analog signals, and further amplifies, filters, quadrature modulates, and upconverts the signal(s) to generate a modulated signal suitable for transmission via an associated antenna 224 over the wireless link.

If the number of spatial subchannels is less than the number of available transmit antennas (i.e., $N_C \leq N_T$), then various schemes may be used for a data transmission. In one scheme, $N_C$ modulation symbol streams are generated and transmitted on a subset (i.e., $N_C$) of the available transmit antennas. The remaining ($N_T - N_C$) transmit antennas are not used for the data transmission. In another scheme, the additional degrees of freedom provided by the ($N_T - N_C$) additional transmit antennas are used to improve the reliability of the data transmission. For this scheme, each of one or more data streams may be encoded, possibly interleaved, and transmitted over multiple transmit antennas. The use of multiple transmit antennas for a given data stream increases diversity and improves reliability against deleterious path effects.

2. MIMO Transmitter Unit with Selective Channel Inversion

Figure 3B:
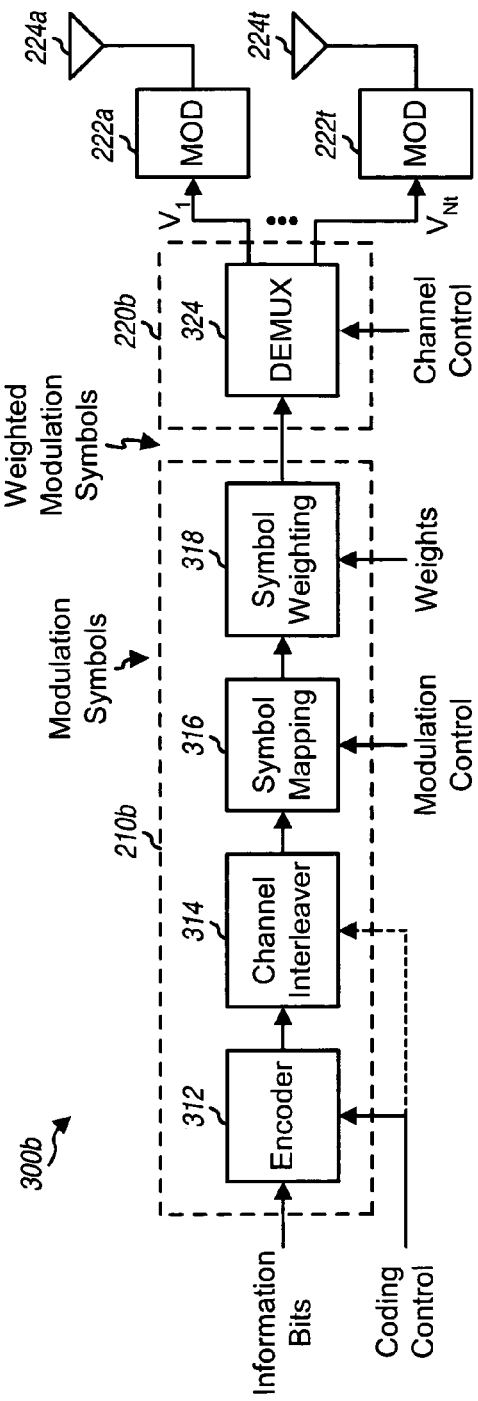
FIG. 3B is a block diagram of an embodiment of a transmitter unit capable of processing data based on selective channel inversion.

FIG. 3B is a block diagram of an embodiment of a transmitter unit 300b, which is capable of processing data based on selective channel inversion. To simplify the data processing at both the transmitter and receiver units, a common coding and modulation scheme may be used for all transmission channels selected for data transmission. In this case, the transmitter unit would encode data using a single (e.g., convolutional or Turbo) code and coding rate and would then map the resultant coded bits to modulation symbols using a single (e.g., PSK or QAM) modulation scheme. To support this single coding and modulation scheme, the transmit power level for each selected transmission channel may be set or adjusted to achieve a particular SNR at the receiver unit. The power control may be achieved by "inverting" the selected transmission channels and properly distributing the total available transmit power across all selected channels.

If equal transmit power is used for all available transmission channels and the noise variance, $\sigma^2$, is constant for all channels, then the received SNR, $\gamma(j,k)$, for transmission channel (j,k) may be expressed as:

$$\gamma(j, k) = \frac{P_{rx}(j, k)}{\sigma^2} = \frac{P_{tx}}{\sigma^2 N_T N_F} |H(j, k)|^2, \qquad \text{Eq (1)}$$

where $P_{rx}(j,k)$ is the received power for transmission channel (j,k) (i.e., the j-th spatial subchannel of the k-th frequency subchannel), $P_{tx}$ is the total transmit power available at the transmitter unit, and H(j,k) is the complex channel gain (j=1 if MIMO is not employed and k=1 if OFDM is not employed).

A normalization factor, β, used to distribute the total transmit power among the selected transmission channels may be expressed as:

$$\beta = \frac{1}{\sum_{\gamma(j,k) \geq \gamma_{th}} \gamma(j, k)^{-1}}, \qquad \text{Eq (2)}$$

where $\gamma_{th}$ is an SNR threshold used to select transmission channel for use. As shown in equation (2), the normalization factor β is computed based on, and as the sum of the reciprocals of, the SNRs of all selected transmission channels.

To achieve similar received SNRs for all selected transmission channels, the modulation symbols for each selected transmission channel (j,k) may be weighted by a weight W(j, k) that is related to that channel's SNR, which may be expressed as:

$$W(j,k) = \sqrt{\frac{\beta}{\gamma(j,k)}}.\qquad \text{Eq (3)}$$

The weighted transmit power for each transmission channel may then be expressed as:

$$P_{tx}(j,k) = \begin{cases} \frac{\beta P_{tx}}{\gamma(j,k)}, & \text{for } \gamma(j,k) \geq \gamma_{th} \\ 0, & \text{otherwise} \end{cases} \qquad \text{Eq (4)}$$

As shown in equation (4), only transmission channels for which the received SNR is greater than or equal to the SNR threshold (i.e., $\gamma(j,k) \geq \gamma_{th}$) are selected for use.

Selective channel inversion is described in further detail in U.S. patent application Ser. No. 09/860,274, filed May 17, 2001, U.S. patent application Ser. No. 09/881,610, filed Jun. 14, 2001, and U.S. patent application Ser. No. 09/892,379, filed Jun. 26, 2001, all three entitled "Method and Apparatus for Processing Data for Transmission in a Multi-Channel Communication System Using Selective Channel Inversion," assigned to the assignee of the present application, and incorporated herein by reference.

As shown in FIG. 3B, transmitter unit 300b includes a TX data processor 210b coupled to a TX MIMO processor 220b. TX data processor 210b includes encoder 312, channel interleaver 314, and symbol mapping element 316, which operate as described above. TX data processor 210b further includes a symbol weighting element 318 that weighs the modulation symbols for each selected transmission channel based on a respective weight to provide weighted modulation symbols. The weight for each selected transmission channel may be determined based on that channel's achieved SNR and the SNRs of other selected transmission channels, as described above. The SNR threshold, $\gamma_{th}$, may be determined as described in the aforementioned U.S. patent application Ser. Nos. 09/860,274, 09/881,610, and 09/892,379.

3. MIMO Transmitter Unit with Full-CSI Processing

Figure 3C:
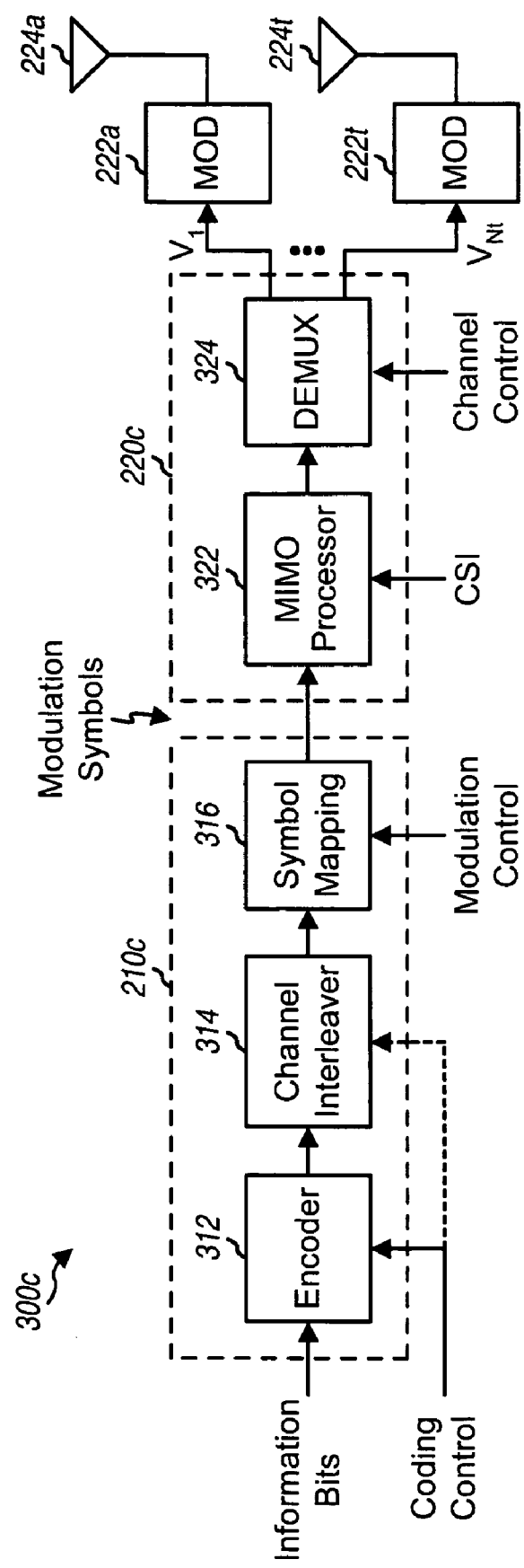
FIG. 3C is a block diagram of an embodiment of a transmitter unit capable of processing data based on full CSI.

FIG. 3C is a block diagram of an embodiment of a transmitter unit 300c, which is capable of processing data based on full CSI reported by the receiver unit. Transmitter unit 300c includes a TX data processor 210c coupled to a TX MIMO processor 220c. TX data processor 210c includes encoder 312, channel interleaver 314, and symbol mapping element 316, which operate as described above. TX MIMO processor 220c includes a channel MIMO processor 322 and demultiplexer 324.

Channel MIMO processor 322 demultiplexes the received modulation symbols into a number of ($N_C$) modulation symbol streams, one stream for each spatial subchannel (i.e., eigenmode) used to transmit the modulation symbols. For full-CSI processing, channel MIMO processor 322 preconditions the $N_C$ modulation symbols at each time slot to generate $N_T$ preconditioned modulation symbols, as follows:

$$\begin{bmatrix} x_1 \\ x_2 \\ \vdots \\ x_{N_T} \end{bmatrix} = \begin{bmatrix} e_{11}, & e_{12}, & e_{1N_C} \\ e_{21}, & e_{22}, & e_{2N_C} \\ & & \\ e_{N_T 1}, & e_{N_T 2}, & e_{N_T N_C} \end{bmatrix} \cdot \begin{bmatrix} b_1 \\ b_2 \\ \vdots \\ b_{N_C} \end{bmatrix} \qquad \text{Eq (5)}$$

where $b_1, b_2, \ldots$ and $b_{N_C}$ are respectively the modulation symbols for spatial subchannels $1, 2, \ldots N_C$, where each of the $N_C$ modulation symbols may be generated using, for example, M-PSK, M-QAM, or some other modulation scheme;

$e_{ij}$ are elements of an eigenvector matrix $\underline{E}$ related to the transmission characteristics from the transmit antennas to the receive antennas; and $x_1, x_2, \ldots x_{N_T}$ are the preconditioned modulation symbols.

The eigenvector matrix $\underline{E}$ may be computed by the transmitter unit or is provided to the transmitter unit (e.g., by the receiver unit).

For full-CSI processing, each preconditioned modulation symbol, $x_i$, for a particular transmit antenna represents a linear combination of (weighted) modulation symbols for up to $N_C$ spatial subchannels. The modulation scheme used for each of the modulation symbols is selected based on the effective SNR of that eigenmode and is proportional to an eigenvalue, $\lambda_i$ (described below). Each of the $N_C$ modulation symbols used to generate each preconditioned modulation symbol may be associated with a different signal constellation. For each time slot, the $N_T$ preconditioned modulation symbols generated by channel MIMO processor 322 are demultiplexed by a demultiplexer 324 and provided to $N_T$ modulators 222.

The full-CSI processing may be performed based on the available CSI and for all or a subset of the transmit antennas. The full-CSI processing may also be enabled and disabled selectively and/or dynamically. For example, the full-CSI processing may be enabled for a particular data transmission and disabled for some other data transmissions. The full-CSI processing may also be enabled under certain conditions, for example, when the communication link has adequate SNR.

4. MIMO Transmitter Unit with Independent Processing

Figure 3D:
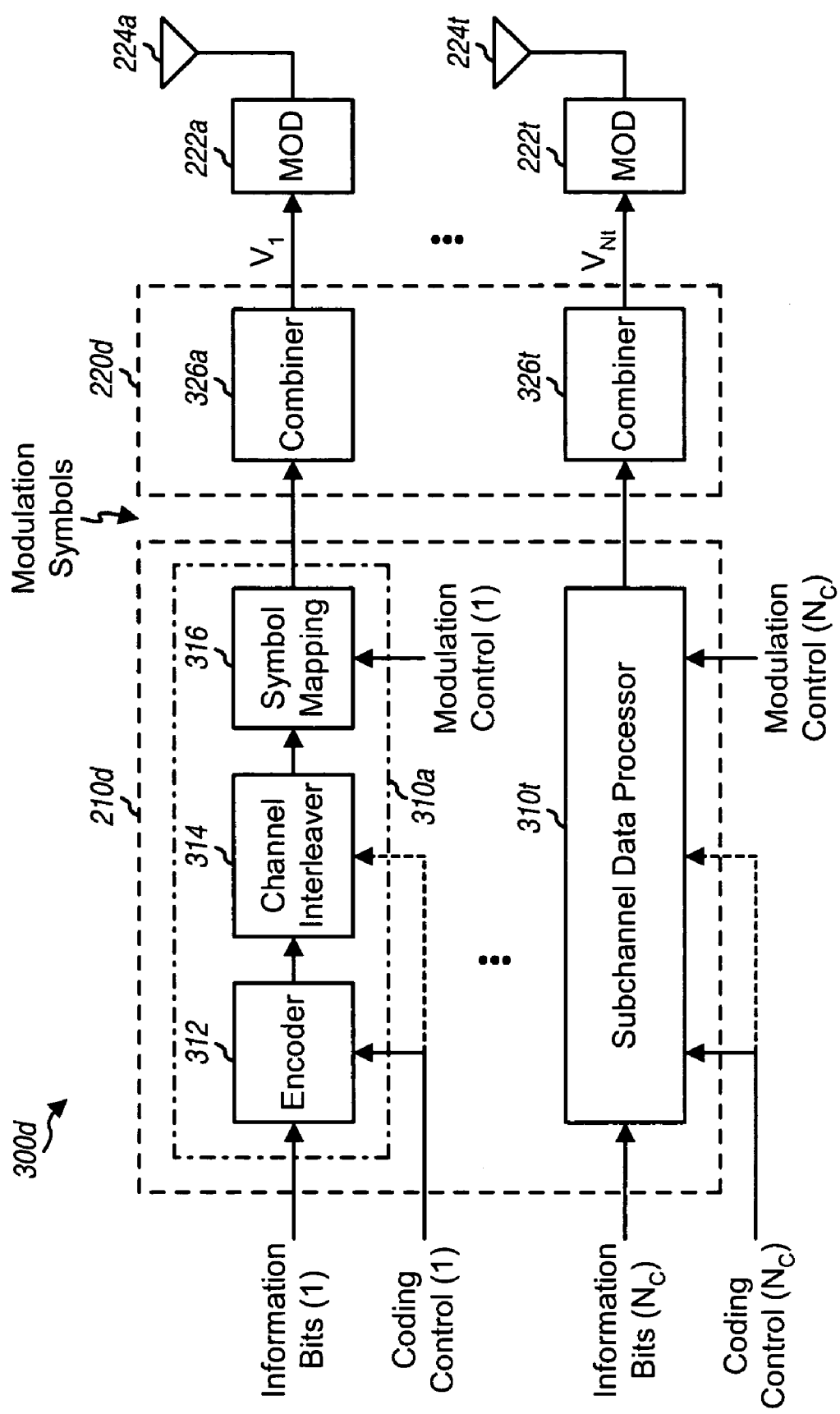
FIG. 3D is a block diagram of an embodiment of a transmitter unit capable of independently coding and modulating data for each group of transmission channels.

FIG. 3D is a block diagram of an embodiment of a transmitter unit 300d, which is capable of independently coding and modulating data for each group of transmission channels based on a particular coding and modulation scheme selected for the group. In an embodiment, each group corresponds to one transmit antenna and the transmission channels in each group may correspond to the frequency subchannels for the transmit antenna. In another embodiment, each group corresponds to a respective receiver unit to which a data transmission is directed. In general, each group may include any number of transmission channels for which data is to be coded and modulated with a common coding and modulation scheme.

Transmitter unit 300d includes a TX data processor 210d coupled to a TX MIMO processor 220d. TX data processor 210d includes a number of subchannel data processors 310a through 310t, one data processor 310 for each group of transmission channels to be independently coded and modulated. In the embodiment shown in FIG. 3D, each data processor 310 includes encoder 312, channel interleaver 314, and symbol mapping element 316, which operate as described above.

In the embodiment shown in FIG. 3D, the modulation symbols from each data processor 310 are provided to a respective combiner 326 within TX MIMO processor 220d. If each group includes the selected frequency subchannels for a particular transmit antenna, then combiner 326 combines the modulation symbols for the selected frequency subchannels to form a modulation symbol vector for each time slot, which is then provided to a respective modulator 222. The processing by each modulator 222 to generate a modulated signal is described below. In some other embodiments, TX MIMO processor 220d may include combiners and/or demultiplexers used to combine the modulation symbols and/or demultiplex the modulation symbols to their proper modulators 222.

5. MIMO Transmitter Unit with OFDM

Figure 3E:
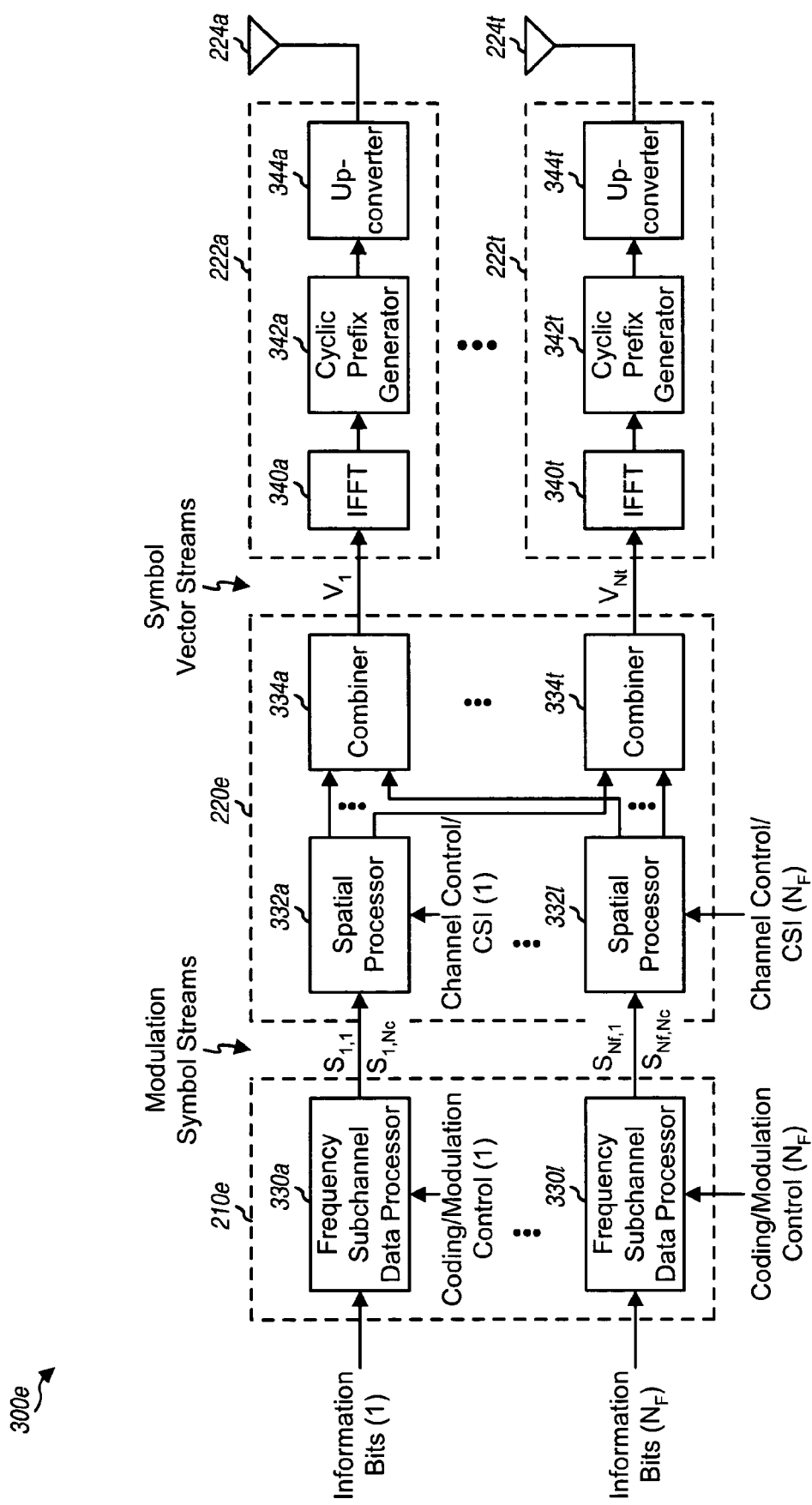
FIG. 3E is a block diagram of an embodiment of a transmitter unit capable of independently processing data for each frequency subchannel in OFDM.

FIG. 3E is a block diagram of an embodiment of a transmitter unit 300e, which utilizes OFDM and is capable of independently processing data for each frequency subchannel. Within a TX data processor 210e, the stream of information bits for each frequency subchannel used for data transmission is provided to a respective frequency subchannel data processor 330. Each data processor 330 processes data for a respective frequency subchannel of the OFDM system, and may be implemented similar to TX data processor 210a, 210b, or 210d, or with some other design. In one embodiment, data processor 330 demultiplexes the frequency subchannel data stream into a number of data substreams, one data substream for each spatial subchannel selected for use for the frequency subchannel. Each data substream is then encoded, interleaved, and symbol mapped to generate modulation symbols for the data substream. The coding and modulation for each frequency subchannel data stream or each data substream may be adjusted based on the coding and modulation control signals. Each data processor 330 provides up to $N_C$ modulation symbol streams for up to $N_C$ spatial subchannels selected for use for the frequency subchannel.

For a MIMO system utilizing OFDM, the modulation symbols may be transmitted on multiple frequency subchannels and from multiple transmit antennas. Within a TX MIMO processor 220e, the up to $N_C$ modulation symbol streams from each data processor 330 are provided to a respective spatial processor 332, which processes the received modulation symbols based on the channel control and/or the available CSI. Each spatial processor 332 may simply implement a demultiplexer (such as that shown in FIG. 3A) if full-CSI processing is not performed, or may implement a MIMO processor followed by a demultiplexer (such as that shown in FIG. 3C) if full-CSI processing is performed. For a MIMO system utilizing OFDM, the full-CSI processing (i.e., preconditioning) may be performed for each frequency subchannel.

Each spatial processor 332 demultiplexes the up to $N_C$ modulation symbols for each time slot into up to $N_T$ modulation symbols for the transmit antennas selected for use for that frequency subchannel. For each transmit antenna, a combiner 334 receives the modulation symbols for up to $N_F$ frequency subchannels selected for use for that transmit antenna, combines the symbols for each time slot into a modulation symbol vector V, and provides the modulation symbol vector to a respective modulator 222.

TX MIMO processor 220e thus receives and processes the modulation symbols to provide up to $N_T$ modulation symbol vectors, $V_1$ through $V_{N_T}$, one modulation symbol vector for each transmit antenna selected for use for data transmission. Each modulation symbol vector V covers a single time slot, and each element of the modulation symbol vector V is associated with a specific frequency subchannel having a unique subcarrier on which the modulation symbol is conveyed.

FIG. 3E also shows an embodiment of modulator 222 for OFDM. The modulation symbol vectors $V_1$ through $V_{N_T}$ from TX channel processor 220e are provided to modulators 222a through 222t, respectively. In the embodiment shown in FIG. 3E, each modulator 222 includes an inverse Fast Fourier Transform (IFFT) 340, a cyclic prefix generator 342, and an upconverter 344.

IFFT 340 converts each received modulation symbol vector into its time-domain representation (which is referred to as an OFDM symbol) using IFFT. IFFT 340 can be designed to perform the IFFT on any number of frequency subchannels (e.g., 8, 16, 32, ..., $N_F$). In an embodiment, for each modulation symbol vector converted to an OFDM symbol, cyclic prefix generator 342 repeats a portion of the time-domain representation of the OFDM symbol to form a "transmission symbol" for a specific transmit antenna. The cyclic prefix insures that the transmission symbol retains its orthogonal properties in the presence of multipath delay spread, thereby improving performance against deleterious path effects. The implementation of IFFT 340 and cyclic prefix generator 342 is known in the art and not described in detail herein.

The time-domain representations from each cyclic prefix generator 342 (i.e., the transmission symbols for each antenna) are then processed (e.g., converted into an analog signal, modulated, amplified, and filtered) by upconverter 344 to generate a modulated signal, which is then transmitted from a respective antenna 224.

An example MIMO system that utilizes OFDM is described in U.S. patent application Ser. No. 09/532,492, entitled "High Efficiency, High Performance Communication System Employing Multi-Carrier Modulation," filed Mar. 30, 2000, assigned to the assignee of the present invention and incorporated herein by reference. OFDM modulation is also described in a paper entitled "Multicarrier Modulation for Data Transmission: An Idea Whose Time Has Come," by John A. C. Bingham, IEEE Communications Magazine, May 1990, which is incorporated herein by reference.

FIGS. 3A-3E show some example coding and modulation schemes that may advantageously be used with full or partial CSI to provide improved performance (e.g., higher throughput). Some of these coding and modulation schemes are described in further detail in U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001; and U.S. patent application Ser. No. 09/854,235, entitled "Method and Apparatus for Processing Data in a Multiple-Input Multiple-Output (MIMO) Communication System Utilizing Channel State Information," filed May 11, 2001. Some other example coding and modulation schemes are described in U.S. patent application Ser. No. 09/776,075, entitled "Coding Scheme for a Wireless Communication System," filed Feb. 1, 2001. These applications are all assigned to the assignee of the present application and incorporated herein by reference. Still other coding and modulation schemes may also be used, and this is within the scope of the invention.

6. Operating Schemes

Various operating schemes may be used for a MIMO and/or an OFDM system that employs adaptive transmitter processing techniques described herein based on the available CSI. Some of these operating schemes are described below.

In one operating scheme, the coding and modulation scheme for each transmission channel is selected based on the channel's transmission capability, as indicated by the channel's available CSI (e.g., SNR). This scheme can provide improved performance, especially when used in combination with the successive cancellation receiver processing technique described below. When there is a large disparity between the worst-case and best-case transmission channels, the coding may be selected to introduce sufficient redundancy to allow the receiver unit to recover the original data stream. For example, the worst transmission channel may be associated with a poor SNR at the receiver output. The forward error correction (FEC) code may then be selected to be powerful enough to allow the symbols transmitted on the worst-case transmission channel to be correctly received at the receiver unit.

When the transmitter is provided with the SNR per recovered transmitted signal, a different coding and/or modulation scheme may be used for each transmitted signal. For example, a specific coding and modulation scheme may be selected for each transmitted signal based on its SNR so that the error rates associated with the transmitted signals are approximately equal. In this way, throughput for the transmitted signals are dictated by the their respective SNRs, and not by the SNR of the worst-case transmitted signal.

In another operating scheme, the transmitter is not provided with CSI for each transmission channel, but may be provided with a single value indicative of the average characteristics (e.g., the average SNR) for all transmission channels, or possibly some information indicating which transmit antennas to be used for data transmission. In this scheme, the transmitter may employ the same coding and modulation scheme on all transmit antennas used for data transmission, which may be a subset of the $N_T$ available transmit antennas.

If the same coding and modulation scheme is used for all or a number of transmitted signals, then the recovered transmitted signal with the worst SNR will have the highest decoded error rate. This may ultimately limit the performance of the MIMO system since the coding and modulation scheme is selected so that the error rate associated with the worst-case transmitted signal meets the overall error rate requirements. To improve efficiency, additional receive antennas may be used to provide improved error rate performance on the recovered transmitted signals. By employing more receive antennas than transmit antennas, the error rate performance of the first recovered transmitted signal has a diversity order of $(N_R-N_T+1)$ and reliability is increased.

In yet another operating scheme, the transmitted data streams are "cycled" across all available transmit antennas. This scheme improves the SNR statistics for each of the recovered transmitted signals since the transmitted data is not subjected to the worst-case transmission channel, but instead is subjected to all transmission channels. The decoder associated with a specific data stream is effectively presented with "soft decisions" that are representative of the average across all transmit-receive antenna pairs. This operating scheme is described in further detail in European Patent Application Serial No. 99302692.1, entitled "Wireless Communications System Having a Space-Time Architecture Employing Multi-Element Antennas at both the Transmitter and Receiver," and incorporated herein by reference.

7. Transmit Antennas

The set of transmit antennas at a base station may be a physically distinct set of "apertures", each of which may be used to directly transmit a respective data stream. Each aperture may be formed by a collection of one or more antenna elements that are distributed in space (e.g., physically located at a single site or distributed over multiple sites). Alternatively, the antenna apertures may be preceded by one or more (fixed) beam-forming matrices, with each matrix being used to synthesize a different set of antenna beams from the set of apertures. In this case, the above description for the transmit antennas applies analogously to the transformed antenna beams.

A number of fixed beam-forming matrices may be defined in advance, and the terminals may evaluate the post-processed SNRs for each of the possible matrices (or sets of antenna beams) and send SNR vectors back to the base station. Different performance (i.e., post-processed SNRs) is typically achieved for different sets of transformed antenna beams, and this is reflected in the reported SNR vectors. The base station may then perform scheduling and antenna assignment for each of the possible beam-forming matrices (using the reported SNR vectors), and select a particular beam-forming matrix as well as a set of terminals and their antenna assignments that achieve the best use of the available resources.

The use of beam-forming matrices affords additional flexibility in scheduling terminals and may further provide improved performance. As examples, the following situations may be well-suited for beam-forming transformations:

Correlation in the MIMO channel is high so that the best performance may be achieved with a small number of data streams. However, transmitting with only a subset of the available transmit antennas (and using only their associated transmit amplifiers) results in a smaller total transmit power. A transformation may be selected to use most or all of the transmit antennas (and their amplifiers) for the data streams to be sent. In this case, higher transmit power is achieved for the transmitted data streams.

Physically dispersed terminals may be isolated somewhat by their locations. In this case, the terminals may be served by a standard FFT-type transformation of horizontally spaced apertures into a set of beams pointed at different azimuths.

III. Receiver Unit

An aspect of the invention provides techniques to process the received signals in a MIMO system to recover the transmitted data, and to estimate the characteristics of the MIMO channel. CSI indicative of the estimated channel characteristics may then be reported back to the transmitter unit and used to adjust the signal processing (e.g., coding, modulation, and so on). In this manner, high performance is achieved based on the determined channel conditions.

If the number of receive antennas is equal to or exceeds the number of transmit antennas (i.e., $N_R \geq N_T$), then several receiver processing techniques may be used for single-user and multi-user MIMO modes. These receiver processing techniques may be grouped into two primary categories:

spatial and space-time receiver processing techniques (also referred to as equalization techniques), and "successive nulling/equalization and interference cancellation" receiver processing technique (or simply, "successive cancellation" receiver processing technique).

In general, the spatial and space-time receiver processing techniques attempt to separate out the transmitted signals at the receiver unit, and each separated transmitted signal may further be processed to recover the data included in the signal. The successive cancellation receiver processing technique attempts to recover the transmitted signals, one at a time, and to cancel the interference due to each recovered signal such that later recovered signals experience less interference and higher SNR. Successive cancellation receiver processing technique generally outperforms (i.e., have greater throughput) spatial/space-time receiver processing techniques.

The use of the successive cancellation receiver processing technique may be limited to certain situations. In particular, interference cancellation is effective only if the interference due to a recovered signal can be accurately estimated, which requires error free detection (i.e., demodulation and decoding) of the recovered signal.

On the downlink, if the single-user MIMO mode is used and the terminal is equipped with multiple receive antennas, then the successive cancellation receiver processing technique may be used. If the multi-user MIMO mode is used, a MIMO-capable terminal may use a spatial/space-time receiver processing technique (i.e., no successive cancellation). This is because the MIMO capable terminal may not be able to recover a transmitted signal that is intended for another terminal (since the coding and modulation scheme selected for this transmitted signal may be based on the other terminal's post-processed SNR) and thus may not be able to cancel the interference from this transmitted signal.

One simplification for the downlink is to have all terminals use spatial/space-time receiver processing techniques when the multi-user MIMO mode is employed. The post-processed SNR derived at the terminals for each transmitted signal may be reported to the base station, which may then use the information to more optimally schedule terminals for data transmission, to assign transmit antennas to the terminals, and properly code and modulate data.

On the uplink, a single receiver unit at the base station recovers the signal transmitted from one or multiple terminals, and the successive cancellation receiver processing technique may generally be used for both single-user and multi-user MIMO modes. In the single-user MIMO mode, the base station receiver unit derives the post-processed SNR for each transmitted signal, and this information may be used for scheduling and coding and modulation. In the multi-user MIMO mode, the base station receiver unit may derive the post-processed SNRs for active terminals (i.e., those desiring data transmission), and this information may be used to select the best set of terminals for data transmission as well as the coding and modulation scheme to be used for each transmit antenna.

Different receiver processing techniques may be used depending on the characteristics of the MIMO channel, which may be characterized as either non-dispersive or dispersive. A non-dispersive MIMO channel experiences flat fading (i.e., approximately equal amount of attenuation across the system bandwidth), whereas a dispersive MIMO channel experiences frequency-selective fading (e.g., different amounts of attenuation across the system bandwidth).

For a non-dispersive MIMO channel, linear spatial processing techniques such as a channel correlation matrix inversion (CCMI) technique, a minimum mean square error (MMSE) technique, and a full-CSI technique, all of which are described in further detail below, may be used to process the received signals prior to demodulation and decoding. Other receiver processing techniques may also be used and are within the scope of the invention. These spatial processing techniques may be employed at the receiver unit to null out the undesired signals, or to maximize the received SNR of each of the constituent signals in the presence of noise and interference from the other signals. The ability to effectively null undesired signals or optimize the SNRs depends upon the correlation in the channel coefficient matrix $\underline{H}$ that describes the channel response between the transmit and receive antennas.

For a dispersive MIMO channel, time dispersion in the channel introduces inter-symbol interference (ISI). To improve performance, a receiver unit attempting to recover a particular transmitted data stream would need to ameliorate both the "crosstalk" from the other transmitted signals as well as the inter-symbol interference from all of the transmitted signals. To deal with crosstalk and inter-symbol interference, the spatial processing (which handles crosstalk well but does not effectively deal with inter-symbol interference) may be replaced with space-time processing.

In one embodiment, a MMSE linear equalizer (MMSE-LE) may be used for the space-time processing for a dispersive channel. With the MMSE-LE technique, the space-time processing assumes a similar form as the spatial processing for the non-dispersive channel. However, each "filter tap" in the spatial processor includes more than one tap, as described in further detail below. The MMSE-LE technique is most effective for use in space-time processing when the channel estimates (i.e., the channel coefficient matrix $\underline{H}$) are accurate.

In another embodiment, a decision feedback equalizer (DFE) may be used for the space-time processing. The DFE is a non-linear equalizer that is effective for channels with severe amplitude distortion and uses decision feedback to cancel interference from symbols that have already been detected. If the data stream can be decoded without errors (or with minimal errors), then the inter-symbol interference generated by the modulation symbols corresponding to the decoded data bits may be effectively canceled.

In yet another embodiment, a maximum-likelihood sequence estimator (MLSE) may be used for the space-time processing.

The DFE and MLSE techniques may reduce or possibly eliminate the degradation in performance when the channel estimates are not as accurate. The DFE and MLSE techniques are described in further detail by S. L. Ariyavistakul et al. in a paper entitled "Optimum Space-Time Processors with Dispersive Interference: Unified Analysis and Required Filter Span," IEEE Trans. on Communication, Vol. 7, No. 7, July 1999, and incorporated herein by reference.

Figure 4A:
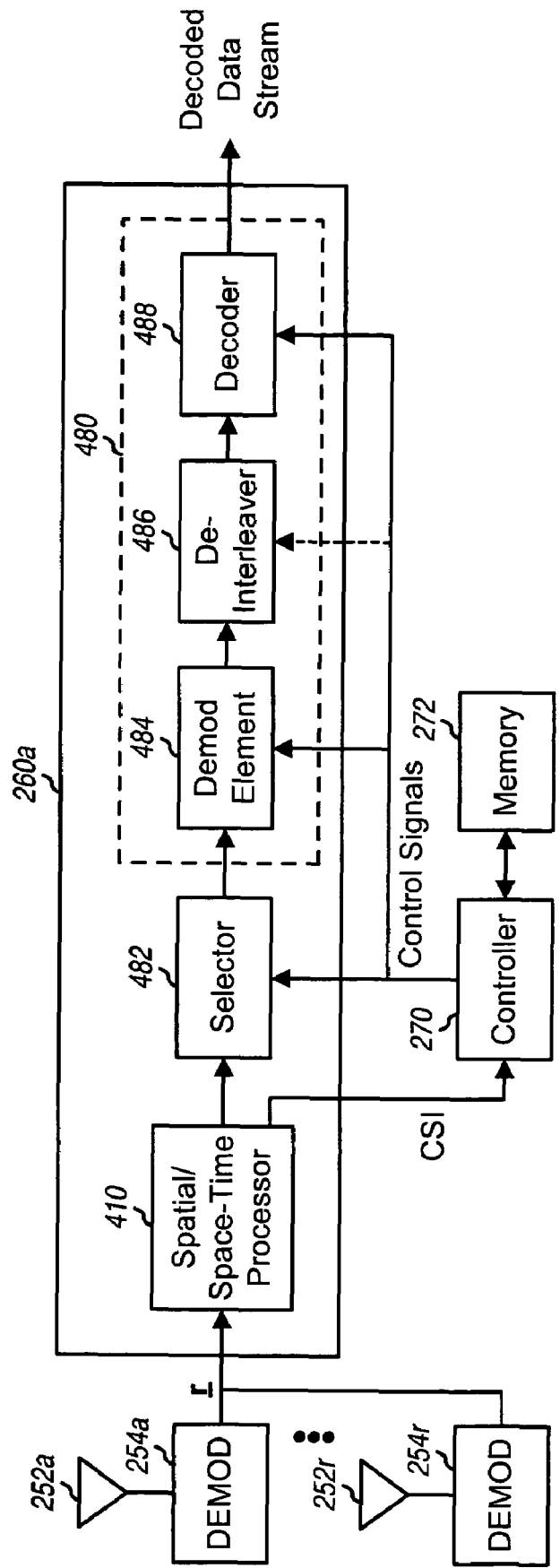
FIG. 4A is a block diagram of an embodiment of a RX MIMO/data processor within a receiver unit.

FIG. 4A is a block diagram of an embodiment of a RX MIMO/data processor 260a, which is one embodiment of the receiver portion of base station 104 or terminal 106 in FIGS. 2A and 2B. The transmitted signals from (up to) $N_T$ transmit antennas are received by each of $N_R$ antennas 252a through 252r and routed to a respective demodulator 254 (which is also referred to as a front-end processor). Each demodulator 254 conditions (e.g., filters and amplifies) a respective received signal, downconverts the conditioned signal to an intermediate frequency or baseband, and digitizes the downconverted signal to provide data samples. Each demodulator 254 may further demodulate the data samples with a recovered pilot to generate a stream of received modulation symbols, which is provided to a spatial/space-time processor 410.

If OFDM is employed for the data transmission, each demodulator 254 further performs processing complementary to that performed by modulator 222 shown in FIG. 3E. In this case, each demodulator 254 includes an FFT processor (not shown) that generates transformed representations of the data samples and provides a stream of modulation symbol vectors. Each vector includes $N_F$ modulation symbols for $N_F$ frequency subchannels, and one vector is provided for each time slot. The modulation symbol vector streams from the FFT processors of all $N_R$ demodulators are then provided to a demultiplexer/combiner (not shown in FIG. 4A), which first "channelizes" the modulation symbol vector stream from each FFT processor into a number of (up to $N_F$) modulation symbol streams. For a transmit processing scheme in which each frequency subchannel is independently processed, the demultiplexer/combiner provides each of the (up to) $N_F$ modulation symbol streams to a respective spatial/space-time processor 410.

For a MIMO system not utilizing OFDM, one spatial/space-time processor 410 may be used to perform the MIMO processing for the modulation symbols from the $N_R$ received antennas. And for a MIMO system utilizing OFDM, one spatial/space-time processor 410 may be used to perform the MIMO processing for the modulation symbols from the $N_R$ received antennas for each of the $N_F$ frequency subchannels used for data transmission. Alternatively, one spatial/space-time processor 410 may be used to perform the MIMO processing for the modulation symbols for all $N_F$ frequency subchannels, e.g., in a time-multiplexed manner.

1. CCMI Technique (Spatial Processing)

In a MIMO system with $N_T$ transmit antennas and $N_R$ receive antennas, the received signals at the output of the $N_R$ receive antennas may be expressed as:

$$\underline{r} = \underline{H}\underline{x} + \underline{n}, \quad \text{Eq (6)}$$

where $\underline{r}$ is the received symbol vector (i.e., the $N_R \times 1$ vector output from the MIMO channel, as measured at the receive antennas), $\underline{H}$ is the $N_R \times N_T$ channel coefficient matrix that gives the channel response for the $N_T$ transmit antennas and $N_R$ receive antennas at a specific time, $\underline{x}$ is the transmitted symbol vector (i.e., the $N_T \times 1$ vector input into the MIMO channel), and $\underline{n}$ is an $N_R \times 1$ vector representing noise plus interference. The received symbol vector $\underline{r}$ includes $N_R$ modulation symbols for $N_R$ signals received via $N_R$ receive antennas at a specific time slot. Similarly, the transmitted symbol vector $\underline{x}$ includes $N_T$ modulation symbols in $N_T$ signals transmitted via $N_T$ transmit antennas at a specific time slot.

For the CCMI spatial processing technique, the receiver unit first performs a channel matched filter operation on the received symbol vector $\underline{r}$. The filtered output can be expressed as:

$$\underline{H}^H \underline{r} = \underline{H}^H \underline{H} \underline{x} + \underline{H}^H \underline{n}, \quad \text{Eq (7)}$$

where the superscript "$H$" represents transpose and complex conjugate. A square matrix $\underline{R}$ may be used to denote the product of the channel coefficient matrix $\underline{H}$ with its conjugate-transpose $\underline{H}^H$ (i.e., $\underline{R} = \underline{H}^H \underline{H}$).

The channel coefficient matrix $\underline{H}$ may be derived, for example, from pilot data transmitted along with traffic data. In order to perform "optimal" reception and to estimate the SNR of the transmission channels, it is often convenient to insert known pilot data (e.g., a sequence of all ones) into the transmit data stream and to transmit the pilot data over one or more transmission channels. Methods for estimating a single transmission channel based on a pilot signal and/or a data transmission may be found in a number of papers available in the art. One such channel estimation method is described by F. Ling in a paper entitled "Optimal Reception, Performance Bound, and Cutoff-Rate Analysis of References-Assisted Coherent CDMA Communications with Applications," IEEE Transaction On Communication, October 1999. This or some other channel estimation techniques may be extended to matrix form to derive the channel coefficient matrix $\underline{H}$.

An estimate of the transmitted symbol vector, $\hat{\underline{x}}$, may be obtained by pre-multiplying the match filtered vector $\underline{H}^H \underline{r}$ with the inverse (or pseudo-inverse) of the square matrix $\underline{R}$, which can be expressed as:

$$\begin{aligned}
\hat{\underline{x}} &= \underline{R}^{-1} \underline{H}^H \underline{r} \\
&= \underline{x} + \underline{R}^{-1} \underline{H}^H \underline{n} \\
&= \underline{x} + \underline{n}'.
\end{aligned} \quad \text{Eq (8)}$$

From the above equations, it can be observed that the transmitted symbol vector $\underline{x}$ may be recovered by matched filtering (i.e., pre-multiplying with the matrix $\underline{H}^H$) the received symbol vector $\underline{r}$ and then pre-multiplying the filtered result with the inverse square matrix $\underline{R}^{-1}$.

The SNR of the transmission channels may be determined as follows. An autocorrelation matrix $\underline{\phi}_{nn}$ of the noise vector $\underline{n}$ is first computed from the received signals. In general, $\underline{\phi}_{nn}$ is a Hermitian matrix, i.e., it is complex-conjugate-symmetric. If the components of the channel noise are uncorrelated and further independent and identically distributed (iid), the autocorrelation matrix $\underline{\phi}_{nn}$ of the noise vector $\underline{n}$ can be expressed as:

$$\begin{aligned}
\underline{\phi}_{nn} &= \sigma_n^2 \underline{I}, \text{ and} \\
\underline{\phi}_{nn}^{-1} &= \frac{1}{\sigma_n^2} \underline{I},
\end{aligned} \quad \text{Eq (9)}$$

where $\underline{I}$ is the identity matrix (i.e., ones along the diagonal and zeros otherwise) and $\sigma_n^2$ is the noise variance of the received signals. The autocorrelation matrix $\underline{\phi}_{n'n'}$ of the post-processed noise vector $\underline{n}'$ (i.e., after the matched filtering and pre-multiplication with the matrix $\underline{R}^{-1}$) can be expressed as:

$$\begin{aligned}
\underline{\phi}_{n'n'} &= E[\underline{n}' \underline{n}'^H] \\
&= \sigma_n^2 \underline{R}^{-1}.
\end{aligned} \quad \text{Eq (10)}$$

From equation (10), the noise variance a $\sigma_{n'}^2$ of the i-th element of the post-processed noise $\underline{n}'$ is equal to $\sigma_n^2 \check{r}_{ii}$, where $\check{r}_{ii}$ is the i-th diagonal element of $\underline{R}^{-1}$. For a MIMO system not utilizing OFDM, the i-th element is representative of the i-th receive antenna. And if OFDM is utilized, then the subscript "i" may be decomposed into a subscript "jk", where "j" represents the j-th spatial subchannel and "k" represents the k-th frequency subchannel.

For the CCMI technique, the SNR of the i-th element of the received symbol vector after processing (i.e., the i-th element of $\hat{\underline{x}}$) can be expressed as:

$$SNR_i = \frac{\overline{|\hat{x}_i|^2}}{\sigma_{\hat{n}}^2}. \quad \text{Eq (11)}$$

If the variance of the i-th transmitted symbol $\overline{|\hat{x}_i|^2}$ is equal to one (1.0) on the average, then the SNR of the receive symbol vector may be expressed as:

$$SNR_i = \frac{1}{\check{r}_{ii} \sigma_n^2}.$$

The noise variance may be normalized by scaling the i-th element of the received symbol vector by $1/\sqrt{\check{r}_{ii}}$.

If a modulation symbol stream was duplicated and transmitted over multiple transmit antennas, then these modulation symbols may be summed together to form combined modulation symbols. For example, if a data stream was transmitted from all antennas, then the modulation symbols corresponding to all $N_T$ transmit antennas are summed, and the combined modulation symbol may be expressed as:

$$\hat{x}_{total} = \sum_{i=1}^{N_T} \frac{\hat{x}_i}{\check{r}_{ii}}. \quad \text{Eq (12)}$$

Alternatively, the transmitter unit may be operated to transmit one or more data streams on a number of transmission channels using the same coding and modulation scheme on some or all transmit antennas. In this case, only one SNR (e.g., an average SNR) may be needed for all transmission channels for which the common coding and modulation scheme is applied. For example, if the same coding and modulation scheme is applied on all transmit antennas (e.g., using selective channel inversion), then the SNR of the combined modulation symbol, $SNR_{total}$, can be derived. This $SNR_{total}$ would then have a maximal combined SNR that is equal to the sum of the SNRs of the signals from the $N_R$ receive antennas. The combined SNR may be expressed as:

$$SNR_{total} = \sum_{i=1}^{N_T} SNR_i = \frac{1}{\sigma_n^2} \sum_{i=1}^{N_T} \frac{1}{r_{ii}}. \qquad \text{Eq (13)}$$

Figure 4B:
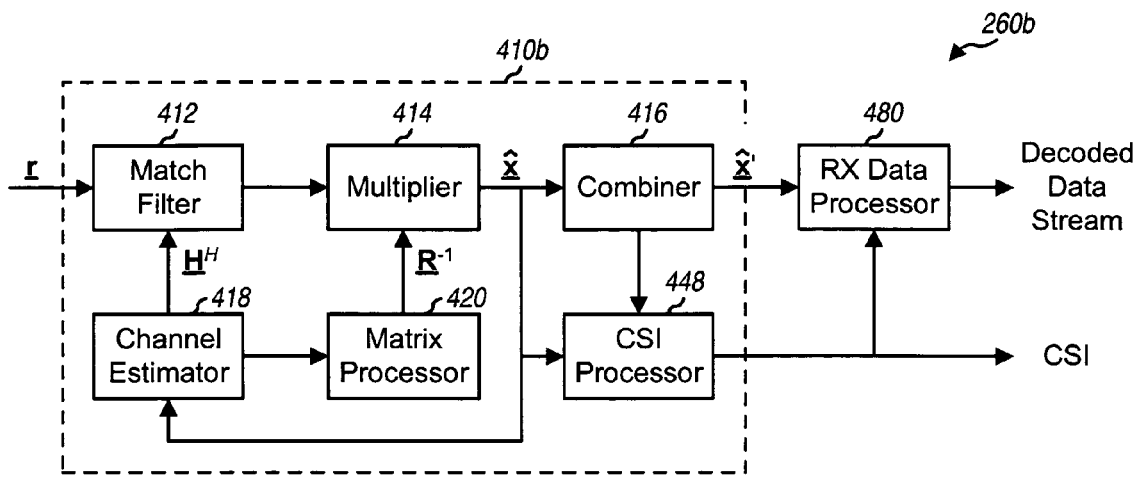
FIGS. 4B, 4C, 4D, and 4E are block diagrams of four embodiments of a spatial/space-time processor capable of implementing the CCMI technique, the MMSE technique, the DFE technique, and the successive cancellation receiver processing technique, respectively.

FIG. 4B is a block diagram of an embodiment of a spatial/space-time processor 410b, which is capable of implementing the CCMI technique. Within spatial/space-time processor 410b, the stream of received modulation symbol vectors $\underline{r}$ from the $N_R$ receive antennas are provided to and filtered by a match filter 412, which pre-multiplies each vector $\underline{r}$ with the conjugate-transpose channel coefficient matrix $\underline{H}^H$, as shown above in equation (7). The filtered vectors are further pre-multiplied by a multiplier 414 with the inverse square matrix $\underline{R}^{-1}$ to form an estimate $\hat{\underline{x}}$ of the transmitted modulation symbol vector $\underline{x}$, as shown above in equation (8).

The estimated modulation symbols $\hat{\underline{x}}$ are provided to a channel estimator 418 that estimates the channel coefficient matrix $\underline{H}$ (e.g., based on pilot signals similar to conventional pilot-assisted single and multi-carrier systems, as is known in the art). In general, the channel coefficient matrix $\underline{H}$ may be estimated based on the modulation symbols corresponding to the pilot data or traffic data or both. The channel coefficient matrix $\underline{H}$ is then provided to a matrix processor 420 that derives the square matrix $\underline{R}$ according to $\underline{R}=\underline{H}^H\underline{H}$ as described above.

The estimated modulation symbols $\hat{\underline{x}}$ and/or combined modulation symbols $\hat{\underline{x}}'$ are also provided to a CSI processor 448, which determines full or partial CSI for the transmission channels. For example, CSI processor 448 may estimate a noise covariance matrix $\phi_{nn}$ of the i-th transmission channel based on the received pilot signal and then compute the SNR. The SNR for the transmission channels comprises the partial CSI that may be reported back to the transmitter unit.

For certain transmit processing schemes, the symbol streams from all or a number of antennas used for the transmission of a data stream may be provided to a combiner 416, which combines redundant information across time, space, and frequency. The combined modulation symbols $\hat{\underline{x}}'$ are then provided to RX data processor 480. For some other communication modes, the estimated modulation symbols $\hat{\underline{x}}$ may be provided directly to RX data processor 480 (not shown in FIG. 4B).

Spatial/space-time processor 410 thus generates one or more independent symbol streams corresponding to one or more transmitted data streams. Each symbol stream includes post-processed modulation symbols, which correspond to and are estimates of the modulation symbols prior to the full/partial-CSI processing at the transmitter unit. The (post-processed) symbol streams are then provided to RX data processor 480.

FIG. 4A shows an embodiment of RX data processor 480. In this embodiment, a selector 482 receives one or more symbol streams from spatial/space-time processor 410 and extracts the modulation symbols corresponding to the desired data stream to be recovered. In an alternative embodiment, RX data processor 480 is provided with the modulation symbol stream corresponding to the desired data stream and the modulation symbol extraction may be performed by combiner 416 within spatial/space-time processor 410. In any case, the stream of extracted modulation symbols is provided to a demodulation element 484.

For an embodiment in which the data stream for each transmission channel is independently coded and modulated (e.g., based on the channel's SNR), the recovered modulation symbols for the selected transmission channel are demodulated in accordance with a demodulation scheme (e.g., M-PSK, M-QAM) that is complementary to the modulation scheme used for the transmission channel. The demodulated data from demodulation element 484 is then de-interleaved by a de-interleaver 486 in a manner complementary to that performed at the transmitter unit, and the de-interleaved data is further decoded by a decoder 488 in a manner complementary to that performed at the transmitter unit. For example, a Turbo decoder or a Viterbi decoder may be used for decoder 488 if Turbo or convolutional coding, respectively, is performed at the transmitter unit. The decoded data stream from decoder 488 represents an estimate of the transmitted data stream being recovered.

2. MMSE Technique (Spatial Processing)

For the MMSE technique, the receiver unit performs a pre-multiplication of the received symbol vector $\underline{r}$ with a matrix $\underline{M}$ to derive an initial MMSE estimate $\tilde{\underline{x}}$ of the transmitted symbol vector $\underline{x}$, which can be expressed as:

$$\tilde{\underline{x}} = \underline{M}\underline{r}. \qquad \text{Eq (14)}$$

The matrix $\underline{M}$ is selected such that the mean square error of an error vector $\underline{e}$ between the initial MMSE estimate $\tilde{\underline{x}}$ and the transmitted symbol vector $\underline{x}$ (i.e., $\underline{e}=\tilde{\underline{x}}-\underline{x}$) is minimized. The matrix $\underline{M}$ can be expressed as:

$$\underline{M}=\underline{H}^H(\underline{H}\underline{H}^H+\phi_{nn})^{-1}. \qquad \text{Eq (15)}$$

Based on equations (14) and (15), the initial MMSE estimate $\tilde{\underline{x}}$ of the transmitted symbol vector $\underline{x}$ can be determined as:

$$\tilde{\underline{x}} = \underline{M}\underline{r} \qquad \text{Eq (16)}$$
$$= \underline{H}^H(\underline{H}\underline{H}^H+\phi_{nn})^{-1}\underline{r}.$$

An unbiased minimum mean square error estimate of $\underline{x}$, $\hat{\underline{x}}$, can be obtained by pre-multiplying the initial estimate $\tilde{\underline{x}}$ by a diagonal matrix $\underline{D}_v^{-1}$, as follows:

$$\hat{\underline{x}} = \underline{D}_v^{-1}\tilde{\underline{x}}, \qquad \text{Eq (17)}$$

where $$\underline{D}_v^{-1} = \text{diag}(1/v_{11}, 1/v_{22}, \ldots, 1/v_{N_R N_R}),$$

and $v_{ii}$ are the diagonal elements of a matrix $\underline{V}$ that can be expressed as:

$$\underline{V}=\underline{H}^H\phi_{nn}^{-1}\underline{H}(\underline{I}+\underline{H}^H\phi_{nn}^{-1}\underline{H})^{-1}.$$

The SNR of the received symbol vector after processing (i.e., the i-th element of $\hat{\underline{x}}$) can be expressed as:

$$SNR_i = \frac{E[|x_i|^2]}{u_{ii}}, \qquad \text{Eq (18)}$$

where $u_{ii}$ is the variance of the i-th element of an error vector $\underline{\hat{e}}$, which is defined as $\underline{\hat{e}} = \underline{x} - \underline{\hat{x}}$, and the matrix $\underline{U}$ can be expressed as:

$$\underline{U} = \underline{I} - \underline{D}_V^{-1}\underline{V} - \underline{V}\underline{D}_V^{-1} + \underline{D}_V^{-1}\underline{V}\underline{D}_V^{-1}. \qquad \text{Eq (19)}$$

If the variance, $\overline{|x_i|^2}$, of the i-th transmitted symbol, $x_i$, is equal to one (1.0) on the average, and from equation (19)

$$u_{ii} = \frac{1}{v_{ii}} - 1,$$

the SNR of for the receive symbol vector may be expressed as:

$$SNR_i = \frac{v_{ii}}{1 - v_{ii}}. \qquad \text{Eq (20)}$$

The estimated modulation symbols, $\underline{\hat{x}}$, may be combined to obtain combined modulation symbols $\underline{\hat{x}}'$, as described above for the CCMI technique.

Figure 4C:
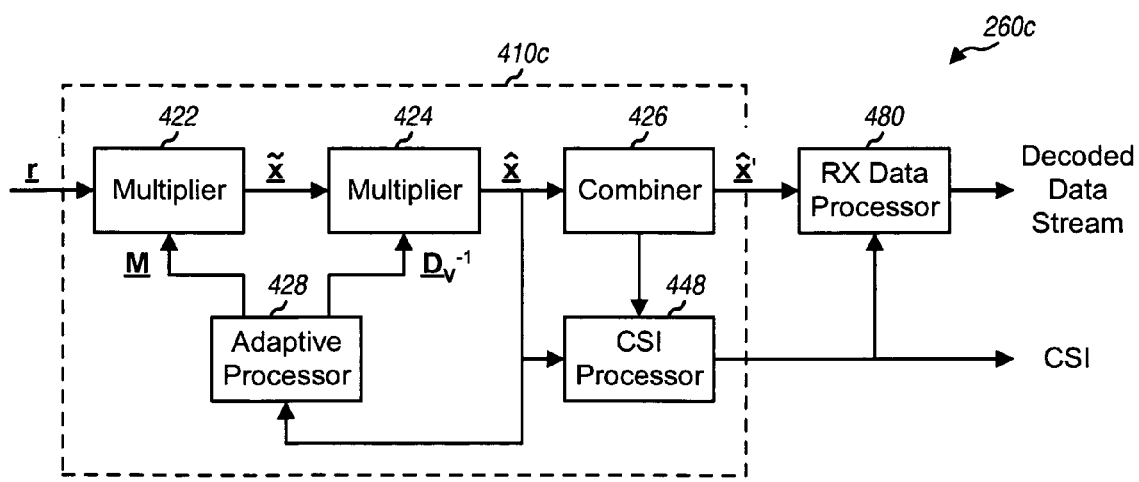

FIG. 4C shows an embodiment of a spatial/space-time processor 410c, which is capable of implementing the MMSE technique. Similar to the CCMI technique, the matrices $\underline{H}$ and $\underline{\phi}_{nn}$ may first be estimated based on the received pilot signals and/or data transmissions. The weighting coefficient matrix $\underline{M}$ is then computed according to equation (15).

Within spatial/space-time processor 410c, the stream of received modulation symbol vectors $\underline{r}$ from the $N_R$ receive antennas are pre-multiplied by a multiplier 422 with the matrix $\underline{M}$ to form an initial estimate $\underline{\tilde{x}}$ of the transmitted symbol vector $\underline{x}$, as shown above in equation (16). The initial estimate $\underline{\tilde{x}}$ is further pre-multiplied by a multiplier 424 with the diagonal matrix $\underline{D}_v^{-1}$ to form an unbiased estimate $\underline{\hat{x}}$ of the transmitted symbol vector $\underline{x}$, as shown above in equation (17).

Again, for certain transmit processing schemes, a number of streams of estimated modulation symbols $\underline{\hat{x}}$ corresponding to a number of transmit antennas used for transmitting a data stream may be provided to a combiner 426, which combines redundant information across time, space, and frequency. The combined modulation symbols $\underline{\hat{x}}'$ are then provided to RX data processor 480. And for some other transmit processing schemes, the estimated modulation symbols $\underline{\hat{x}}$ may be provided directly to RX data processor 480. RX data processor 480 demodulates, de-interleaves, and decodes the modulation symbol stream corresponding to the data stream being recovered, as described above.

The estimated modulation symbols $\underline{\hat{x}}$ and/or the combined modulation symbols $\underline{\hat{x}}'$ are also provided to CSI processor 448, which determines full or partial CSI for the transmission channels. For example, CSI processor 448 may estimate the SNR of the i-th transmitted signal according to equations (18) through (20). The SNRs for the transmitted signals comprise the partial CSI that is reported back to the transmitter unit.

The estimated modulation symbols $\underline{\hat{x}}$ are further provided to an adaptive processor 428 that derives the matrix $\underline{M}$ and the diagonal matrix $\underline{D}_v^{-1}$ based on equation (15) and (17), respectively.

3. MMSE-LE Technique (Space-Time Processing)

A number of space-time processing techniques may be used to process the signals received via a time-dispersive channel. These techniques include the use of time domain channel equalization techniques such as MMSE-LE, DFE, MLSE, and possibly other techniques, in conjunction with the spatial processing techniques described above for a non-dispersive channel. The space-time processing is performed within RX MIMO/data processor 260 on the $N_R$ input signals.

In the presence of time dispersion, the channel coefficient matrix $\underline{H}$ takes on a delay dimension, and each element of the matrix $\underline{H}$ behaves as a linear transfer function instead of a coefficient. In this case, the channel coefficient matrix $\underline{H}$ can be written in the form of a channel transfer function matrix $\underline{H}(\tau)$, which can be expressed as:

$$\underline{H}(\tau) = \{h_{ij}(\tau)\} \text{ for } 1 \leq i \leq N_R, \text{ and } 1 \leq j \leq N_T, \qquad \text{Eq (21)}$$

where $h_{ij}(\tau)$ is the linear transfer function from the j-th transmit antenna to the i-th receive antenna. As a result of the linear transfer functions $h_{ij}(\tau)$, the received signal vector $\underline{r}(t)$ is a convolution of the channel transfer function matrix $\underline{H}(\tau)$ with the transmitted signal vector $\underline{x}(t)$, which can be expressed as:

$$\underline{r}(t) = \int \underline{H}(\tau)\underline{x}(t-\tau)d_\tau. \qquad \text{Eq (22)}$$

As part of the demodulation function (performed by demodulators 254 in FIG. 4A), the received signals are sampled to provide received samples. Without loss of generality, the time-dispersive channel and the received signals can be represented in a discrete-time representation in the following description. First, the channel transfer function vector $\underline{h}_j(k)$ associated with the j-th transmit antenna at delay k can be expressed as:

$$\underline{h}_j(k) = [h_{1j}(k) h_{2j}(k) \ldots h_{N_R j}(k)]^T \text{ for } 0 \leq k \leq L, \qquad \text{Eq (23)}$$

where $h_{ij}(k)$ is the k-th tap weight of the channel transfer function associated with the path between the j-th transmit antenna and the i-th receive antenna, and L is the maximum extent (in sample intervals) of the channel time dispersion. Next, the $N_R \times N_T$ channel transfer function matrix at delay k can be expressed as:

$$\underline{H}(k) = [\underline{h}_1(k)\underline{h}_2(k) \ldots \underline{h}_{N_T}(k)] \text{ for } 0 \leq k \leq L. \qquad \text{Eq (24)}$$

The received signal vector $\underline{r}(n)$ at sample time n can then be expressed as:

$$\underline{r}(n) = \sum_{k=0}^{L} \underline{H}(k)\underline{x}(n-k) + \underline{n}(n) = \underline{H}\underline{x}(n) + \underline{n}(n), \qquad \text{Eq (25)}$$

where $\underline{H}$ is an $N_R \times (L+1)N_T$ block-structured matrix that represents the sampled channel matrix transfer function $\underline{H}(k)$, and can be represented as:

$$\underline{H} = [\underline{H}(0)\underline{H}(1) \ldots \underline{H}(L)],$$

and $\underline{x}(n)$ is a sequence of L+1 vectors of received samples captured for L+1 sample intervals, with each vector comprising $N_R$ samples for the $N_R$ received antennas, and can be represented as:

$$\underline{x}(n) = \begin{bmatrix} \underline{x}(n) \\ \underline{x}(n-1) \\ \vdots \\ \underline{x}(n-L) \end{bmatrix}.$$

An initial estimate of the transmitted symbol vector, $\underline{\tilde{x}}(n)$, at time n may be derived by performing a convolution of the sequence of received signal vectors $\underline{r}(n)$ with the sequence of $2K+1$, $N_R \times N_T$ weight matrices $\underline{M}(k)$, as follows:

$$\underline{\tilde{x}}(n) = \sum_{k=-K}^{K} \underline{M}(k) \underline{r}(n-k) = \underline{\underline{M}}\, \underline{r}(n), \quad \text{Eq (26)}$$

where $\underline{\underline{M}} = [\underline{M}(-K) \ldots \underline{M}(0) \ldots \underline{M}(K)]$, K is a parameter that determines the delay-extent of the equalizer filter, and $$\underline{r}(n) = \begin{bmatrix} \underline{r}(n+K) \\ \vdots \\ \underline{r}(n) \\ \vdots \\ \underline{r}(n-K) \end{bmatrix}.$$

The sequence of weight matrices $\underline{M}(k)$ is selected to minimize the mean-square error.

The MMSE solution can then be stated as the sequence of weight matrices $\underline{M}(k)$ that satisfy the linear constraints:

$$\sum_{k=-K}^{K} \underline{M}(k) \underline{R}(k-\ell) = \begin{cases} 0, & -K \le \ell < -L \\ \underline{H}^H(-\ell), & -L \le \ell \le 0 \\ 0, & 0 < \ell \le K \end{cases} \quad \text{Eq (27)}$$

where $\underline{R}(k)$ is a sequence of $N_R \times N_R$ space-time correlation matrices, which can be expressed as:

$$\underline{R}(k) = E\{\underline{r}(n-k)\underline{r}^H(n)\} = \begin{cases} \sum_{m=\max(0,-k)}^{\min(L,L-k)} \underline{H}(m)\underline{H}^H(m+k) + \underline{\varphi}_{nn}(k), & -L \le k \le L \\ \underline{\varphi}_{zz}(k), & \text{otherwise} \end{cases} \quad \text{Eq (28)}$$

where $\underline{\varphi}_{nn}(k)$ is the noise autocorrelation function, which can be expressed as:

$$\underline{\varphi}_{nn}(k) = E\{\underline{n}(l-k)\underline{n}^H(l)\}. \quad \text{Eq (29)}$$

For white (temporally uncorrelated) noise, $\underline{\varphi}_{nn}(k) = \underline{\varphi}_{nn}\delta(k)$, where $\underline{\varphi}_{nn}$ in this case represents only the spatial correlation matrix. For spatially and temporally uncorrelated noise with equal power at each receive antenna, $\underline{\varphi}_{nn}(k) = \sigma^2\underline{I}\delta(k)$.

Equation (27) can further be represented as:

$$\underline{\underline{M}}\,\underline{\underline{R}} = \underline{\tilde{H}}^H, \text{ or } \underline{\underline{M}} = \underline{\tilde{H}}^H\underline{\underline{R}}^{-1}, \quad \text{Eq (30)}$$

where $\underline{\underline{R}}$ is block-Toeplitz with block j,k given by $\underline{R}(j-k)$ and $$\underline{\tilde{H}} = \begin{bmatrix} \underline{0}_{(K-L)N_R \times N_T} \\ \underline{H}(L) \\ \underline{H}(L-1) \\ \vdots \\ \underline{H}(0) \\ \underline{0}_{K,N_R \times N_T} \end{bmatrix},$$

where $\underline{0}_{m \times n}$ is an m×n matrix of zeros.

An unbiased MMSE-LE estimate $\underline{\hat{x}}(n)$ of the transmitted signal vector at time n can be expressed as:

$$\underline{\hat{x}}(n) = \underline{D}_v^{-1}\underline{\tilde{x}}(n) = \underline{D}_v^{-1}\underline{\underline{M}}\,\underline{r}(n), \quad \text{Eq (31)}$$

where $$\underline{D}_v^{-1} = \text{diag}(1/v_{11}, 1/v_{22}, \ldots, 1/v_{N_T N_T}), \quad \text{Eq (32)}$$

where $v_{ii}$ is the i-th diagonal element of a matrix $\underline{V}$ ($v_{ii}$ is a scalar), which can be expressed as:

$$\underline{V} = \underline{\underline{M}}\,\underline{\tilde{H}} = \underline{\tilde{H}}\underline{\underline{R}}^{-1}\underline{\tilde{H}}. \quad \text{Eq (33)}$$

The error covariance matrix associated with the unbiased MMSE-LE can be expressed as:

$$\begin{aligned}\underline{\varphi}_{ee} &= \underline{U} = E\{[\underline{x}(n) - \underline{D}_v^{-1}\underline{\underline{M}}\,\underline{r}(n)][\underline{x}(n) - \underline{r}^H(n)\underline{\underline{M}}^H\underline{D}_v^{-1}]\} \\ &= \underline{I} - \underline{D}_v^{-1}\underline{V} - \underline{V}\underline{D}_v^{-1} + \underline{D}_v^{-1}\underline{V}\underline{D}_v^{-1}.\end{aligned} \quad \text{Eq (34)}$$

The SNR associated with the estimate of the symbol transmitted on the i-th transmit antenna can finally be expressed as:

$$SNR_i = \frac{1}{u_{ii}} = \frac{v_{ii}}{1 - v_{ii}}. \quad \text{Eq (35)}$$

The MMSE-LE technique may be implemented by spatial/space-time processor 410c in FIG. 4C. In this case, multiplier 422 performs the convolution of the sequence of received signal vectors $\underline{r}(n)$ with the sequence of weight matrices $\underline{M}(k)$ to obtain the initial estimate $\underline{\tilde{x}}(n)$, as shown in equation (26). Multiplier 424 performs the pre-multiply of the initial estimate $\underline{\tilde{x}}(n)$ with the diagonal matrix $\underline{D}_v^{-1}$ to obtain the unbiased MMSE-LE estimate $\underline{\hat{x}}(n)$, as shown in equation (31). Adaptive processor 428 derives the sequence of weight matrices $\underline{M}(k)$ as shown in equation (30) and the diagonal matrix $\underline{D}_v^{-1}$ as shown in equation (32). The subsequent processing may be achieved in a similar manner as that described above for the MMSE technique. The SNR of the symbol stream transmitted from the i-th transmit antenna may be estimated based on equation (35) by CSI processor 448.

4. DFE Technique (Space-Time Processing

Figure 4D:
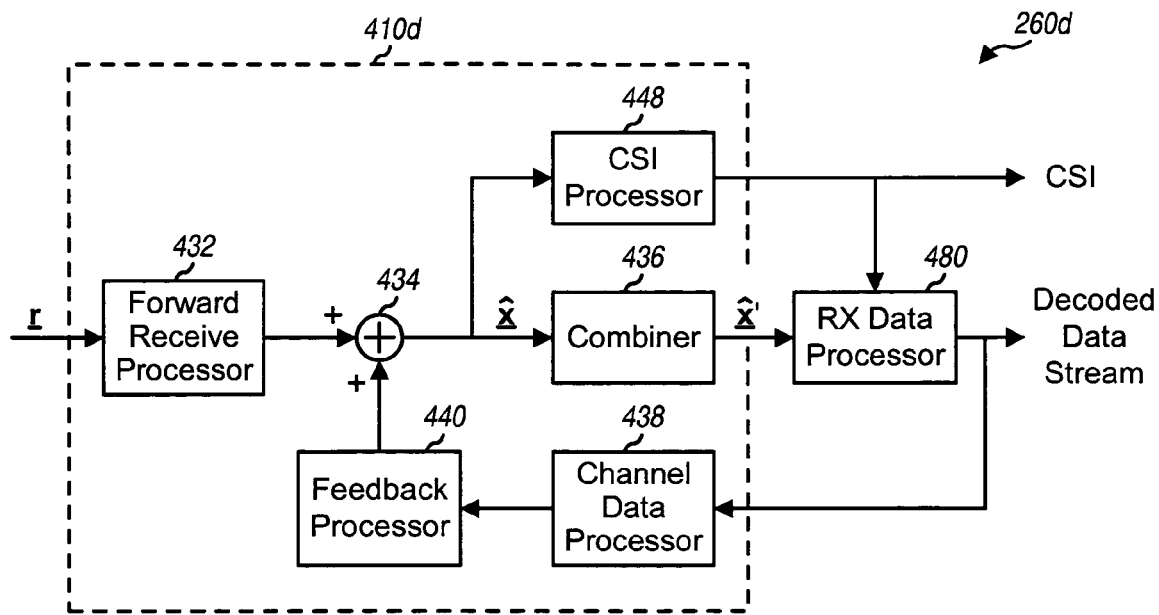

FIG. 4D is a block diagram of an embodiment of a spatial/space-time processor 410d, which is capable of implementing the DFE technique. Within spatial/space-time processor 410d, the stream of received modulation symbol vectors r(n) from the $N_R$ receive antennas is processed by a forward receive processor 432 to provide estimated modulation symbols for the data stream to be recovered. Forward receive processor 432 may implement the CCMI or MMSE technique described above or some other linear spatial equalization technique. A summer 434 then combines the estimated distortion components provided by a feedback processor 440 with the estimated modulation symbols from forward receive processor 432 to provide "equalized" modulation symbols having the distortion component approximately removed. Initially, the estimated distortion components are zero and the equalized modulation symbols are simply the estimated modulation symbols. The equalized modulation symbols from summer 434 are the estimate $\hat{x}$ of the transmitted symbol vector x.

For certain transmit processing schemes, a number of streams of estimated modulation symbols $\hat{x}$ corresponding to a number of transmit antennas used for transmitting a data stream may be provided to a combiner 436, which combines redundant information across time, space, and frequency. The combined modulation symbols $\hat{x}'$ are then provided to RX data processor 480. And for some other transmit processing schemes, the estimated modulation symbols $\hat{x}$ may be provided directly to RX data processor 480. RX data processor 480 demodulates, de-interleaves, and decodes the modulation symbol stream corresponding to the data stream being recovered, as described above in FIG. 4A.

The decoded data stream is also re-encoded and re-modulated by a channel data processor 438 to provide "remodulated" symbols, which are estimates of the modulation symbols at the transmitter. Channel data processor 438 performs the same processing (e.g., encoding, interleaving, and modulation) as that performed at the transmitter for the data stream. The remodulated symbols from channel data processor 438 are provided to feedback processor 440, which processes the symbols to derive the estimated distortion components. Feedback processor 440 may implement a linear spatial equalizer (e.g., a linear transversal equalizer).

For the DFE technique, the decoded data stream is used to derive an estimate of the distortion generated by the already decoded information bits. If the data stream is decoded without errors (or with minimal errors), then the distortion component may be accurately estimated and the inter-symbol interference contributed by the already decoded information bits may be effectively canceled out. The processing performed by forward receive processor 432 and feedback processor 440 are typically adjusted simultaneously to minimize the mean square error (MSE) of the inter-symbol interference in the equalized modulation symbols. DFE processing is described in further detail in the aforementioned paper by Ariyavistakul et al.

For the DFE technique, an initial estimate $\tilde{x}(n)$ of the transmitted symbol vector at time n can be expressed as:

$$\tilde{x}(n) = \sum_{k=-K_1}^{0} \underline{M}_f(k) \underline{r}(n-k) + \sum_{k=1}^{K_2} \underline{M}_b(k) \check{x}(n-k), \quad \text{Eq (36)}$$

where r(n) is the vector of received modulation symbols, which is given above in equation (25), $\check{x}(n)$ is the vector of symbol decisions provided by RX data processor 480, $\underline{M}_f(k)$, $-K_1 \leq k \leq 0$ is the sequence of $(K_1+1)$-$(N_T \times N_R)$ feed-forward coefficient matrices used by forward receive processor 432, and $\underline{M}_b(k)$, $1 \leq k \leq K_2$ is the sequence of $K_2$-$(N_T \times N_R)$ feedback coefficient matrices used by feedback processor 440. Equation (36) can also be expressed as:

$$\tilde{x}(n) = \underline{\underline{M}}_f \underline{r}(n) + \underline{\underline{M}}_b \underline{\check{x}}(n) \quad \text{Eq (37)}$$

where $$\underline{\underline{M}}_f = [\underline{M}(-K_1) \underline{M}(-K_1+1) \ldots \underline{M}(0)], \underline{\underline{M}}_b = [\underline{M}(1) \underline{M}(2) \ldots \underline{M}(K_2)],$$

$$\underline{\check{x}}(n) = \begin{bmatrix} \check{x}(n-1) \\ \check{x}(n-2) \\ \vdots \\ \check{x}(n-K_2) \end{bmatrix}, \text{ and } \underline{r}(n) = \begin{bmatrix} r(n+K_1) \\ r(n+K_1-1) \\ \vdots \\ r(n) \end{bmatrix}.$$

If the MMSE criterion is used to find the coefficient matrices, then the solutions for $\underline{\underline{M}}_f$ and $\underline{\underline{M}}_b$ that minimize the mean square error can be used. The MMSE solution for the feed-forward filter can then be expressed as:

$$\underline{\underline{M}}_f = \underline{\tilde{H}}^H \underline{\tilde{R}}^{-1}, \quad \text{Eq (38)}$$

where $$\underline{\tilde{H}} = \begin{bmatrix} 0_{(K_1-L)N_R \times N_T} \\ H(L) \\ H(L-1) \\ \vdots \\ H(0) \end{bmatrix},$$

and $\underline{\tilde{R}}$ is a $(K_1+1)N_R \times (K_1+1)N_R$ matrix made up of $N_R \times N_R$ blocks. The (i,j)-th block in $\underline{\tilde{R}}$ is given by:

$$\tilde{R}(i,j) = \sum_{m=0}^{K_1-i+1} H(m) H^H(m+i-j) + \sigma^2 I \delta(i-j). \quad \text{Eq (39)}$$

The MMSE solution for the feed-back filter is:

$$M_b(k) = -\sum_{j=-K_1}^{0} M_f(j) H(k-j), \quad 1 \leq k \leq K_2. \quad \text{Eq (40)}$$

As in the MMSE-LE described above, an unbiased estimate $\hat{x}(n)$ can be expressed as:

$$\hat{x}(n) = \underline{D}_{Vdfe}^{-1} \tilde{x}(n) = \underline{D}_{Vdfe}^{-1} \underline{\underline{M}}_f \underline{r}(n) + \underline{D}_{Vdfe}^{-1} \underline{\underline{M}}_b \underline{\check{x}}(n), \quad \text{Eq (41)}$$

where $$\underline{D}_{Vdfe}^{-1} = \text{diag}(v_{dfe,11}, v_{dfe,22}, \ldots, v_{dfe,N_T N_T}), \quad \text{Eq (42)}$$

and $v_{dfe,ii}$ is the i-th diagonal element of $\underline{V}_{dfe}$, which can be expressed as:

$$\underline{V}_{dfe} = \underline{\underline{M}}_f \underline{\tilde{H}} = \underline{\tilde{H}}^H \underline{\tilde{R}}^{-1} \underline{\tilde{H}}. \quad \text{Eq (43)}$$

The resulting error covariance matrix is given by:

$$\underline{\varphi}_{ee} = \underline{U}_{dfe} = E\left\{\left[\underline{x}(n) - \underline{D}_{Vdfe}^{-1}\left(\underline{M}_f \underline{r}(n) + \underline{M}_b \underline{\breve{x}}(n)\right)\right]\right. \quad \text{Eq (44)}$$
$$\left[\underline{x}^H(n) - \left(\underline{r}^H(n)\underline{M}_f^H + \underline{\breve{x}}^H(n)\underline{M}_b^H\right)\underline{D}_{Vdfe}^{-1}\right]\right\}$$
$$= \underline{I} - \underline{D}_{Vdfe}^{-1}\underline{V}_{dfe} - \underline{V}_{dfe}\underline{D}_{Vdfe}^{-1} + \underline{D}_{Vdfe}^{-1}\underline{V}_{dfe}\underline{D}_{Vdfe}^{-1}.$$

The SNR associated with the estimate of the symbol transmitted on the i-th transmit antenna can then be expressed as:

$$SNR_i = \frac{1}{u_{dfe,ii}} = \frac{v_{dfe,ii}}{1 - v_{dfe,ii}}. \quad \text{Eq (45)}$$

5. Full-CSI Technique (Spatial Processing)

For the full-CSI technique, the received signals at the output of the $N_R$ receive antennas may be expressed as shown above in equation (6), which is:

$$\underline{r} = \underline{H}\underline{x} + \underline{n}.$$

The eigenvector decomposition of the Hermitian matrix formed by the product of the channel matrix with its conjugate-transpose can be expressed as:

$$\underline{H}^H\underline{H} = \underline{E}\underline{\Lambda}\underline{E}^H, \quad \text{Eq (46)}$$

where $\underline{E}$ is the eigenvector matrix, and $\underline{\Lambda}$ is a diagonal matrix of eigenvalues, both of dimension $N_T \times N_T$. The transmitter preconditions a set of $N_T$ modulation symbols $\underline{b}$ using the eigenvector matrix $\underline{E}$ as shown above in equation (5). The preconditioned modulation symbols transmitted from the $N_T$ transmit antennas can thus be expressed as:

$$\underline{x} = \underline{E}\underline{b}. \quad \text{Eq (47)}$$

Since $\underline{H}^H\underline{H}$ is Hermitian, the eigenvector matrix is unitary. Thus, if the elements of $\underline{b}$ have equal power, the elements of $\underline{x}$ also have equal power. The received signal may then be expressed as:

$$\underline{r} = \underline{H}\underline{E}\underline{b} + \underline{n}. \quad \text{Eq (48)}$$

The receiver performs a channel-matched-filter operation, followed by pre-multiplication by the right eigenvectors. The result of the channel-matched-filter and pre-multiplication operations is a vector $\underline{z}$, which can be expressed as:

$$\underline{z} = \underline{E}^H\underline{H}^H\underline{H}\underline{E}\underline{b} + \underline{E}^H\underline{H}^H\underline{n} = \underline{\Lambda}\underline{b} + \underline{n}', \quad \text{Eq (49)}$$

where the new noise term has covariance that can be expressed as:

$$E(\hat{n}\hat{n}^H) = E(\underline{E}^H\underline{H}^H\underline{n}\underline{n}^H\underline{H}\underline{E}) = \underline{E}^H\underline{H}^H\underline{H}\underline{E} = \underline{\Lambda}, \quad \text{Eq (50)}$$

i.e., the noise components are independent with variance given by the eigenvalues. The SNR of the i-th component of $\underline{z}$ is $\lambda_i$, which is the i-th diagonal element of $\underline{\Lambda}$.

Full-CSI processing is described in further detail in the aforementioned U.S. patent application Ser. No. 09/532,492.

The spatial/space-time processor embodiment shown in FIG. 4B may also be used to implement the full-CSI technique. The received modulation symbol vectors $\underline{r}$ are filtered by match filter 412, which pre-multiplies each vector $\underline{r}$ with the conjugate-transpose channel coefficient matrix $\underline{H}^H$, as shown above in equation (49). The filtered vectors are further pre-multiplied by multiplier 414 with the right eigenvectors $\underline{E}^H$ to form an estimate $\underline{z}$ of the modulation symbol vector $\underline{b}$, as shown above in equation (49). For the full-CSI technique, matrix processor 420 is configured to provide the right eigenvectors $\underline{E}^H$. The subsequent processing (e.g., by combiner 416 and RX data processor 480) may be performed as described above.

For the full-CSI technique, the transmitter unit can select a coding scheme and a modulation scheme (i.e., a signal constellation) for each of the eigenvectors based on the SNR that is given by the eigenvalue. Provided that the channel conditions do not change appreciably in the interval between the time the CSI is measured at the receiver unit and reported and the time it is used to precondition the transmission at the transmitter unit, the performance of the communications system may be equivalent to that of a set of independent AWGN channels with known SNRs.

6. Successive Cancellation Receiver Processing

For the successive cancellation receiver processing technique, the original $N_R$ received signals are processed to successively recover one transmitted signal at a time. As each transmitted signal is recovered, it is removed (i.e., canceled) from the received signals prior to the processing to recover the next transmitted signal. If the transmitted data streams can be decoded without error (or with minimal errors) and if the channel response estimate is reasonably accurate, then cancellation of the interference due to previously recovered transmitted signals from the received signals is effective, and the SNR of each transmitted signal to be subsequently recovered is improved. In this way, higher performance may be achieved for all transmitted signals (possibly except for the first transmitted signal to be recovered).

Figure 5:
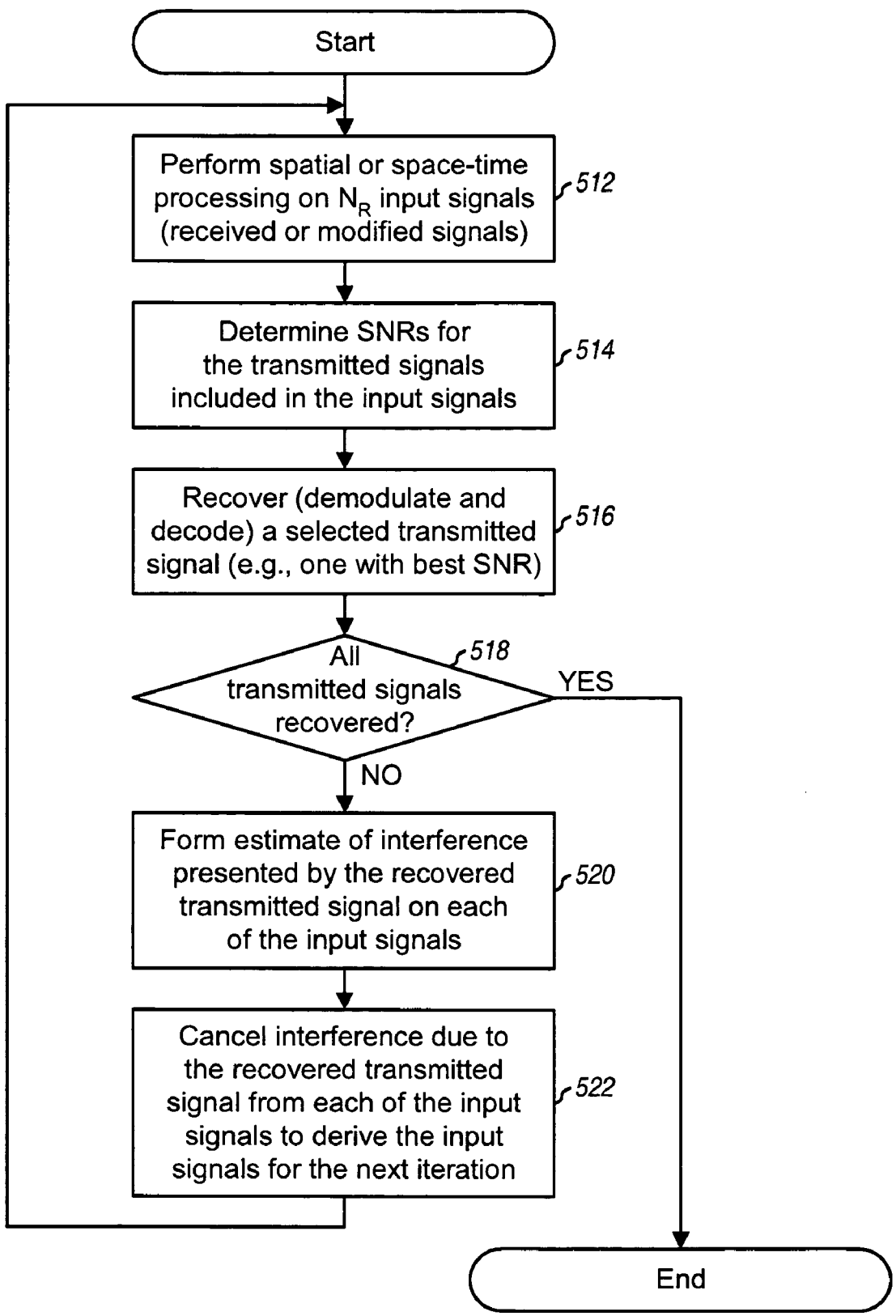
FIG. 5 is a flow diagram illustrating the successive cancellation receiver processing technique.

FIG. 5 is a flow diagram illustrating the successive cancellation receiver processing technique to process $N_R$ received signals to recover $N_T$ transmitted signals. For simplicity, the following description for FIG. 5 assumes that (1) the number of transmission channels is equal to the number of transmit antenna (i.e., $N_C = N_T$ and the transmission channels are spatial subchannels of a MIMO system not utilizing OFDM) and (2) one independent data stream is transmitted from each transmit antenna.

Initially, the receiver unit performs spatial and/or space-time processing on the $N_R$ received signals to attempt to separate the multiple transmitted signals included in the received signals, at step 512. Spatial processing may be performed on the received signals if the MIMO channel is non-dispersive. It may also be necessary or desirable to perform linear or non-linear temporal processing (i.e., space-time processing) on the received signals if the MIMO channel is time-dispersive. The spatial processing may be based on the CCMI, MMSE, or some other technique, and the space-time processing may be based on the MMSE-LE, DFE, MLSE, or some other technique. The amount of achievable signal separation is dependent on the amount of correlation between the transmitted signals, and greater signal separation may be possible if the transmitted signals are less correlated.

The spatial or space-time processing provides $N_T$ "post-processed" signals that are estimates of the $N_T$ transmitted signals. The SNRs for the $N_T$ post-processed signals are then determined, at step 514. In one embodiment, the SNRs are ranked in order from highest to lowest SNR, and the post-processed signal having the highest SNR is selected and further processed (i.e., "detected") to obtain a decoded data stream, at step 516. The detection typically includes demodulating, deinterleaving, and decoding the selected post-processed signal. The decoded data stream is an estimate of the data stream on the transmitted signal being recovered in this iteration. The particular post-processed signal to be detected may also be selected based on some other schemes (e.g., specifically identified by a schedule or the transmitter unit).

At step 518, a determination is made whether or not all transmitted signals have been recovered. If all transmitted signals have been recovered, then the receiver processing terminates. Otherwise, the interference due to the decoded data stream is estimated and removed from the received signals to generate "modified" signals for the next iteration to recover the next transmitted signal.

At step 520, the decoded data stream is used to form an estimate of the interference due to the transmitted signal, corresponding to the just decoded data stream, on each of the received signals. The interference may be estimated by first re-encoding the decoded data stream, interleaving the re-encoded data, and symbol mapping the interleaved data (using the same coding, interleaving, and modulation schemes used at the transmitter unit for this data stream) to obtain a stream of "remodulated" symbols. The remodulated symbol stream is an estimate of the modulation symbol stream previously transmitted from one of the $N_T$ transmit antennas and received by the $N_R$ received antennas. The remodulated symbol stream is then convolved by each of $N_R$ elements in an estimated channel response vector $\underline{h}_j$ to derive $N_R$ interference signals due to the j-th recovered transmitted signal. The vector $\underline{h}_j$ is a particular column of the ($N_R \times N_T$) channel coefficient matrix $\underline{H}$. The $N_R$ interference signals are then subtracted from the $N_R$ corresponding received signals to derive $N_R$ modified signals, at step 522. These modified signals represent the signals at the received antennas if the components due to the decoded data stream had not been transmitted (i.e., assuming that the interference cancellation was effectively performed).

The processing performed in steps 512 through 516 is then repeated on the $N_R$ modified signals (instead of the $N_R$ received signals) to recover another transmitted signal. Steps 512 through 516 are thus repeated for each transmitted signal to be recovered, and steps 520 and 522 are performed if there is another transmitted signal to be recovered.

For the first iteration, the input signals are the $N_R$ received signals from the $N_R$ received antennas. And for each subsequent iteration, the input signals are the $N_R$ modified signals from the interference canceller from the preceding iteration. The processing for each iteration proceeds in a similar manner with the proper substitution for the input signals. More specifically, at each iteration subsequent to the first iteration the signals detected in the previous iteration are assumed to be cancelled, so the dimensionality of the channel coefficient matrix is reduced at each subsequent iteration.

The successive cancellation receiver processing technique thus performs a number of iterations, one iteration for each transmitted signal to be recovered. Each iteration (except for the last) performs a two-part processing to recover one of the transmitted signals and to generate the modified signals for the next iteration. In the first part, spatial processing or space-time processing is performed on the $N_R$ received signals to provide $N_T$ post-processed signals, and one of the post-processed signals is detected to recover the data stream corresponding to this transmitted signal. In the second part (which need not be performed for the last iteration), the interference due to the decoded data stream is canceled from the received signals to derive modified signals having the recovered component removed.

Initially, the input signals $\underline{r}^1$ for the first iteration are the received signals $\underline{r}$, which may be expressed as:

$$\underline{r}^1 = \underline{r} = \begin{bmatrix} r_1 \\ r_2 \\ \vdots \\ r_{N_R} \end{bmatrix}. \qquad \text{Eq (51)}$$

These input signals are linearly or non-linearly processed to provide $N_T$ post-processed signals $\underline{x}^1$, which may be expressed as:

$$\underline{x}^1 = \begin{bmatrix} x_1^1 \\ x_2^1 \\ \vdots \\ x_{N_T}^1 \end{bmatrix}. \qquad \text{Eq (52)}$$

The SNR of the post-processed signals may be estimated, which may be expressed as:

$$\underline{\gamma}^1 = [\gamma_1^1, \gamma_2^1, \ldots, \gamma_{N_T}^1]. \qquad \text{Eq (53)}$$

One of the post-processed signals is selected for further processing (e.g., the post-processed signal with the highest SNR) to provide a decoded data stream. This decoded data stream is then used to estimate the interference $\underline{\hat{i}}^1$ generated by the recovered signal, which may be expressed as:

$$\underline{\hat{i}}^1 = \begin{bmatrix} \hat{i}_1^1 \\ \hat{i}_2^1 \\ \vdots \\ \hat{i}_{N_R}^1 \end{bmatrix}. \qquad \text{Eq (54)}$$

The interference $\underline{\hat{i}}^1$ is then subtracted from the input signal vector $\underline{r}^1$ for this iteration to derive modified signals that comprise the input signal vector $\underline{r}^2$ for the next iteration. The interference cancellation may be expressed as:

$$\underline{r}^2 = \underline{r}^1 - \underline{\hat{i}}^1 = \begin{bmatrix} r_1^1 - \hat{i}_1^1 \\ r_2^1 - \hat{i}_2^1 \\ \vdots \\ r_{N_R}^1 - \hat{i}_{N_R}^1 \end{bmatrix}. \qquad \text{Eq (55)}$$

The same process is then repeated for the next iteration, with the vector $\underline{r}^2$ comprising the input signals for this iteration.

With the successive cancellation receiver processing scheme, one transmitted signal is recovered for each iteration, and the SNR for the j-th transmitted signal recovered in the k-th iteration, $\gamma_j^k$, may be provided as the CSI for the transmission channel used for this recovered signal. As an example, if the first post-processed signal $x_1^1$ is recovered in the first iteration, the second post-processed signal $x_2^2$ is recovered in the second iteration, and so on, and the $N_T$-th post-processed signal $x_{N_T}^{N_T}$ is recovered in the last iteration, then the CSI that may be reported for these recovered signals may be expressed as: $\underline{\gamma} = [\gamma_1^1, \gamma_2^2, \ldots, \gamma_{N_T}^{N_T}]$.

Figure 4F:
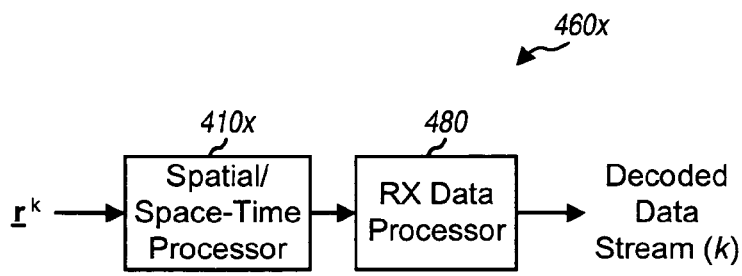
FIG. 4F is a block diagram of an embodiment of a channel MIMO/data processor within the receiver unit.
Figure 4G:
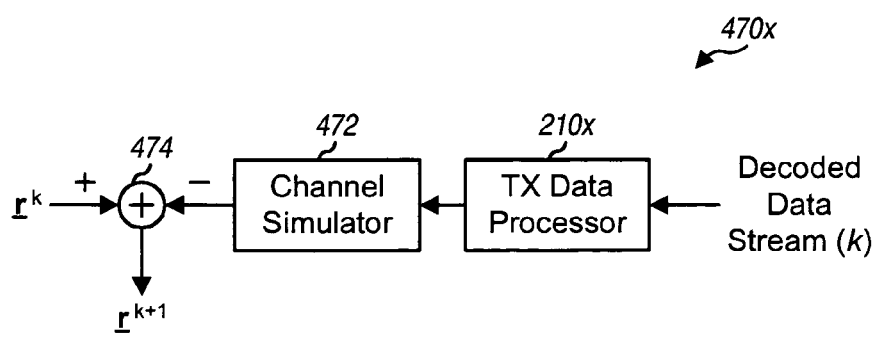
FIG. 4G is a block diagram of an embodiment of an interference canceller.
Figure 4E:
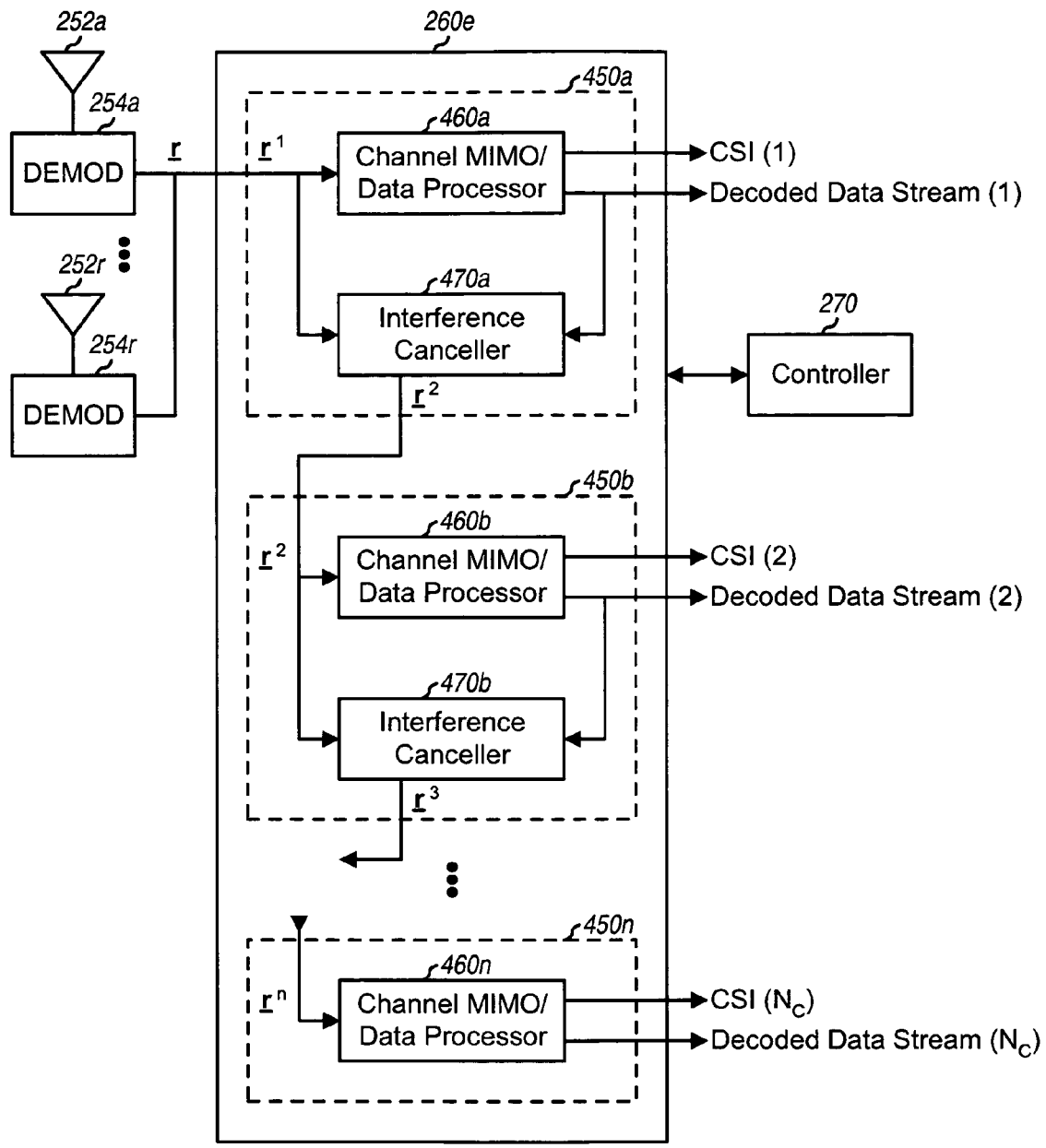

FIG. 4E is a block diagram of a RX MIMO/data processor 260e capable of implementing the successive cancellation receiver processing technique. The transmitted signals from (up to) $N_T$ transmit antennas are received by each of $N_R$ antennas 252a through 252r and routed to a respective demodulator 254. Each demodulator 254 processes a respective received signal and provides a stream of received modulation symbols to RX MIMO/data processor 260e.

For a MIMO system utilizing OFDM, one RX MIMO/data processor 260e may be used to process the $N_R$ modulation symbol streams from the $N_R$ receive antennas for each of the $N_F$ frequency subchannels used for data transmission. And for a MIMO system not utilizing OFDM, one RX MIMO/data processor 260e may be used to process the $N_R$ modulation symbol streams from the $N_R$ receive antennas.

In the embodiment shown in FIG. 4E, RX MIMO/data processor 260e includes a number of successive (i.e., cascaded) receiver processing stages 450, one stage for each of the transmitted signals to be recovered. In one transmit processing scheme, one data stream is transmitted on each transmission channel, and each data stream is independently processed (e.g., with its own encoding and modulation scheme) and transmitted from a respective transmit antenna. For this transmit processing scheme, the number of data streams is equal to the number of transmitted signals, which is also equal to the number of transmit antennas used for data transmission (which may be a subset of the available transmit antennas). For clarity, RX MIMO/data processor 260e is described for this transmit processing scheme.

Each receiver processing stage 450 (except for the last stage 450n) includes a channel MIMO/data processor 460 coupled to an interference canceller 470, and the last stage 450n includes only channel MIMO/data processor 460n. For the first receiver processing stage 450a, channel MIMO/data processor 460a receives and processes the $N_R$ modulation symbol streams from demodulators 254a through 254r to provide a decoded data stream for the first transmitted signal. And for each of the second through last stages 450b through 450n, channel MIMO/data processor 460 for that stage receives and processes the $N_R$ modified symbol streams from the interference canceller in the preceding stage to derive a decoded data stream for the transmitted signal being recovered by that stage. Each channel MIMO/data processor 460 further provides CSI (e.g., the SNR) for the associated transmission channel.

For the first receiver processing stage 450a, interference canceller 470a receives the $N_R$ modulation symbol streams from all $N_R$ demodulators 254. And for each of the second through second-to-last stages, interference canceller 470 receives the $N_R$ modified symbol streams from the interference canceller in the preceding stage. Each interference canceller 470 also receives the decoded data stream from channel MIMO/data processor 460 within the same stage, and performs the processing (e.g., encoding, interleaving, modulation, channel response, and so on) to derive $N_R$ remodulated symbol streams that are estimates of the interference components due to the received modulation symbol streams corresponding to this decoded data stream. The remodulated symbol streams are then subtracted from the received modulation symbol streams to derive $N_R$ modified symbol streams that include all but the subtracted (i.e., cancelled) interference components. The $N_R$ modified symbol streams are then provided to the next stage.

In FIG. 4E, a controller 270 is shown coupled to RX MIMO/data processor 260e and may be used to direct various steps in the successive cancellation receiver processing.

FIG. 4E shows a receiver structure that may be used in a straightforward manner when each data stream is transmitted over a respective transmit antenna (i.e., one data stream corresponding to each transmitted signal). In this case, each receiver processing stage 450 may be operated to recover one of the transmitted signals and provide the decoded data stream corresponding to the recovered transmitted signal.

For some other transmit processing schemes, a data stream may be transmitted over multiple transmit antennas, frequency subchannels, and/or time intervals to provide spatial, frequency, and time diversity, respectively. For these schemes, the receiver processing initially derives a received modulation symbol stream for the transmitted signal on each transmit antenna of each frequency subchannel. Modulation symbols for multiple transmit antennas, frequency subchannels, and/or time intervals may be combined in a complementary manner as the demultiplexing performed at the transmitter unit. The stream of combined modulation symbols is then processed to provide the corresponding decoded data stream.

FIG. 4F is a block diagram of an embodiment of a channel MIMO/data processor 460x, which may be used for each of channel MIMO/data processors 460a through 460n in FIG. 4E. In this embodiment, processor 460x includes a spatial/space-time processor 410x coupled to RX data processor 480.

Spatial/space-time processor 410x performs spatial or space-time processing on the $N_R$ input signals. Spatial/space-time processor 410x may implement the CCMI, MMSE, or some other spatial processing technique for a non-dispersive channel, and may implement the MMSE-LE, DFE, MLSE, or some other space-time processing technique for a dispersive channel.

FIG. 4G is a block diagram of an embodiment of an interference canceller 470x, which may be used for each interference canceller 470 in FIG. 4E. Within interference canceller 470x, the decoded data stream (k) from the channel MIMO/data processor 460 within the same stage is re-encoded, interleaved, and re-modulated by a TX data processor 210x to provide remodulated symbols, which are estimates of the modulation symbols at the transmitter prior to the MIMO processing and channel distortion. TX data processor 210x performs the same processing (e.g., encoding, interleaving, and modulation) as that performed at the transmitter unit for the data stream. The remodulated symbols are then provided to a channel simulator 472, which processes the symbols with the estimated channel response to provide estimates of the interference due the decoded data stream.

For a non-dispersive channel, channel simulator 472 multiples the remodulated symbol stream associated with the j-th transmit antenna with the vector $\hat{h}_j$, which is an estimate of the channel response between the j-th transmit antenna for which the data stream is being recovered and each of the $N_R$ receive antennas. The vector $\hat{h}_j$ may be expressed as:

$$\hat{h}_j = \begin{bmatrix} \hat{h}_{1,j} \\ \hat{h}_{2,j} \\ \vdots \\ \hat{h}_{N_R,j} \end{bmatrix}, \qquad \text{Eq (56)}$$

and is one column of the estimated channel response matrix $\hat{H}$, which can be expressed as:

$$\hat{\underline{H}} = \begin{bmatrix} \hat{h}_{1,1} & \hat{h}_{1,2} & \cdots & \hat{h}_{1,N_T} \\ \hat{h}_{2,1} & \hat{h}_{2,2} & \cdots & \hat{h}_{2,N_T} \\ \vdots & \vdots & \ddots & \vdots \\ \hat{h}_{N_R,1} & \hat{h}_{N_R,2} & \cdots & \hat{h}_{N_R,N_T} \end{bmatrix}. \quad \text{Eq (57)}$$

The matrix $\hat{\underline{H}}$ may be provided by the channel MIMO/data processor 460 within the same stage.

If the remodulated symbol stream corresponding to the j-th transmit antenna is expressed as $\breve{x}_j$, then the estimated interference component $\hat{\underline{i}}^j$ due to the j-th recovered transmitted signal may be expressed as:

$$\hat{\underline{i}}^j = \begin{bmatrix} \hat{h}_{1,j} \cdot \breve{x}_j \\ \hat{h}_{2,j} \cdot \breve{x}_j \\ \vdots \\ \hat{h}_{N_R,j} \cdot \breve{x}_j \end{bmatrix}. \quad \text{Eq (58)}$$

The $N_R$ elements in the interference vector $\hat{\underline{i}}^j$ correspond to the component of the received signal at each of the $N_R$ receive antennas due to the symbol stream transmitted on the j-th transmit antenna. Each element of the vector represents an estimated component due to the decoded data stream in the corresponding received modulation symbol stream. These components are interference to the remaining (not yet detected) transmitted signals in the $N_R$ received modulation symbol streams (i.e., the vector $\underline{r}^k$), and are subtracted (i.e., canceled) from the received signal vector $\underline{r}^k$ by a summer 474 to provide a modified vector $\underline{r}^{k+1}$ having the components from the decoded data stream removed. This cancellation can be expressed as shown above in equation (55). The modified vector $\underline{r}^{k+1}$ is provided as the input vector to the next receiver processing stage, as shown in FIG. 4E.

For a dispersive channel, the vector $\hat{\underline{h}}_j$ is replaced with an estimate of the channel transfer function vector defined in equation (23), $\hat{\underline{h}}_j(k)$, $0 \leq k \leq L$. Then the estimated interference vector at time n, $\hat{\underline{i}}^j(n)$, may be expressed as:

$$\hat{\underline{i}}^j(n) = \begin{bmatrix} \sum_{k=0}^{L} \hat{h}_{1,j}(k)\breve{x}_j(n-k) \\ \sum_{k=0}^{L} \hat{h}_{2,j}(k)\breve{x}_j(n-k) \\ \vdots \\ \sum_{k=0}^{L} \hat{h}_{N_R,j}(k)\breve{x}_j(n-k) \end{bmatrix}, \quad \text{Eq (59)}$$

where $\breve{x}_j(n)$ is the remodulated symbol for time n. Equation (59) effectively convolves the remodulated symbols with the channel response estimates for each transmit-receive antenna pair.

For simplicity, the receiver architecture shown in FIG. 4E provides the (received or modified) modulation symbol streams to each receiver processing stage 450, and these streams have the interference components due to previously decoded data streams removed (i.e., canceled). In the embodiment shown in FIG. 4E, each stage removes the interference components due to the data stream decoded by that stage. In some other designs, the received modulation symbol streams may be provided to all stages, and each stage may perform the cancellation of interference components from all previously decoded data streams (which may be provided from preceding stages). The interference cancellation may also be skipped for one or more stages (e.g., if the SNR for the data stream is high). Various modifications to the receiver architecture shown in FIG. 4E may be made and are within the scope of the invention.

The successive cancellation receiver processing technique is described in further detail in the aforementioned U.S. patent application Ser. No. 09/854,235, and by P. W. Wolniansky et al. in a paper entitled "V-BLAST: An Architecture for Achieving Very High Data Rates over the Rich-Scattering Wireless Channel", Proc. ISSSE-98, Pisa, Italy, which is incorporated herein by reference.

7. Deriving and Reporting Full or Partial CSI

The full or partial CSI may comprise any type of information that is indicative of the characteristics of the communication link. Various types of information may be provided as full or partial CSI, and some examples are described below.

Partial CSI

In one embodiment, the partial CSI comprises SNR, which is derived as the ratio of the signal power over the noise plus interference power. The SNR is typically estimated and provided for each transmission channel used for data transmission (e.g., each transmit data stream), although an aggregate SNR may also be provided for a number of transmission channels. The SNR estimate may be quantized to a value having a particular number of bits. In one embodiment, the SNR estimate is mapped to an SNR index, e.g., using a look-up table.

In another embodiment, the partial CSI comprises signal power and interference plus noise power. These two components may be separately derived and provided for each transmission channel or a set of transmission channels used for data transmission.

In yet another embodiment, the partial CSI comprises signal power, interference power, and noise power. These three components may be derived and provided for each transmission channel or a set of transmission channels used for data transmission.

In yet another embodiment, the partial CSI comprises signal-to-noise ratio plus a list of interference powers for each observable interference term. This information may be derived and provided for each transmission channel or a set of transmission channels used for data transmission.

In yet another embodiment, the partial CSI comprises signal components in a matrix form (e.g., $N_R \times N_T$ complex entries for all transmit-receive antenna pairs) and the noise plus interference components in matrix form (e.g., $N_R \times N_T$ complex entries). The transmitter unit may then properly combine the signal components and the noise plus interference components for the appropriate transmit-receive antenna pairs to derive the quality of each transmission channel used for data transmission (e.g., the post-processed SNR for each transmitted data stream, as received at the receiver unit).

In yet another embodiment, the partial CSI comprises a data rate indicator for each transmit data stream. The quality of a transmission channel to be used for data transmission may be determined initially (e.g., based on the SNR estimated for the transmission channel) and a data rate corresponding to the determined channel quality may then be identified (e.g., based on a look-up table). The identified data rate is indicative of the maximum data rate that may be transmitted on the transmission channel for the required level of performance. The data rate may be mapped to and represented by a data rate indicator (DRI), which may be efficiently coded. For example, if (up to) seven possible data rates are supported by the transmitter unit for each transmit antenna, then a 3-bit value may be used to represent the DRI where, e.g., a zero may indicate a data rate of zero (i.e., don't use the transmit antenna) and 1 through 7 may be used to indicate seven different data rates. In a typical implementation, the channel quality measurements (e.g., the SNR estimates) are mapped directly to the DRI based on, e.g., a look-up table.

In yet another embodiment, the partial CSI comprises an indication of the particular processing scheme to be used at the transmitter unit for each transmit data stream. In this embodiment, the indicator may identify the particular coding and modulation scheme to be used for the transmit data stream such that the desired level of performance is achieved.

In yet another embodiment, the partial CSI comprises a differential indicator for a particular measure of quality for a transmission channel. Initially, the SNR or DRI or some other quality measurement for the transmission channel is determined and reported as a reference measurement value. Thereafter, monitoring of the quality of the transmission channel continues, and the difference between the last reported measurement and the current measurement is determined. The difference may then be quantized to one or more bits, and the quantized difference is mapped to and represented by the differential indicator, which is then reported. The differential indicator may indicate an increase or decrease to the last reported measurement by a particular step size (or to maintain the last reported measurement). For example, the differential indicator may indicate that (1) the observed SNR for a particular transmission channel has increased or decreased by a particular step size, or (2) the data rate should be adjusted by a particular amount, or some other change. The reference measurement may be transmitted periodically to ensure that errors in the differential indicators and/or erroneous reception of these indicators do not accumulate.

Full CSI

In one embodiment, the full CSI comprises eigenmodes plus any other information that is indicative of, or equivalent to, SNR. For example, the SNR-related information may be a data rate indication per eigenmode, an indication of the coding and modulation scheme to be used per eigenmode, the signal and interference power per eigenmode, the signal to interference ratio per eigenmode, and so on. The information described above for the partial CSI may also be provided as the SNR related information.

In another embodiment, the full CSI comprises a matrix $\underline{A} = \underline{H}^H \underline{H}$. This matrix $\underline{A}$ is sufficient to determine the eigenmodes and eigenvalues of the channel, and may be a more efficient representation of the channel (e.g., fewer bits may be required to transmit the full CSI for this representation).

Differential update techniques may also be used for all of the full CSI data types. For example, differential updates to the full CSI characterization may be sent periodically, when the channel changes by some amount, and so on.

Other forms of full or partial CSI may also be used and are within the scope of the invention. In general, the full or partial CSI includes sufficient information in whatever form that may be used to adjust the processing at the transmitter unit such that the desired level of performance is achieved for the transmitted data streams.

Deriving and Reporting CSI

The CSI may be derived based on the signals transmitted by the transmitter unit and received at the receiver unit. In an embodiment, the CSI is derived based on a pilot included in the transmitted signals. Alternatively or additionally, the CSI may be derived based on the data included in the transmitted signals.

In yet another embodiment, the CSI comprises one or more signals transmitted on the reverse link from the receiver unit to the transmitter unit. In some systems, a degree of correlation may exist between the downlink and uplink (e.g. for time division duplexed (TDD) systems, where the uplink and downlink share the same system bandwidth in a time division multiplexed manner). In these systems, the quality of the downlink may be estimated (to a requisite degree of accuracy) based on the quality of the uplink, which may be estimated based on signals (e.g., pilot signals) transmitted from the receiver unit. The pilot signals transmitted on the uplink would then represent a means by which the transmitter unit could estimate the CSI as observed at the receiver unit. In TDD systems, the transmitter unit can derive the channel coefficient matrix $\underline{H}$ (e.g., based on the pilot transmitted on the uplink), account for differences between the transmit and receive array manifolds, and receive an estimate of the noise variance at the receiver unit. The array manifold deltas may be resolved by a periodic calibration procedure that may involve feedback between the receiver unit and transmitter unit.

The signal quality may be estimated at the receiver unit based on various techniques. Some of these techniques are described in the following patents, which are assigned to the assignee of the present application and incorporated herein by reference:

U.S. Pat. No. 5,799,005, entitled "System and Method for Determining Received Pilot Power and Path Loss in a CDMA Communication System," issued Aug. 25, 1998;

U.S. Pat. No. 5,903,554, entitled "Method and Apparatus for Measuring Link Quality in a Spread Spectrum Communication System," issued May 11, 1999;

U.S. Pat. Nos. 5,056,109, and 5,265,119, both entitled "Method and Apparatus for Controlling Transmission Power in a CDMA Cellular Mobile Telephone System," respectively issued Oct. 8, 1991 and Nov. 23, 1993; and U.S. Pat. No. 6,097,972, entitled "Method and Apparatus for Processing Power Control Signals in CDMA Mobile Telephone System," issued Aug. 1, 2000.

The CSI may be reported back to the transmitter unit using various CSI transmission schemes. For example, the CSI may be sent in full, differentially, or a combination thereof. In one embodiment, full or partial CSI is reported periodically, and differential updates are sent based on the prior transmitted CSI. As an example for full CSI, the updates may be corrections (based on an error signal) to the reported eigenmodes. The eigenvalues typically do not change as rapidly as the eigenmodes, so these may be updated at a lower rate. In another embodiment, the CSI is sent only when there is a change (e.g., if the change exceeds a particular threshold), which may lower the effective rate of the feedback channel. As an example for partial CSI, the SNRs may be sent back (e.g., differentially) only when they change. For an OFDM system (with or without MIMO), correlation in the frequency domain may be exploited to permit reduction in the amount of CSI to be fed back. As an example for an OFDM system using partial CSI, if the SNR corresponding to a particular spatial subchannel for $N_M$ frequency subchannels is similar, the SNR and the first and last frequency subchannels for which this condition is true may be reported. Other compression and feedback channel error recovery techniques to reduce the amount of data to be fed back for CSI may also be used and are within the scope of the invention.

Various types of information for CSI and various CSI reporting mechanisms are also described in U.S. patent application Ser. No. 08/963,386, entitled "Method and Apparatus for High Rate Packet Data Transmission," filed Nov. 3, 1997, assigned to the assignee of the present application, and in "TIE/EIA/IS-856 cdma2000 High Rate Packet Data Air Interface Specification", both of which are incorporated herein by reference.

Using either the partial-CSI (e.g., CCMI, MMSE, MMSE-LE, and DFE) techniques or the full-CSI technique described herein, the full or partial CSI of each transmission channel may be obtained for the received signals. The determined full or partial CSI for the transmission channels may then be reported back to the transmitter unit via a reverse channel. For the partial-CSI techniques, adaptive processing may be achieved without complete CSI. For the full-CSI technique, sufficient information (and not necessarily the explicit eigenvalues and eigenmodes) is fed back to the transmitter unit to facilitate calculation of the eigenvalues and eigenmodes for each frequency subchannel utilized. By feeding back the CSI, it is possible to implement adaptive processing (e.g., adaptive coding and modulation) to improve utilization of the MIMO channel.

Referring back to FIG. 2A, on the downlink, the full or partial CSI (e.g., channel SNR) determined by RX MIMO processor 260 is provided to a TX data processor 280, which processes the CSI and provides processed data to one or more modulators 254. Modulators 254 further condition the processed data and transmit the CSI back to the base station via the uplink.

At base station 104, the transmitted feedback signal is received by antennas 224, demodulated by demodulators 222, and provided to a RX MIMO/data processor 240. RX MIMO/data processor 240 performs processing complementary to that performed by TX data processor 280 and recovers the reported full/partial CSI, which is then provided to, and used to adjust the processing by, TX data processor 210 and TX MIMO processor 220.

Base station 104 may adjust (i.e., adapt) its processing based on the full/partial CSI from terminals 106. For example, the coding for each transmission channel may be adjusted such that the information bit rate matches the transmission capability supported by the channel SNR. Additionally, the modulation scheme for the transmission channel may be selected based on the channel SNR. Other processing (e.g., interleaving) may also be adjusted and are within the scope of the invention. The adjustment of the processing for each transmission channel based on the determined SNR for the channel allows the MIMO system to achieve high performance (i.e., high throughput or bit rate for a particular level of performance). The adaptive transmit processing may be applied to a single-carrier MIMO system or a multi-carrier based MIMO system (e.g., a MIMO system utilizing OFDM).

The adjustment in the coding and the selection of the modulation scheme at the transmitter unit may be achieved based on numerous techniques, some of which are described in the aforementioned U.S. patent application Ser. Nos. 09/776,975, 09/532,492, and 09/854,235.

The partial-CSI techniques (e.g., CCMI, MMSE, MMSE-LE, and DFE techniques) and full-CSI techniques are receiver processing techniques that allow a MIMO system to utilize the additional dimensionalities created by the use of multiple transmit and receive antennas, which is a main advantage for employing MIMO. The partial-CSI techniques may allow the same number of modulation symbols to be transmitted for each time slot as for a MIMO system utilizing full CSI. However, other receiver processing techniques may also be used in conjunction with the full/partial CSI techniques described herein and are within the scope of the invention. Analogously, FIGS. 4B through 4E represent four embodiments of a receiver unit capable of processing a MIMO transmission, determining the characteristics of the transmission channels (e.g., the SNR), and reporting full or partial CSI back to the transmitter unit. Other designs based on the techniques presented herein and other receiver processing techniques can be contemplated and are within the scope of the invention.

IV. Adaptive Reuse

An aspect of the invention provides techniques to (1) partition and allocate the available system resources (e.g., the spectrum) among cells in the system, and (2) allocate the resources in each cell to terminals for data transmission. The ability to dynamically and/or adaptively allocate resources to the cells and the ability for the cells to intelligently allocate resources to the terminals enable the system to achieve a high level of efficiency and performance.

In fixed-reuse systems, a "channel" made available for use by a terminal in one cell may only be reused in another cell with the same channel reuse pattern. For example, consider a 3-cell reuse cluster containing cells 1, 2 and 3. In this scheme, different channel sets are allocated to each cell in this first reuse cluster. Each channel may be a time slot in a TDM system, a code channel in a CDM system, a frequency subchannel in an FDM/OFDM system, and so on. The channels in the set allocated to any one cell in a reuse cluster are orthogonal to the channels in the other sets allocated to the other cells in the cluster. The reuse cluster is repeated throughout the network in some prescribed fashion. This strategy reduces or eliminates mutual interference caused by terminals within a reuse cluster. While fixed-reuse schemes may be used to maximize the percentage of terminals meeting the minimum required SNR, they are generally inefficient because they employ a high reuse factor.

Figure 6A:
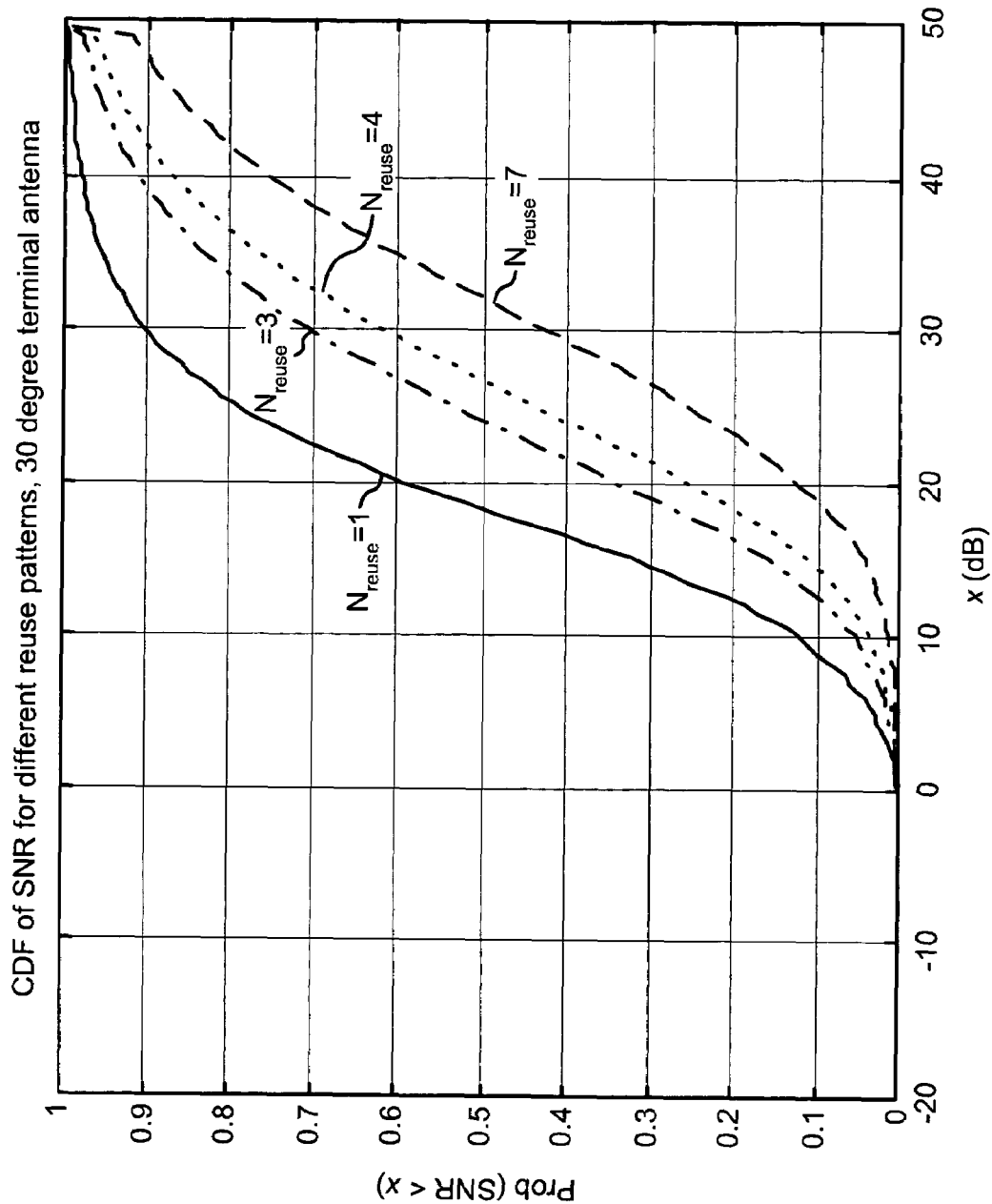
FIG. 6A shows example cumulative distribution functions (CDFs) of the SNR achieved for terminals in a system based on a number of reuse patterns.

FIG. 6A shows example cumulative distribution functions (CDFs) of the SNR achieved for terminals in a system based on a number of reuse patterns obtained from simulation of terminals randomly distributed throughout the coverage area. The horizontal axis, x, represents SNR, and the vertical axis represents the probability that the SNR achieved for a particular terminal is less than the value shown in the horizontal axis, i.e., P(SNR<x). As shown in FIG. 6A, virtually no terminals achieve an SNR worse than 0 dB. FIG. 6A also shows that the probability of greater SNR increases with greater reuse. Thus, the P(SNR>x) for the 7-cell reuse pattern is greater than the P(SNR>x) for the 1-cell reuse pattern.

The SNR CDFs in FIG. 6A may be used to characterize the potential performance of the system. As an example, assume that an SNR of at least 10 dB is required to meet a minimum instantaneous bit rate of 1 Mbps for 99.99% of the time. Using a reuse factor of one (i.e., $N_{reuse}=1$, every cell reuses the same channels), the probability of not achieving the required performance (i.e., the outage probability) is approximately 12%. Similarly, cell reuse factors of three, four, and seven correspond to outage probabilities of 5.4%, 3.4%, and 1.1%, respectively. Thus in order to achieve a 10 dB SNR for 99% of the terminals, a reuse factor of at least seven ($N_{reuse} \leq 7$) is required in this example.

Figure 6B:
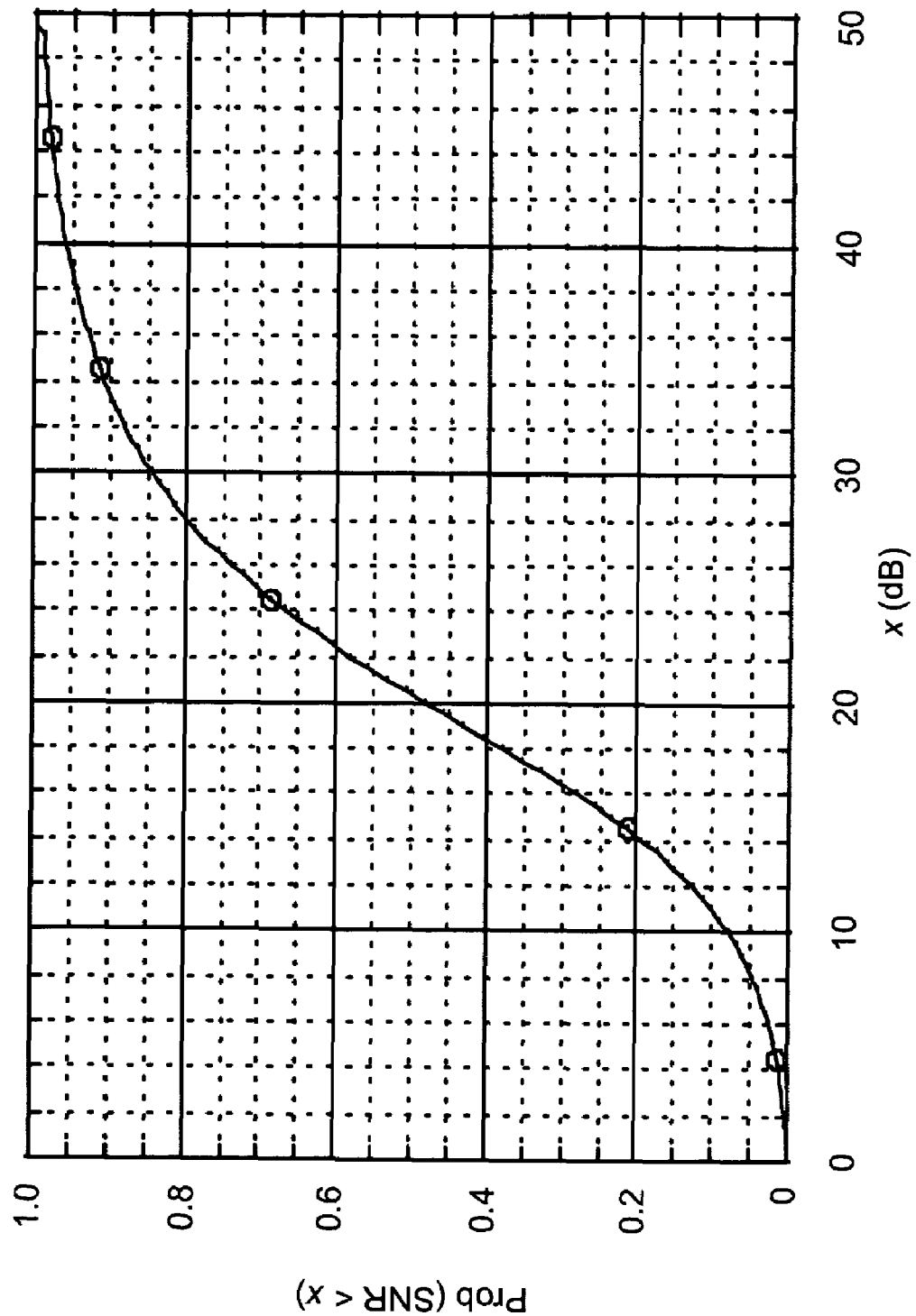
FIG. 6B shows an example CDF of the SNR achieved by the terminals in a cell for a 1-cell reuse pattern.

FIG. 6B shows an example CDF of the SNR achieved by the terminals in a cell for a 1-cell reuse pattern. For the uplink, the SNR CDF in FIG. 6B is achieved at the base stations for the terminals with one terminal transmitting at full power on each channel in each cell. And for the downlink, the SNR CDF is achieved at the terminals with all cells transmitting at full power. In both cases, the terminals are uniformly distributed (i.e., randomly located) within the cells. The SNR CDF provides an indication of the percentage of terminals in the cell that have SNRs greater than a particular SNR value. From FIG. 6B, it can be seen that terminals within the cell have different SNR characteristics and may be able to achieve different levels of performance or, for a particular level of performance, may need to transmit at different power levels. Terminals with smaller path losses to the serving cell typically have higher SNRs, which imply that they will be able to achieve higher throughput.

In a typical system, a large percentage of the terminals in the system are able to achieve SNRs that are equal to or exceed a setpoint. The setpoint is a particular SNR required to achieve the desired level of performance, which may be quantified as, e.g., a particular average data rate at 1% BER or 0.01% outage probability, or some other criterion. For these terminals, a unity reuse pattern ($N_{reuse}=1$) may be employed to achieve high efficiency for the system. Only a fraction of the terminals in the system are typically disadvantaged at any given moment. For the fraction of terminals that achieve SNRs below the setpoint, some other reuse schemes and/or some other techniques may be employed to provide the required performance.

Adaptive reuse schemes are provided herein to dynamically and/or adaptively partition and allocate the available system resources to the cells based on a number of factors such as, for example, the observed loading conditions, the system requirements, and so on. A reuse plan is initially defined and each cell is allocated a fraction of the total available system resources. The allocation may be such that each cell can simultaneously utilize a large portion of the total available resources, if desired or necessary. As the system changes, the reuse plan may be redefined to reflect changes in the system. In this manner, the adaptive reuse plan may be capable of achieving a very low effective reuse factor (e.g., close to 1) while satisfying other system requirements.

The system resources may also be partitioned such that each cell is allocated a set of channels having different performance levels. Higher performance may be achieved, for example, for lightly shared channels and/or those associated with low transmit power levels in adjacent cells. Conversely, lower performance may result, for example, from low transmit power levels permitted for the channels. Channels having different performance levels may be obtained by defining different back-off factors for the channels, as described below.

On the uplink, terminals in each cell are assigned to channels based on the terminals' tolerance levels to interference and the channels' performance. For example, disadvantaged terminals requiring better protection from interference may be assigned to channels that are afforded more protection. In contrast, advantaged terminals with favorable propagation conditions may be assigned to channels that are more heavily shared and/or have the greater interference levels associated with their use.

Figure 6C:
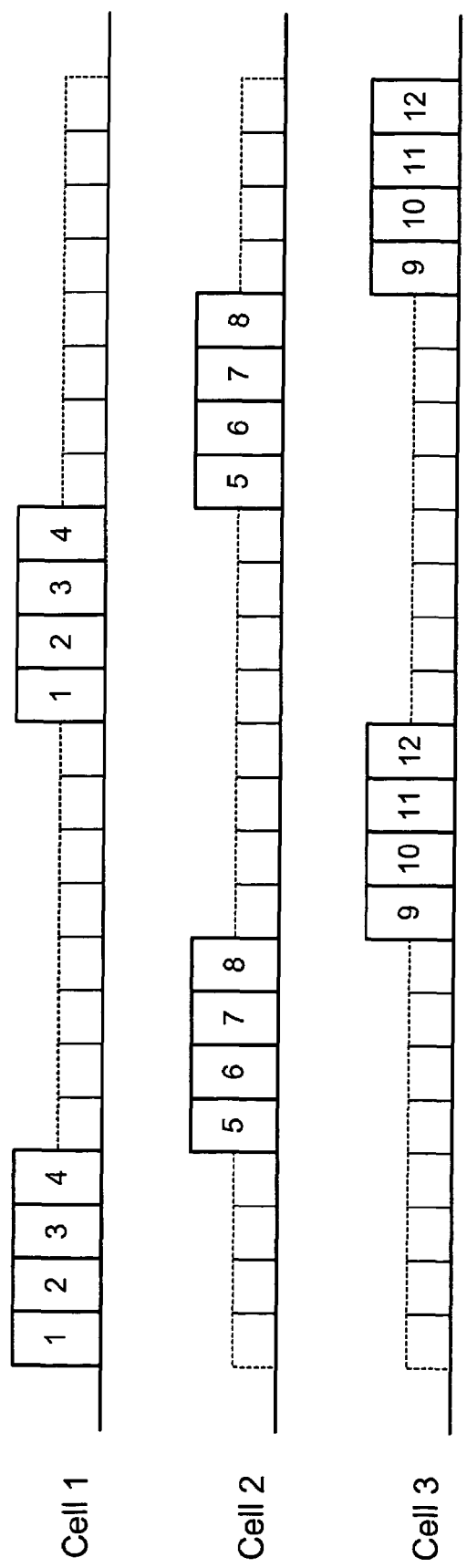
FIG. 6C is a diagram of an embodiment of a resource partitioning and allocation for a 3-cell reuse pattern.

FIG. 6C is a diagram of an embodiment of a resource partitioning and allocation for a 3-cell reuse pattern (i.e., $N_{reuse}=3$). In this example, the system resource is divided into 12 fractions. The division may be implemented in the time, frequency, or code domain, or a combination of these. Thus, the horizontal axis in FIG. 6C can represent either time or frequency, depending on whether TDM or FDM/OFDM is employed. For example, the 12 fractions can represent 12 time division-multiplexed time slots for a TDM-based scheme or 12 frequency bands for an FDM-based scheme. Each of the fractions is also referred to herein as a "channel", and each channel is orthogonal to the other channels.

For the 3-cell reuse pattern, the system resources may be partitioned by grouping the available channels into three sets, and each cell in a 3-cell cluster may be allocated one of the channel sets. Each channel set includes some or all of the 12 available channels, depending on the particular reuse scheme being employed. For the embodiment shown in FIG. 6C, each cell is allocated an equal number of channels, with cell 1 being allocated channels 1 through 4, cell 2 being allocated channels 5 through 8, and cell 3 being allocated channels 9 through 12. In some other embodiments, each cell may be allocated a respective channel set that can include any number of channels, some of which may also be allocated to other cells.

1. Adaptive Reuse Schemes

Adaptive reuse schemes may be designed to exploit certain characteristics of the communication system to achieve high system performance. These system characteristics include loading effects and the terminals' different tolerance to interference.

The loading at the cells affects the overall performance (e.g., throughput) of the system. At low loads, the available system resources may be divided into sets of "orthogonal" channels, which may then be assigned to the cells, one channel set per cell in a reuse cluster. Because the channels in each set are orthogonal to the channels in other sets, interference on these orthogonal channels is low, and high C/I values may be achieved. As the load increases, the number of orthogonal channels in each set may be insufficient to meet demands, and the cells may be allowed to deviate from the use of only the orthogonal channels. The transmissions on non-orthogonal channels increase the average interference levels observed in the channels used. However, by properly controlling the transmission levels on non-orthogonal channels, the amount of interference may be controlled and high performance may be achieved even at higher loads.

As the load increases, the number of active terminals desiring data transmission also increases, and the pool of terminals from which a cell may select to schedule for data transmission and to assign channels also increases. Each terminal in the pool presents interference to other terminals in the system, and the interference level may be dependent (in part) on the relative location of the terminal to the serving cell as well as to other neighbor cells and terminals. Terminals with greater link margins have greater tolerance to interference. The terminals' different interference characteristics can be exploited in scheduling terminals and assigning channels to achieve tight reuse (i.e., close to unity). In particular, as the load increases, terminals with higher tolerance to interference may be assigned to channels having a greater likelihood of receiving high interference levels.

Figure 7:
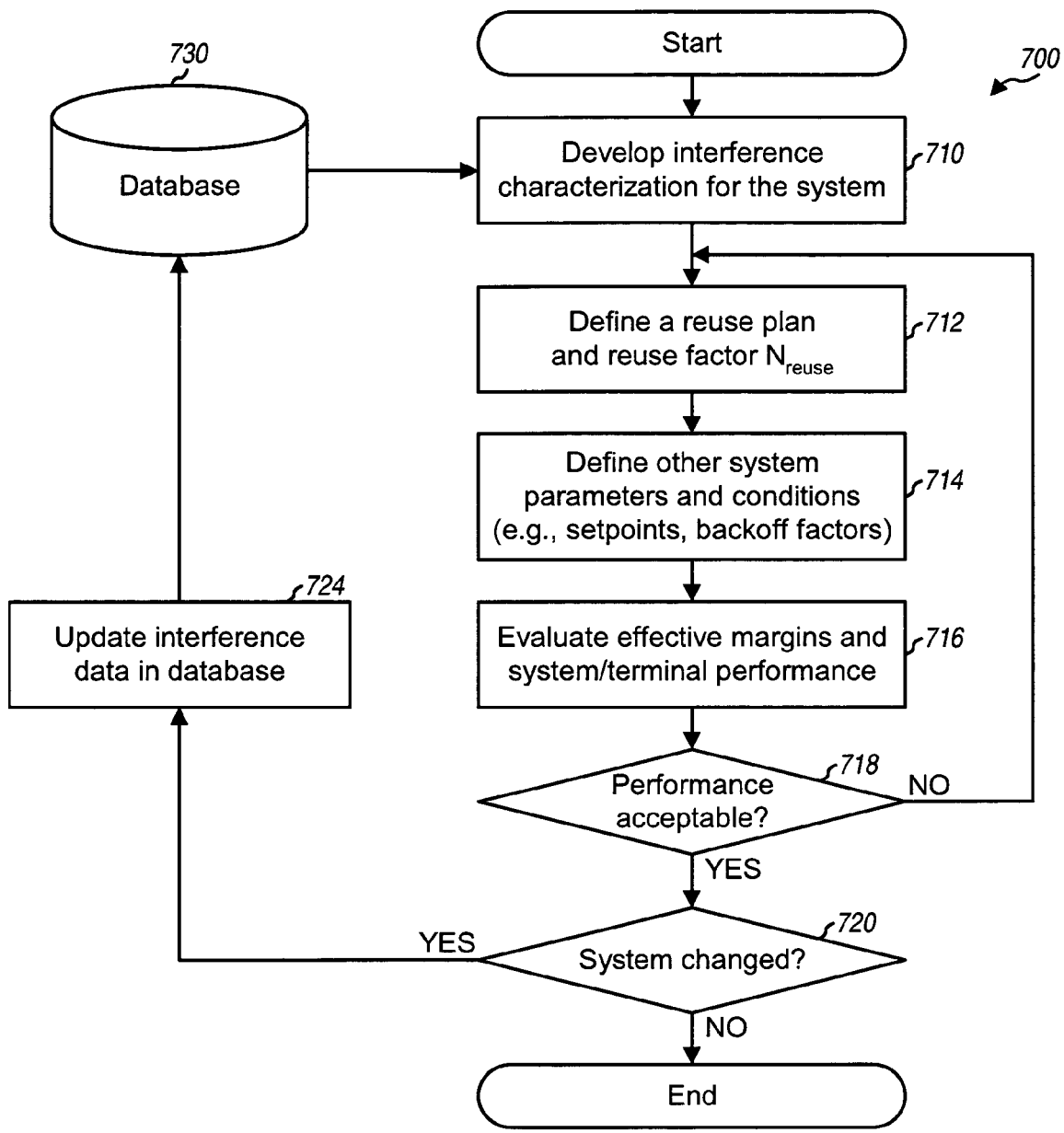
FIG. 7 is a flow diagram of an embodiment of a process for an adaptive reuse scheme.

FIG. 7 is a flow diagram of an embodiment of a process 700 for an adaptive reuse scheme. The development of a reuse plan and the adaptation of the reuse plan to changing system conditions may be performed concurrently with normal operation of the system.

Initially, the system is characterized, at step 710, for one or more parameters and based on information collected for the system and which may be stored in a database 730. For example, the interference experienced by the terminals, as observed at each cell (for the uplink) or as observed at each terminal (for the downlink), may be determined and an interference characterization may be developed. The interference characterization may be performed on a per cell basis, and may involve developing a statistical characterization of the interference levels such as a power distribution. The information used for the characterization may be updated periodically to account for new cells and terminals, and to reflect changes in the system.

A reuse plan is then defined using the developed system characterization and other system constraints and considerations, at step 712. The reuse plan encompasses various components such as a particular reuse factor $N_{reuse}$ and a particular reuse cell layout based on the reuse factor $N_{reuse}$. For example, the reuse factor may correspond to a 1-cell, 3-cell, 7-cell, or 19-cell reuse pattern or cluster. The selection of the reuse factor and the design of the reuse cell layout may be achieved based on the data developed in step 710 and any other available data. The reuse plan provides a framework for operating the system.

Additional system parameters and/or operational conditions are also defined, at step 714. This typically includes partitioning the total available system resources into channels, with the channels corresponding to time units, frequency subchannels, code channels, or some other units. The number of channels, $N_{ch}$, to be employed may be determined based on the reuse plan defined in step 712. The available channels are then associated into sets and each cell is allocated a respective channel set. The sets may include overlapping channels (i.e., a particular channel may be included in more than one set). Resource partition and allocation are described in further detail below.

Other parameters may also be defined in step 714 such as, for example, the transmission interval, the setpoints of the cells in the system, the back-off factors associated with the allocated channels, the back-off factor limits, the step sizes for adjustments to the back-off factors, and others. The back-off factors determine the reductions in the peak transmit power levels for the channels. These parameters and conditions, which are described in further detail below, are akin to a set of operating rules to be followed by the cells during normal operation.

The system then operates in accordance with the defined reuse plan and the cells and/or terminals transmit data (e.g., as scheduled). During the course of operation, the system performance is evaluated for the defined reuse plan, at step 716. Such evaluation may include, for example, determining the effective path losses between each terminal to several nearby cells and the associated link margins, the throughputs, the outage probabilities, and other measures of performance. For example, the effective link margin for each scheduled terminal in each channel in each cell may be determined. Based on the computed link margins, an estimate of the average throughput of the system may be developed as well as the individual performance of the terminals.

Once the system performance has been evaluated, a determination is made on the effectiveness (i.e., the performance) of the defined reuse plan, at step 718. If the system performance is not acceptable, then the process returns to step 712 and the reuse plan is redefined. The system performance may be unacceptable if it does not conform to a set of system requirements and/or does not achieve the desired performance level. The redefined reuse plan may include changes to various operating parameters, and may even include the selection of another reuse pattern and/or reuse cell layout. For example, if excessive interference is encountered, the reuse pattern may be increased (e.g., from 3-cell to 7-cell). Steps 712 through 718 may be performed iteratively until the system goals are achieved (e.g., maximized throughput while simultaneously satisfying the minimum performance requirements for the terminals in the coverage area). Steps 712 through 718 also represent an ongoing process while the system is operational.

If the system performance is acceptable (i.e., conforms to the system requirements), a determination is then made whether the system has changed, at step 720. If there are no changes, the process terminates. Otherwise, database 730 is updated, at step 724, to reflect changes in the system, and the system is recharacterized.

The process shown in FIG. 7 may be performed periodically or whenever system changes are detected. For example, the process may be performed as the system grows or changes, e.g., as new cells and terminals are added and as existing cells and terminals are removed or modified. The process allows the system to adapt to changes, for example, in the terminal distribution, topology, and topography.

2. Power Back-Off

In accordance with an aspect of the invention, a channel structure may be defined and employed by the system such that as the load increases, reliable performance is achieved using the channels a large percentage of the time. For a particular cell, it is likely that some terminals are more immune to other-cell or other-terminal interference than some other terminals. By providing a channel structure that takes advantage of this fact, improvement in the system throughput and performance may be realized.

For the channel structure, each cell in a reuse cluster is allocated a respective set of channels that may then be assigned to terminals in its coverage area. Each cell is further assigned a set of back-off factors for the set of allocated channels. The back-off factor for each allocated channel indicates the maximum percentage of full transmit power that may be used for the channel. The back-off factor may be any value ranging from zero (0.0) to one (1.0), with zero indicating no data transmission allowed on the channel and one indicating data transmission at up to full transmit power. The back-off factors result in channels capable of achieving different performance levels.

The back-off from full transmit power may be applied to one or more selected channels, at one or more selected time slots, by one or more selected cells, or any combination thereof. The back-off may additionally or alternatively be applied to selected terminals in the cell. In an embodiment, each cell applies a back-off for each channel assigned for data transmission, with the specific value for the back-off being based on the operating conditions of the cell such that the desired performance is achieved while limiting the amount of interference to terminals in other cells The back-off factors for the channels assigned to each cell can be determined based on a number of factors such as, for example, the characteristics of the terminals, the loading conditions at the cell, the required performance, and so on. The set of back-off factors assigned to each cell may be unique, or may be common among different cells in the system. In general, the channels allocated to each cell and the assigned back-off factors may change dynamically and/or adaptively based on, for example, the operating conditions (e.g., the system load).

In one embodiment, the back-off factors for each cell are determined based on the distribution of the achievable SNR values for the total ensemble of (active) terminals in the cell. A non-uniform weighting of these terminals may be applied, for example, based on their profile, as described below. This weighting may be made adaptively and/or dynamically, e.g., time-of-day dependent.

The SNR for a particular terminal is dependent on various factors including (1) the path loss between the terminal and the serving (or home) cell and (2) the other-cell or other-terminal interference level. In a fixed-terminal system, the path loss for a terminal does not change appreciably and the prediction of the terminal's signal level may be accurately made. On the downlink, the interference level depends on the path losses from other interfering cells to the terminal as well as the path losses from the serving cell. And on the uplink, the interference level depends on the path losses from other interfering terminals to their serving cells as well as the path losses from these terminals to the cell of interest. Accurate estimation of the interference levels typically requires the instantaneous knowledge of which cells or terminals are transmitting and their power levels.

A number of assumptions may be made to simplify the interference characterization on the downlink and uplink. On the downlink, the interfering cells may be assumed to be operating at full power. On the uplink, one terminal in each cell may be allowed to transmit on each channel allocated to the cell, in which case the worst-case other-terminal interference levels may be determined based on the assumption that the interfering terminals will transmit at full power. Correspondingly, the worst-case SNR for each terminal in each cell may be estimated based on the assumption that this terminal and other interfering terminals will be transmitting at full power. The SNR values for the terminals in each cell may be collected and used to characterize an effective SNR CDF for the cell.

To derive the back-off factors for the channels, the terminals in each cell may be categorized based on their link margins, and the back-off factors may then be selected based on the link margin categorization. Using the example SNR distribution shown in FIG. 6B, the population of terminals may be categorized into sets, with each set including terminals experiencing similar interference levels (i.e., having SNR within a range of values). As an example, the CDF shown in FIG. 6B can be partitioned into $N_{ch}$ sets, where $N_{ch}$ is the total number of channels allocated per cell. The sets may be selected to be equal size (i.e., the same percentage of terminals is included in each set), although non-equal size set partitions may also be defined.

Table 3 identifies the $N_{ch}=12$ terminal sets and (column 2) tabulates the minimum SNR for the terminals in each of the 12 terminal sets. Since there are 12 terminal sets and each set is equal in size, each set includes approximately 8.3% of the terminals in the cell. The first set includes terminals having SNRs of 10 dB or less, the second set includes terminals having SNRs ranging from 10 dB to 13 dB, the third set includes terminals having SNRs ranging from 13 dB to 15 dB, and so on, and the last set includes terminals having SNRs greater than 34.5 dB.

TABLE 3

| Terminal Set | Minimum SNR in Range (dB) | s(n) (dB) | β(n) |
|---|---|---|---|
| 1 | <10 | <−5 | 1.0000 |
| 2 | 10 | −5 | 1.0000 |
| 3 | 13 | −2 | 1.0000 |
| 4 | 15 | 0 | 1.0000 |
| 5 | 17 | 2 | 0.6310 |
| 6 | 18.5 | 3.5 | 0.4467 |
| 7 | 20.5 | 5.5 | 0.2818 |
| 8 | 22 | 7 | 0.1995 |
| 9 | 24 | 9 | 0.1259 |
| 10 | 26 | 11 | 0.0794 |
| 11 | 29.5 | 14.5 | 0.0355 |
| 12 | >34.5 | >19.5 | 0.0112 |

The cells may be designed to support a particular setpoint $\gamma_{sp}$ (or operating point), which is the minimum required SNR in order to operate at a desired data rate with an acceptable error rate. In typical systems, the setpoint is a function of the instantaneous data rate selected by the terminals, and may thus vary from terminal to terminal. As a simple example, it is assumed that a setpoint of 15 dB is required by all terminals in the cell.

The minimum link margin, s(n), for each set of terminals may then be computed as:

$$s(n)=\min\{SNR(n)\}-\gamma_{sp} \text{ for } n=1, 2, \ldots, N_{ch}. \quad \text{Eq (60)}$$

The minimum link margin, s(n), for each set of terminals is the difference between the minimum SNR of the terminals in the set and the setpoint $\gamma_{sp}$. The minimum link margin s(n) represents the deviation from the required transmit power to the setpoint based on the assumption of full transmit power from all terminals in the system. A positive link margin indicates that the SNR is greater than necessary to achieve the desired level of performance defined by the setpoint. Thus, the transmit power of these terminals may be reduced (i.e., backed-off) by the amount proportional to their link margin and still provide the desired level of performance.

The back-off factors for each cell may then be derived based on knowledge of the path losses between the terminals and the cell and the characterization of the interference levels. If the maximum transmit power level is normalized as 1.0, then the normalized back-off factor for each set of terminals may be expressed as:

$$\beta(n)=\min(1.0, 10^{-0.1 \cdot s(n)}) \text{ for } n=1, 2, \ldots, N_{ch}. \quad \text{Eq (61)}$$

The back-off factor associated with a particular terminal set represents the reduction in the transmit power that can be applied to that set of terminals while still maintaining the desired setpoint $\gamma_{sp}$, and thus the desired level of performance. The back-off in transmit power is possible because these terminals are able to achieve better SNRs. By reducing the transmit power of a scheduled terminal by the back-off factor, the amount of interference due to this terminal on other terminals can be reduced without impacting the performance of this terminal.

Table 3 lists the minimum link margin s(n) (in column 3) and the back-off factor (in column 4) for each set of terminals for a setpoint $\gamma_{sp}$ of 15 dB. As shown in Table 3, channels 1 through 4 have link margins of 0 dB or less and channels 5 through 12 have progressively better link margins. Consequently, channels 1 through 4 are operated at full power and channels 5 through 12 are operated at progressively reduced power. The back-off factors may be imposed on transmissions from terminals in the associated terminal sets. For example, since the terminals in set 5 have SNR of 17 dB or better and a minimum link margin s(n) of 2 dB, then the transmit power for these terminals may be backed off to 63.1% of peak transmit power.

For terminals having SNRs that are below the setpoint $\gamma_{sp}$, a number of options may be applied. The data rate of the transmission from these terminals may be reduced to that which can be supported by the SNR. Alternatively, the interfering terminals or cells that cause the low SNR may be requested to (temporarily) reduce their transmit power or to stop transmitting on the affected channels until the low SNR terminals are satisfactorily served.

In an embodiment, once the back-off factors are determined for one cell in a reuse pattern, the back-off factors for other cells in the reuse pattern may be staggered. For example, for an $N_{reuse}=3$ (i.e., 3-cell) reuse pattern that operates with 12 channels and uses an $N_{ch}=4$ channel offset, the back-off factors for cell 2 can be offset by four modulo-$N_{ch}$, and the back-off factors for cell 3 can be offset by eight modulo-$N_{ch}$. For this reuse pattern, cell 1 applies the back-off factors associated with channel set 1 (which includes the channels and their back-off factors shown in the fourth column in Table 3), cell 2 applies the back-off factors associated with channel set 2 (which includes the channels and back-off factors shown in the fourth column in Table 3 but shifted down by four channels and wrapped around), and cell 3 applies the back-off factors associated with channel set 3 (which includes the channels and back-off factors shown in the fourth column in Table 3 but shifted down by eight channels and wrapped around). A 4-channel offset is employed in this example, but other offsets may also be used.

Table 4 tabulates the back-off factors for cells 1 through 3 using the back-off factors shown in Table 3 and a four-channel offset. For example, for channel 1, cell 1 applies the back-off factor associated with channel 1 of set 1, cell 2 applies the back-off factor associated with channel 9 of set 1, and cell 3 applies the back-off associated with channel 5 of set 1.

TABLE 4

| Channel, n | $\beta_1(n)$ Cell 1 | $\beta_1(n)$ Cell 2 | $\beta_1(n)$ Cell 3 |
| --- | --- | --- | --- |
| 1 | 1.0000 | 0.1259 | 0.6310 |
| 2 | 1.0000 | 0.0794 | 0.4467 |
| 3 | 1.0000 | 0.0355 | 0.2818 |
| 4 | 1.0000 | 0.0112 | 0.1995 |
| 5 | 0.6310 | 1.0000 | 0.1259 |
| 6 | 0.4467 | 1.0000 | 0.0794 |
| 7 | 0.2818 | 1.0000 | 0.0355 |
| 8 | 0.1995 | 1.0000 | 0.0112 |
| 9 | 0.1259 | 0.6310 | 1.0000 |
| 10 | 0.0794 | 0.4467 | 1.0000 |
| 11 | 0.0355 | 0.2818 | 1.0000 |
| 12 | 0.0112 | 0.1995 | 1.0000 |

At low loads, each of the cells assigns terminals to the "better" allocated channels. For the channel allocation shown in Table 4, the terminals in cell 1 are assigned to channels 1 through 4, the terminals in cell 2 are assigned to channels 5 through 8, and the terminals in cell 3 are assigned to channels 9 through 12. When the load in each cell is four terminals or less, there is no co-channel interference from the terminals in the adjacent cells (since the 12 channels are orthogonal to one another), and each terminal should be able to achieve its setpoint for downlink and uplink transmissions. When the load in any of the cells exceeds four terminals, then that cell may assign certain terminals to those channels that are not orthogonal to those of the other cells. Since the load typically varies independently in each cell, it is possible that the non-orthogonal channel assigned will not be occupied by any of the adjacent cells. The probability of this event (i.e., the probability of "non-collision") is a function of the load in each of the adjacent cells.

The channel structure with back-off may result in an increase in the effective margin observed by all terminals in the system. The back-off factors shown in Table 4 are initially derived based on the SNR CDF shown in FIG. 6B, which is generated with the assumption that the other cells are transmitting at full power (for the downlink) or the terminals in other cells are transmitting at full power (for the uplink). However, when the back-off factors are applied along with a staggered channel reuse scheme as shown in Table 4, the actual SNR values achieved by the terminals in each cell may be greater than the minimum SNR values provided in column 2 of the Table 3 since the interference from the other cells or the terminals in other cells is reduced by the applied back-off factors.

An actual system typically does not fit the idealized system model described above. For example, non-uniform distribution of terminals, non-uniform base station placement, varied terrain and morphology, and so on, all contribute to variations in the interference levels observed in each cell. The characterization of the cells and the normalization of performance in the cells is typically more complicated than that described above (i.e., the SNR CDFs for the cells are not likely to be identical). Furthermore, the terminals in each cell typically observe interference levels that are different from those observed by the terminals in other cells. Thus, more computations may be required to normalize the effective margins to within a particular threshold level across the cells in the system.

The back-off factors derived for each cell may thus be different and may not be modulo-shifted versions of the back-off factors for other cells in the reuse cluster. Moreover, different setpoints for the cells and/or channels may also be used to achieve a level of normalized performance, if so desired. The setpoints may also be altered to achieve non-uniform system performance. The effect of different C/I CDFs on the back-off factors and the adjustment of the back-off factors to improve system performance are described in U.S. patent application Ser. No. 09/539,157, entitled "Method and Apparatus for Controlling Transmissions of a Communications System," filed Mar. 30, 2000, assigned to the assignee of the present application and incorporated herein by reference.

A number of different schemes may be used to determine the back-off factors for the cells. In one scheme, a procedure to determine the back-off factors is iterated a number of times, and the back-off factors are adjusted in each iteration such that the maximum achievable setpoint for all channels is met. In an embodiment, the worst-case interference levels are assumed in determining the initial back-off factors. In another embodiment, other values may be used instead of the worst-case interference levels. For example, the average, median, or 95-percentile of the interference distribution may be used to determine the initial back-off factors. In yet another embodiment, the interference levels are adaptively estimated, and the back-off factors periodically adjusted to reflect the estimated interference levels. The back-off factors employed by each cell may or may not be communicated to neighboring cells.

In some embodiments, a subset of the allocated channels in a cell may be provided with some form of "protection". The protection may be achieved, for example, by reserving one or more channels on a periodic basis for exclusive use by terminals in the cell. The exclusivity may also be defined to be exercisable only when required, and only to the extent required to satisfy disadvantaged terminals. The protected channels may be identified to neighbor cells by various means. For example, a cell may communicate to its neighboring cells a list of channels that are protected. The neighbor cells may then reduce or prevent data transmission on the protected channels by terminals in their coverage areas. Channel protection may be used to serve disadvantaged terminals that cannot achieve the required SNR because of excessive interference from other terminals or other cells. For these cases, the channel protection may be removed once the disadvantaged terminals are served.

In some embodiments, a cell may impose "blocking" (i.e., no transmission by terminals within its coverage areas) on certain channels if the channel conditions deteriorate to an unacceptable level (e.g., if the FER is above a certain percentage, or the outage probability exceeds a particular threshold value). Each cell can measure the performance of the channels and self-impose blocking on poor performing channels until there is reasonable certainty that the channel conditions have improved and that reliable communication may be achieved.

The channel protection and blocking may be performed dynamically and/or adaptively based on, for example, the conditions of the cell.

Adaptive reuse and power back-off for the downlink and uplink are respectively described in further detail in the aforementioned U.S. patent application Ser. No. 09/539,157 and in U.S. patent application Ser. No. 09/848,937, entitled "Method and Apparatus for Controlling Uplink Transmissions of a Wireless Communication System," filed May 3, 2001, assigned to the assignee of the present application and incorporated herein by reference.

V. Scheduling

Various scheduling schemes may be designed and used to maximize system throughput by scheduling and assigning terminals to the allocated channels such that simultaneous data transmissions on these channels are supported. A scheduler can evaluate which specific combination of terminals provides the best system performance (e.g., the highest throughput) subject to any system constraints and requirements. By exploiting multi-user diversity, the scheduler can find combinations of "mutually compatible" terminals for simultaneous data transmission on the allocated channels. For a MIMO system, by exploiting the "spatial signatures" (and possibly the frequency signatures) of the individual terminals (i.e., their channel response estimates), the average system throughput may also be increased.

The terminals may be scheduled for data transmission based on various factors. One set of factors may relate to system constraints and requirements such as the desired quality of service (QoS), maximum latency, average data rate, and so on. Some or all of these factors may need to be satisfied on a per terminal basis (i.e., for each terminal) in a multiple-access system. Another set of factors may relate to system performance, which may be quantified by the average system throughput rate or some other indications of performance. These various factors are described in further detail below.

The scheduling may be performed for each transmission interval, which may be defined to be any duration of time (e.g., one frame or a number of frames).

The cells in the system may be operated based on an adaptive reuse plan (formulated in the manner described above) and in accordance with the prescribed rules and conditions. During normal operation, each cell receives requests from a number of terminals in the cell for data transmission. The cells then schedule terminals for data transmission to meet the goals and requirements. The scheduling may be performed at each cell (i.e., for a distributed scheduling scheme), by a central scheduler (i.e., for a centralized scheduling scheme), or by a hybrid scheme in which some of the cells schedule their own transmissions and a central scheduler schedules transmissions for a set of cells.

In the following, the scheduling is initially described for a system in which the terminals operate in the SISO mode. Scheduling for single-user and multi-user MIMO modes and mixed modes are described subsequent to that.

1. Parameters for Scheduling Terminals and Assigning Channels

Various factors may be considered in scheduling terminals for data transmission and in assigning channels to the terminals. These factors include (1) one or more channel metrics, (2) the priorities assigned to active terminals, (3) criteria related to fairness, and other factors.

One or more channel metrics may be used to schedule terminals and/or assign channels. Such channel metrics may include metrics based on throughput, interference, outage probability, or some other measures. An example of a channel metric indicative of "goodness" is described below. However, it will be recognized that other channel metrics may also be formulated and are within the scope of the invention.

The channel metric for a given terminal may be based on various factors such as (1) the terminal's path loss, (2) the total available transmit power, (2) the interference characterization, (3) the back-off factors, and possibly others. In an embodiment, a channel metric, $d_m(n,k)$, for active terminals may be defined as follows:

$$d_m(n,k) = f\{\beta_m(n) \cdot P_{max}(k) \cdot \zeta_m(k) / I_m(n)\}, \qquad \text{Eq (62)}$$

where:
$\beta_m(n)$ is the back-off factor associated with channel n of cell m, with $0 \leq \beta \leq 1$ (when $\beta_m(n)=0$, this is equivalent to preventing channel n from being used in cell m);
$P_{max}(k)$ is the maximum transmit power for terminal k;
$\zeta_m(k)$ is the path loss between terminal k and cell m;
$I_m(n)$ is the interference power observed on channel n in cell m; and
$f(x)$ is a function that describes the "goodness" of the argument x, where x is proportional to the SNR.

For the uplink, the exact computation of the interference, $I_m(n)$, requires the knowledge of the path losses from each interfering terminal (i.e., those assigned to the same channel n) to its serving cell as well as to cell m under consideration. The path loss to the serving cell determines the amount of power to be transmitted by the interfering terminal, if power control is used. And the path loss to cell m determines the amount of transmit power from the interfering terminal will be received at cell m as interference. Direct computation of the other-cell interference, $I_m(n)$, is typically not practical since information about the interfering terminals is normally not available (e.g., these terminals are being scheduled and assigned by other cells at approximately the same time) and the path loss characterization for these terminals is typically not accurate (e.g., likely based on averages and may not reflect fading).

The interference, $I_m(n)$, may thus be estimated based on various schemes. In one interference estimation scheme, each cell maintains a histogram of the received interference power for each channel. The total receive power, $I_{o,m}(n)$, at cell m for channel n comprises the power, $C_k(n)$, received for the scheduled terminal k in channel n and the interference power received from other interfering terminals in other cells (plus thermal and other background noise). Thus, the other-cell interference may be estimated as:

$$\hat{I}_m(n) = I_{o,m}(n) - C_k(n), \qquad \text{Eq (63)}$$

where $\hat{I}_m(n)$ is the estimated other-cell interference for cell m in channel n. The other-cell interference, $\hat{I}_m(n)$, may be estimated for each channel and at each transmission interval to form a distribution of the other-cell interference for each channel. An average value, worst case, or some percentile of this distribution may then be used as the other-cell interference $I_m(n)$ in equation (62).

Various functions $f(x)$ may be used for the channel metric. In one embodiment, the channel metric $d_m(n,k)$ represents the outage probability for terminal k in cell m in channel n. In another embodiment, the channel metric $d_m(n,k)$ represents the maximum data rate that may be reliably sustained at the SNR=x. Other functions may also be used for the channel metric and are within the scope of the invention.

The channel metric $d_m(n,k)$ may be used to schedule terminals for data transmission or to assign channels to terminals, or both. In scheduling terminals and/or assigning channels, the channel metric may be computed for each active terminal for each channel in the cell. Each terminal may be associated with up to $N_{ch}$ values indicative of the expected performance for up to $N_{ch}$ channels available for assignment. For a particular terminal, the channel having the best metric may be the best channel to assign to the terminal. For example, if the channel metric $d_m(n,k)$ represents the outage probability, then the channel with the lowest outage probability is the best channel to assign to the terminal.

The channel metric $d_m(n,k)$ may be computed to a degree of confidence based on estimates of the parameters that comprise the function $f(x)$ (e.g., the path loss from terminal k to cell m, the interfering power $I_m(n)$ observed by cell m, and so on). The value of $d_m(n,k)$ may be averaged over a time period to improve accuracy. Fluctuations in the value of $d_m(n,k)$ are likely to occur due to small signal fading of both signal and interference, changes in the location of interference source causing changes in the interference power, and perhaps occasional shadow (e.g., a truck blocking the main signal path). To account for the fluctuations, channels with larger back-off factors may be selected to provide some margins, and the data rates may also be adapted based on changes in the operating conditions.

Terminals may be scheduled for data transmission and assigned channels based on their priorities such that higher priority terminals are generally served before lower priority terminals. Prioritization typically results in a simpler terminal scheduling and channel assignment process and may also be used to ensure a certain level of fairness among terminals, as described below. The terminals in each cell may be prioritized based on a number of criteria such as, for example, the average throughput, the delays experienced by the terminals, and so on. Some of these criteria are discussed below.

In one terminal prioritization scheme, terminals are prioritized based on their average throughput. In this scheme, a "score" is maintained for each active terminal to be scheduled for data transmission. A cell can maintain the scores for the active terminals it services (i.e., for a distributed control scheme) or a central controller can maintain the scores for all active terminals (i.e., in a centralized control scheme). The active status of a terminal may be established at higher layers of the communication system.

In an embodiment, a score $\phi_k(i)$ indicative of an average throughput is maintained for each active terminal. In one implementation, the score $\phi_k(i)$ for terminal k at frame i is computed as an exponential average throughput, and may be expressed as:

$$\phi_k(i)=\alpha_1 \cdot \phi_k(i-1)+\alpha_0 \cdot r_k(i)/r_{max}, \qquad \text{Eq (64)}$$

where $\phi_k(i)=0$, for $i<0$, $r_k(i)$ is the data rate for terminal k at frame i (in unit of bits/frame), and $\alpha_0$ and $\alpha_1$ are time constants for the exponential averaging.

Typically, $r_k(i)$ is bounded by a particular maximum achievable data rate, $r_{max}$, and a particular minimum data rate (e.g., zero). A larger value for $\alpha_1$ (relative to $\alpha_0$) corresponds to a longer averaging time constant. For example, if $\alpha_0$ and $\alpha_1$ are both 0.5, then the current data rate $r_k(i)$ is given equal weight as the score $\phi_k(i-1)$ from the prior transmission intervals. The score $\phi_k(i)$ is approximately proportional to the normalized average throughput of the terminal.

The data rate $r_k(i)$ may be a "realizable" (i.e., "potential") data rate for terminal k based on the achieved (i.e., measured) or achievable (i.e., estimated) SNR for this terminal. The data rate for terminal k can be expressed as:

$$r_k(i)=c_k \cdot \log_2(1+SNR_k), \qquad \text{Eq (65)}$$

where $c_k$ is a positive constant that reflects the fraction of the theoretical capacity achieved by the coding and modulation scheme selected for terminal k. The data rate $r_k(i)$ may also be the actual data rate to be assigned in the current scheduling period, or some other quantifiable data rates. The use of the realizable data rate introduces a "shuffling" effect during the channel assignment process, which may improve the performance of some disadvantaged terminals, as described below.

In another implementation, the score $\phi_k(i)$ for terminal k at frame i is computed as a linear average throughput achieved over some time interval, and can be expressed as:

$$\phi_k(i) = \frac{1}{K}\sum_{j=i-K+1}^{i} r_k(j)/r_{max}. \qquad \text{Eq (66)}$$

The average (realizable or actual) throughput of the terminal can be computed over a particular number of frames (e.g., over the latest 10 frames) and used as the score. Other formulations for the score $\phi_k(i)$ for active terminals can be contemplated and are within the scope of the present invention.

When a terminal desires data transmission, its score is initialized to zero and thereafter updated in each frame. Whenever a terminal is not scheduled for transmission in a frame, its data rate for the frame is set to zero (i.e., $r_k(i)=0$) and its score is updated accordingly. If a frame is received in error by a terminal, then the terminal's effective data rate for that frame may be set to zero. The frame error may not be known immediately (e.g., due to round trip delay of an acknowledgment/negative acknowledgment (Ack/Nak) scheme used for the data transmission) but the score can be adjusted accordingly once this information is available.

A scheduler may use the scores to prioritize terminals for scheduling and/or channel assignment. In a specific embodiment, the set of active terminals is prioritized such that the terminal with the lowest score is assigned the highest priority, and the terminal with the highest score is assigned the lowest priority. The scheduling processor may also assign non-uniform weighting factors to the terminal scores in performing the prioritization. Such non-uniform weighting factors can take into account others factors (such as those described below) to be considered in determining terminal priorities.

The priority of a terminal may also be made a function of various other factors such as, for example, payload requirements, the achievable SNR and required setpoint, the delays experienced by the terminals, outage probability, interference to adjacent cells, interference from other cells, data rates, the maximum transmit powers, the type of data to be transmitted, the type of data services being offered, and so on. A large payload may be assigned to a channel with a larger back-off factor, and may be assigned a higher priority since it is typically more difficult to schedule data transmission for a large payload. A terminal with a higher achieved SNR may be assigned higher priority if higher average system throughput is desired. A terminal experiencing longer delays may be upgraded in priority to ensure a minimum level of service. Higher priority may be assigned to data that is time-critical (e.g., retransmitted data). The above is not an exhaustive list. Other factors may also be contemplated and are within the scope of the invention.

The factors may be weighted and combined to derive the priorities of the terminals. Different weighting schemes may be used depending on the set of system goals being optimized. As an example, to optimize the average throughput of the cell, greater weight may be given to the terminals' achievable SNR.

A fairness criterion may be imposed in scheduling terminals and assigning channels to ensure (or may be even guarantee) a minimum grade of service (GoS). The fairness criterion is typically applied to all terminals in the system, although a particular subset of the terminals (e.g., premium terminals) may also be selected for application of the fairness criterion.

For the terminal prioritization scheme described above, the allocation of resources may be made on the basis of the ratio of scores. In this case, the scores of all active terminals may be referenced to the maximum of the terminal scores to form a modified score $\hat{\phi}_k(i)$, which can be expressed as:

$$\hat{\phi}_k(i) = \phi_k(i) \Big/ \max_k \{\phi_k(i)\}. \qquad \text{Eq (67)}$$

The resources allocated to a particular terminal may then be based on their modified score. For example, if terminal 1 has a score that is twice that of terminal 2, then the scheduler may allocate a channel (or a number of channels) having the capacity necessary to equalize the data rates of these two terminals (provided that such channel(s) are available). As a fairness consideration, the scheduler may attempt to normalize data rates for each transmission interval. Other fairness criteria may also be imposed and are within the scope of the invention.

2. Scheduling with Adaptive Reuse

Scheduling schemes may be implemented to incorporate the structured channel power limits that may be imposed on the uplink and downlink channels, as described above for the power back-offs. On the downlink, terminals may be assigned channels that have maximum power limitations that are consistent with their selected mode of operation, data rate, and setpoint. On the uplink, a similar scheduling scheme may be used whereby terminals having similar link margins are assigned channels that are consistent with their operating modes, data rates, and peak power limitations.

The system may be designed to use power control as well as rate control. Maximization of throughput for both the downlink and uplink involves using known setpoints for the different operating modes and associated data rates. In allocating resources, the scheduling schemes may determine the minimum transmit power required to support a given data rate and operating mode. On the downlink, the power adjustment can be made on a per user basis. On the uplink this information may be conveyed to the terminals either explicitly or implicitly (e.g., by assigning a specific channel that has an understood maximum power limit associated with it).

Figure 8A:
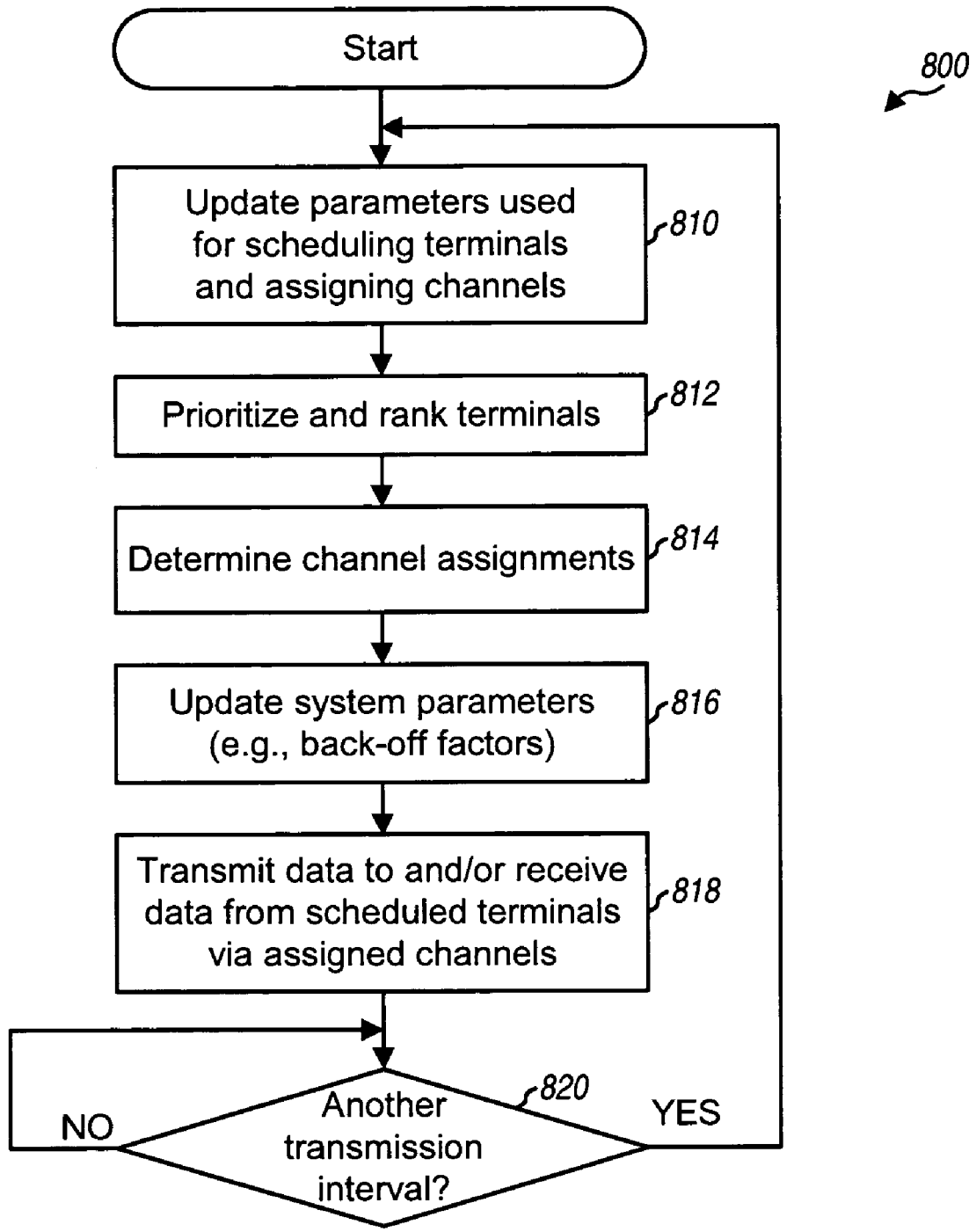
FIG. 8A is a flow diagram of an embodiment of a process to schedule terminals for data transmission based on priority.

FIG. 8A is a flow diagram of an embodiment of a process 800 to schedule terminals for data transmission based on a priority-based scheduling scheme. This priority-based scheduling scheme may be used for the downlink or uplink, and further schedules active terminals for data transmission based on their priorities. The particular number of terminals that may be scheduled for data transmission in each transmission interval may be limited by the number of available channels. For example, up to $N_{ch}$ terminals per cell may be scheduled for transmission on the $N_{ch}$ available channels.

Initially, parameters to be used for scheduling terminals are updated, at step 810. These parameters may include the back-off factors, the interference characterization, the path losses for the terminals, and possibly others. The parameters may be used to determine the channel metrics for the terminals, as described above.

The terminals are then prioritized and ranked, at step 812. Generally, only active terminals desiring data transmission are considered for scheduling, and these terminals are prioritized and ranked. Prioritization of terminals may be performed using any one of a number of terminal-rating schemes and may be based on one or more factors such as the average throughput, payload, and so on. The active terminals are then ranked accordingly based on their priorities, from highest priority to lowest priority.

The available channels are then assigned to the active terminals, at step 814. The channel assignment typically involves a number of steps. First, one or more channel metrics may be computed for each terminal for each available channel based on the updated parameters. Any number of channel metrics may be used, such as the one shown in equation (62). The terminals are then assigned to the available channels based on their priorities, the computed channel metrics, and possibly other factors such as demand requirements. The channel assignment may be performed based on various channel assignment schemes, some of which are described below.

A channel assignment may imply a specific channel assigned for data transmission as well as a data rate to be used. Each of the possible data rates may be associated with a respective coding and modulation scheme. Each scheduled terminal may know (e.g., a priori) the proper coding and modulation scheme to be used based on the assigned data rate. Alternatively, the coding and modulation scheme may be conveyed to the scheduled terminal.

System parameters are then updated to reflect the channel assignments, at step 816. The system parameters to be updated may include, for example, adjustments to the back-off factors for the channels in the cell based on (1) the channel assignments for the scheduled terminals in this cell, (2) requests for adjustment of back-off factors from other cells, and so on. The cell may also request adjustments of the back-off factors by neighbor cells.

Data is then transmitted to or received from the scheduled terminals via the assigned channels, at step 818. From the data transmissions, various quantities may be estimated and used for a future transmission interval, such as the interference observed on each channel. Generally, steps 810 through 818 are performed during normal operation of the cell. At step 820, a determination is made whether another transmission interval has occurred. If the answer is yes, then the process returns to step 810 and the terminals are scheduled for the next transmission interval. Otherwise, the process waits at step 820. Some of these steps are described in further detail below.

Channel Assignment

The available channels may be assigned to active terminals based on various schemes and taking into account various factors. These channel assignment schemes include (1) a priority-based channel assignment scheme, (2) a demand-based channel assignment scheme, (3) a channel assignment with upgrade scheme, and others.

In a priority-based channel assignment scheme, channel assignment is performed for one terminal at a time, with the highest priority terminal being considered first for channel assignment and the lowest priority terminal being considered last for channel assignment. All active terminals in the cell are initially prioritized based on a number of factors such as those described above.

Figure 8B:
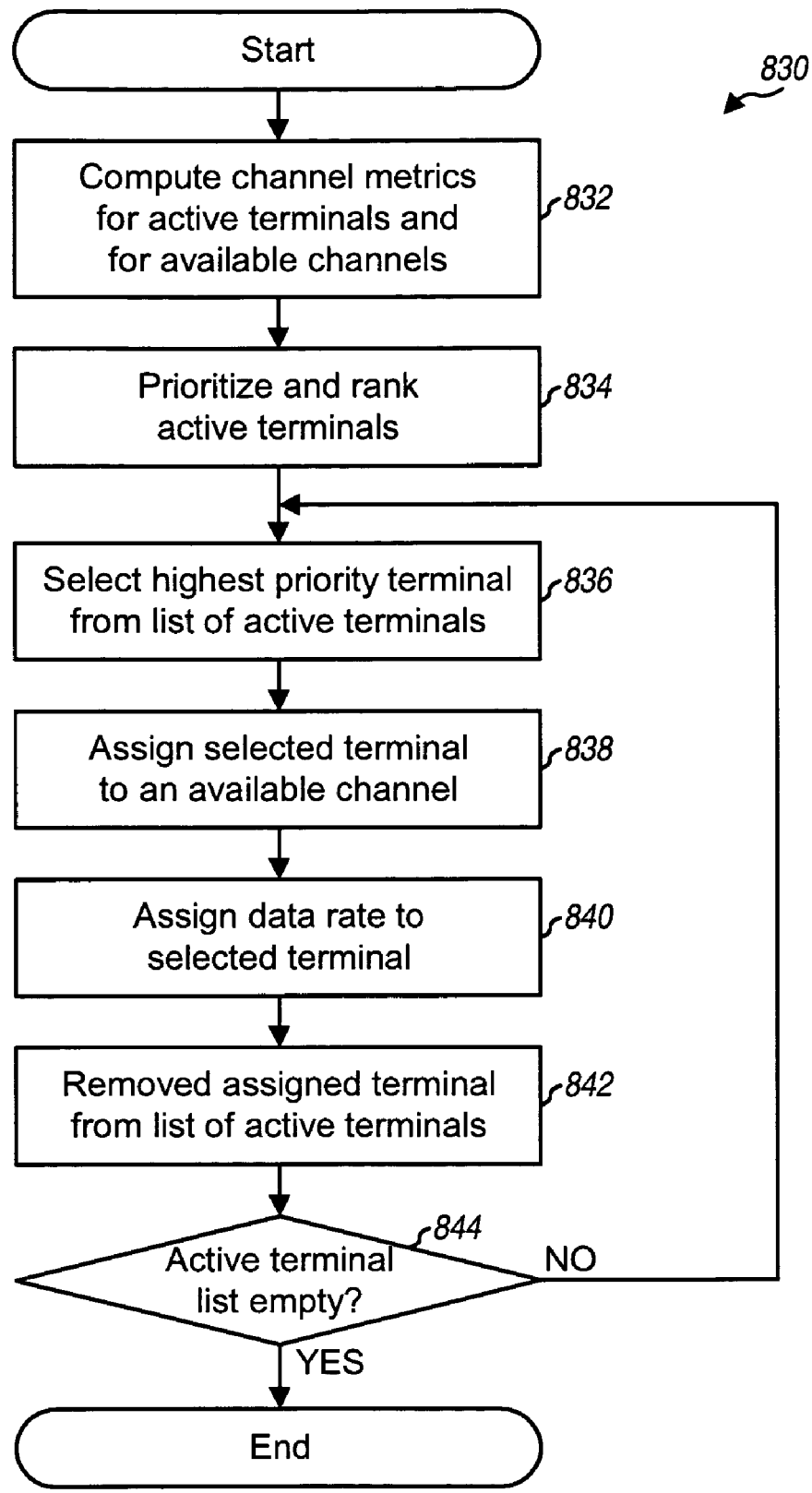
FIG. 8B is a flow diagram of an embodiment of a process to assign channels to terminals based on priority.

FIG. 8B is a flow diagram of an embodiment of a process 830 for a priority-based channel assignment scheme. Initially, channel metrics are computed for the active terminals and for the available channels, at step 832. Various channel metrics may be used, such at those described above. The active terminals are then prioritized and ranked based on the factors described above, at step 834. The prioritization may also be based on the channel metrics computed in step 832. The terminal priority and channel metrics are then used to perform channel assignment.

At step 836, the highest priority terminal is selected from the list of active terminals, and is assigned an available channel, at step 838. In one embodiment, the selected terminal is given the first choice of channel and is assigned an available channel with the best channel metric. In another embodiment, the selected terminal is assigned an available channel with the worst metric that still meets the terminal's requirements. The selected terminal is also assigned a particular data rate determined based on (1) the maximum rate required by the terminal, (2) the available transmit power and the back-off factor associated with the assigned channel, and (3) the terminal's requirements (e.g., outage criterion), at step 840.

The assigned terminal is then removed from the list of active terminals, at step 842. A determination is then made whether the active terminal list is empty, at step 844. If the list is not empty, then the process returns to step 836 and an unassigned terminal with the highest priority in the list is selected for channel assignment. Otherwise, if all active terminals have been assigned channels, then the process terminates.

In an embodiment, if there is a tie during the channel assignment (e.g., multiple terminals have the same or similar channel metrics), then the channels are not assigned immediately. Instead, those channels that resulted in the tie are tagged and the evaluation of other lower priority terminals continues. If the next terminal has its largest metric associated with any one of the tagged channels, then that channel may be assigned to that terminal and removed from the list of available channels. When the list of tagged channels for a particular terminal is reduced to one, the remaining channel is assigned to the highest priority terminal that tagged that channel.

If the channel assignments result in a terminal having additional link margin over that required for the assigned data rate (i.e., the SNR of the terminal on the assigned channel is greater than the setpoint), then (1) the data rate of the terminal may be increased to a level that satisfies the required level of performance, or (2) the transmit power may be reduced (e.g., by lowering the back-off factor) by up to the amount of the link margin to reduce interference in the system. The increased data rate of the terminal, as supported by the effective link margin, increases throughput for the terminal as well as the system. Power control may thus be effectively exercised for each scheduled terminal by adjustment of the data rate and/or back-off factor based on its channel assignment.

If a terminal is assigned a channel not capable of supporting the desired data rate, then (1) the terminal may be scheduled to transmit at a reduced data rate ("dimming"), or (2) data transmission for the terminal may be skipped for the current transmission interval ("blanking"), in which case the channel may be made available to another active terminal, or some other action may be performed. The priority of a terminal that is dimmed or blanked may be increased, improving the terminal's chances for earlier consideration in the next transmission interval.

In a demand-based channel assignment scheme, the demand or payload requirements of the terminals are considered when making channel assignments such that the available system resources may be better utilized. For a particular set of available channels, a terminal having smaller payload requirements (which may be satisfied with a lower data rate) may be serviced by a number of available channels whereas a terminal having larger payload requirements (which may require a higher data rate) may be serviced by a reduced number of available channels.

A flow diagram for the demand-based channel assignment scheme may be implemented similar to that shown for the priority-based channel assignment scheme in FIG. 8B. In one embodiment, each terminal selected for channel assignment is assigned an available channel with the worst metric that still meets the terminal's requirements. In another embodiment, the priorities of the terminals may be modified such that terminals with larger payloads are considered for assignment earlier. Numerous other variations are also possible and are within the scope of the invention.

In a channel assignment with upgrade scheme, the active terminals are initially assigned channels (e.g., based on their priorities or demands as described above) and thereafter upgraded to better channels if any is available. In certain embodiments of the schemes described above, higher priority terminals may be initially assigned to the worst channels that still satisfy their requirements, and better channels are saved for lower priority terminals in case they are needed. These schemes may result in successively lower priority terminals being assigned to successively better channels associated with larger back-off factors that are closer to unity (i.e., greater transmit power).

If the number of active terminals is less than the number of available channels, it may be possible to upgrade the terminals to better channels. A terminal may be upgraded to another unassigned channel that has a higher margin than its initial assigned channel. The reason for upgrading the terminal is to increase reliability and/or lower the effective transmit power required to support the transmission. That is, since a number of unassigned channels satisfies the terminal's requirements, reassigning the terminal to the channel with higher margin allows for reduction in the transmit power by the amount of margin.

Various schemes may be used to upgrade channels, some of which are described below. Other channel upgrade schemes may also be implemented and are within the scope of the invention.

In one channel upgrade scheme, terminals are reassigned to better available channels, if these channels meet the requirements of the terminals and can provide larger link margins. The channel upgrade may be performed based on priority such that higher priority terminal are upgraded first and lower priority terminals are upgraded later if channels are available. This upgrade scheme may allow some or all of the active terminals to enjoy better channels having higher link margins.

Figure 8C:
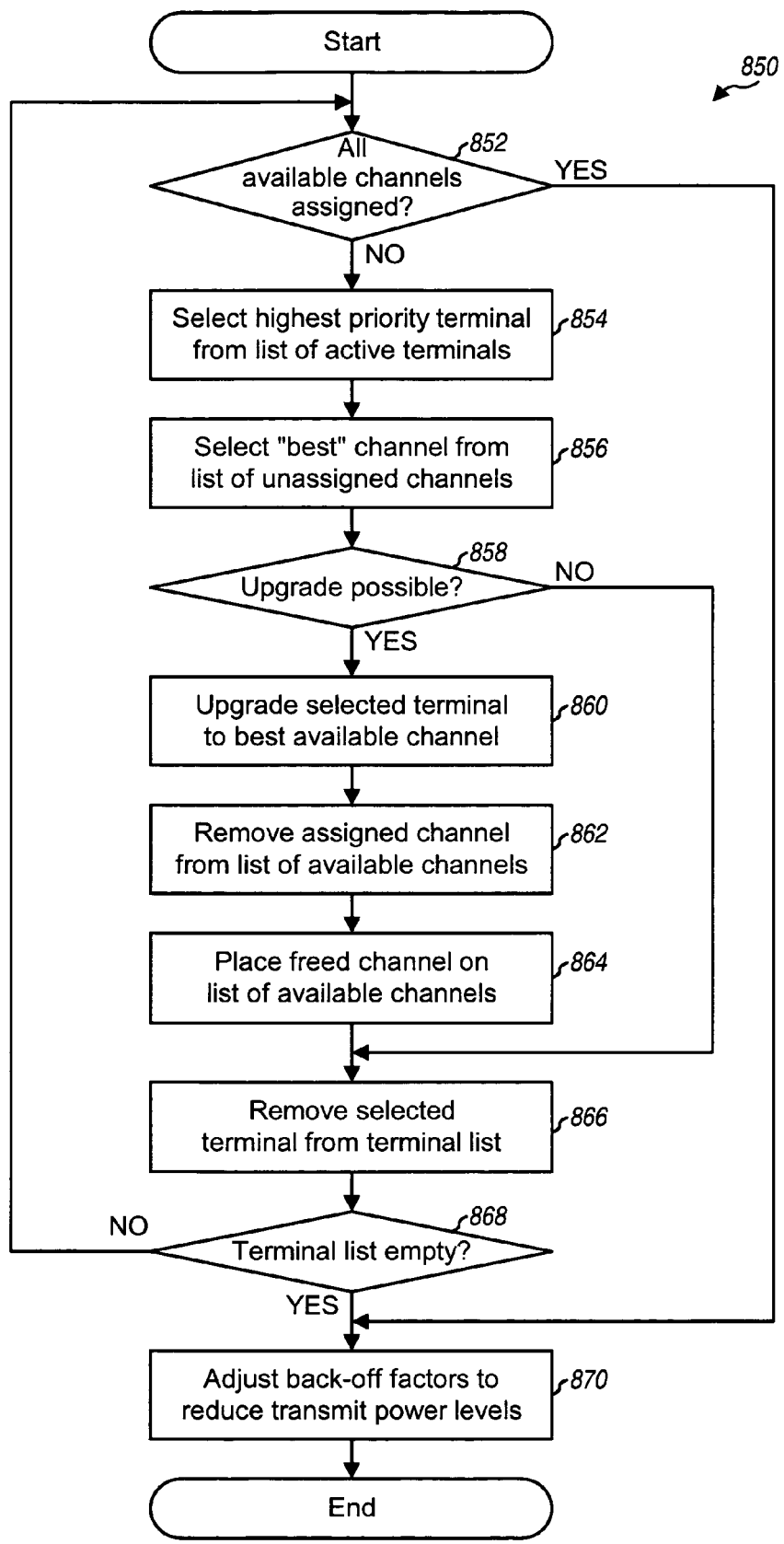
FIG. 8C is a flow diagram of an embodiment of a process to upgrade terminals to better channels based on priority.

FIG. 8C is a flow diagram of an embodiment of a process 850 to upgrade terminals to better channels based on their priorities. Prior to commencing the channel upgrade process, the active terminals are assigned to their initial channel assignments, which may be achieved using the channel assignment scheme described above in FIG. 8B. At step 852, a determination is made whether all available channels have been assigned to active terminals. If all channels have been assigned, no channels are available for upgrade and the process proceeds to step 870. Otherwise, the terminals are upgraded to the available channels, if these channels are better (i.e., associated with better channel metrics) than the original assigned channels.

At step 854, the highest priority terminal from the list of active terminals is selected for possible channel upgrade. For the selected terminal, the "best" channel from the list of unassigned channels is selected, at step 856. The best channel may correspond to the channel having the best channel metric for the selected terminal.

A determination is then made whether an upgrade is possible for the selected terminal, at step 858. If the channel metric of the best available channel is worse than that of the channel originally assigned to the selected terminal, then no upgrade is performed and the process proceeds to step 866. Otherwise, the selected terminal is upgraded to the best available channel, at step 860, which is then removed from the list of available channels, at step 862. The channel initially assigned to the selected terminal may be placed back on the list of available channels for possible assignment to some other lower priority terminal, at step 864. The selected terminal is then removed from the list of active terminals, at step 866, regardless of whether or not a channel upgrade was performed.

At step 868, a determination is made whether the list of active terminals is empty. If the terminal list is not empty, the process returns to step 852 and the highest priority in the list is selected for possible channel upgrade. Otherwise, if no channels are available for upgrade or if all active terminals have been considered, then the process proceeds to step 870 and the back-off factors for all channels are adjusted to reduce the transmit powers of the scheduled and assigned terminals. The process then terminates.

The upgrade process in FIG. 8C effectively upgrades active terminals to the available channels that are more likely to provide improved performance. The channel upgrade scheme shown in FIG. 8C may be modified to provide improved channel upgrades. For example, for a particular terminal, it may be possible that a channel freed up by a lower priority terminal is better for this terminal. However, the terminal is not assigned to this channel because it has already been removed from the terminal list by the time the lower priority terminal is considered. The process in FIG. 8C may thus be iterated a number of times, or other tests may be performed to account for this situation.

In another channel upgrade scheme, the assigned terminals are upgraded by the number of available channels. For example, if three channels are available, each scheduled and assigned terminals move up by three slots. This upgrade scheme allows most (if not all) terminals to enjoy better channels.

In another channel assignment scheme, the differences between the channel metrics associated with the channels may be taken into account in the channel assignment. In some instances, it may be better to not assign the highest priority terminal the channel with the best channel metric. For example, a number of channels may be associated with approximately similar metrics for a particular terminal, or a number of channels may provide the required SNR. In these instances, the terminal may be assigned one of several channels and still be properly served. If a lower priority terminal has as its best channel the same one selected by a higher priority terminal, and if there is a large disparity between the lower priority terminal's best and second best channels, then it may be more optimal to assign the higher priority terminal its second best channel and assign the lower priority terminal its best channel.

In yet another channel assignment scheme, the highest priority terminal tags the available channels that provide the required performance (similar to the tagging of tied channels described above). The next lower priority terminal then tags its acceptable channels. The channel assignment is then performed such that lower priority terminals are assigned channels first but channels needed by higher priority terminals are reserved.

In yet another channel assignment scheme, the channels are more optimally assigned to active terminals in the cell by considering a large number of permutations of channel assignments over the group of active terminals in the cell. In this case, the channel assignment decision for a particular terminal is not made on the basis of the terminal's metrics and priority alone. In an implementation, the terminal's priority can be converted into a weight that is used to scale the metrics in the computation of the channel assignments in the cell.

Other factors may also be considered in scheduling terminals for data transmission and assigning channels. First, a particular terminal may be assigned to multiple channels if such channels are available and if one channel is not capable of meeting the terminal's requirements. Second, a particular terminal may be assigned to different channels for different transmission intervals to provide a "shuffling" effect, which may provide interference averaging in certain instances and may improve the performance of a disadvantaged terminal. Third, the probabilities of other terminals transmitting on a particular channel may be taken into account. If a number of channels have nearly equal channel metrics without taking into account the occupancy probabilities, then the channel with the lowest probability of being used in other cells may be assigned. Fourth, excessive outage probability may be considered in making the channel assignments. If a terminal's expected outage probability for a particular channel is excessive, then there may be a reasonable likelihood that the entire transmission on that channel will be corrupted and would need to be re-transmitted, and it may be better to not assign the channel at all or to assign the channel to another terminal that may make better use of it.

The available channels may also be assigned to terminals with zero or more conditions or constraints on usage. Such conditions may include, for example (1) limitation on the data rate, (2) maximum transmit power, (3) restriction on the setpoint, and so on. Maximum transmit power constraints may be placed on certain assigned channels. If the cells in the system have knowledge of the power constraints for the channels in other cells, then the interference levels may be computed locally with higher degree of certainty and better planning and scheduling may be possible.

A particular setpoint may be imposed on an assigned channel, for example, in heavily loaded situations. A (e.g., low-priority) terminal may be assigned a channel that does not meet the required minimum outage probability (i.e., the assigned channel has an expected SNR that is lower than required). In this case, the terminal may be required to operate using the assigned channel at a lower setpoint that satisfies the required performance criteria. The setpoint employed may be static or adjustable with system loading. Also, the setpoint may be imposed on a per channel basis.

3. Downlink Scheduling for MIMO System

An aspect of the invention provides techniques to increase the downlink capacity of a MIMO system (e.g., a multiple-access cellular system). Data may be transmitted from a base station to one or more terminals using one of a number of different operating modes, which are described above. In the single-user MIMO mode, the available downlink resources may be allocated to a single MIMO terminal. In the multi-user MIMO mode (which is also referred to as the N-SIMO mode), the downlink resources may be allocated to a number of (N) distinct SIMO terminals, with each terminal demodulating a single data stream. And in the mixed mode, the downlink resources may be allocated to a combination of SIMO and MIMO terminals, with both types of terminals being simultaneously supported on the same channel.

With MIMO, multiple independent data streams may be transmitted from the base station via multiple transmit antennas to one or more scheduled terminals. If the propagation environment has sufficient scattering, MIMO receiver processing techniques may be used at the terminals to efficiently exploit the spatial dimensionalities of the MIMO channel to increase transmission capacity. From the terminal's perspective, the same receiver processing techniques may be used to process $N_T$ different signals intended for that terminal (e.g., a single MIMO terminal) or just one of the $N_T$ signals (i.e., SIMO terminals).

As shown in FIG. 1, the terminals may be randomly distributed in the cell or may be co-located. For a wireless communication system, the link characteristics typically vary over time due to a number of factors such as fading and multipath. At a particular instant in time, the channel response between a base station's array of $N_T$ transmit antennas and the $N_R$ receive antennas for a single terminal may be characterized by the channel response matrix $\underline{H}$ whose elements are composed of independent Gaussian random variables, as follows:

$$\underline{H} = [\underline{h}_1 \underline{h}_2 \cdots \underline{h}_{N_T}] = \begin{bmatrix} h_{1,1} & h_{1,2} & \cdots & h_{1,N_T} \\ h_{2,1} & h_{2,2} & \cdots & h_{2,N_T} \\ \vdots & \vdots & & \vdots \\ h_{N_R,1} & h_{N_R,2} & \cdots & h_{N_R,N_T} \end{bmatrix}, \quad \text{Eq (68)}$$

where $h_{i,j}$ is the coupling between the base station's j-th transmit antenna and the terminal's i-th receive antenna (i.e., the (i,j) transmit-receive antenna pair). For simplicity, equation (68) describes a channel characterization based on a flat fading channel model (i.e., one complex value for the entire system bandwidth). In an actual operating environment, the channel may be frequency-selective and a more detailed channel characterization may be used (e.g., each element of the matrix $\underline{H}$ may include a set of values for different frequency subchannels or time delays).

The active terminals in the MIMO system (i.e., those desiring a data transmission in an upcoming transmission interval) periodically estimate the channel response for each transmit-receive antenna pair and reports CSI indicative of the estimated channel response to the base station. The aggregate CSI received from the collection of active terminals may then be used to (1) select the best set of one or more terminals for data transmission, (2) assign the available transmit antennas to the selected terminals, and (3) select the proper coding and modulation scheme for each transmit antenna. With the available CSI, various scheduling schemes may be designed to maximize the downlink performance by evaluating which specific combination of terminals and antenna assignments provide the best system performance (e.g., the highest throughput) subject to any system constraints and requirements. By exploiting the spatial (and possibly frequency) signatures of the individual active terminals (i.e., their channel estimates), the average downlink throughput may be increased.

For simplicity, various downlink scheduling schemes are described below for a MIMO system without OFDM in which one independent data stream may be transmitted by the base station from each transmit antenna. In this case, (up to) $N_T$ independent data streams may be simultaneously transmitted by the base station from $N_T$ transmit antennas and targeted to one or more terminals, each equipped with $N_R$ receive antennas (i.e., $N_T \times N_R$ MIMO), where $N_R \geq N_T$.

For simplicity, the number of receive antennas is assumed to be equal to the number of transmit antennas (i.e., $N_R = N_T$) for much of the description below. This is not a necessary condition since all of the analysis applies for the case where $N_R \geq N_T$.

The scheduling of data transmission on the downlink for a MIMO system comprises two parts: (1) selection of one or more sets of terminals for evaluation, and (2) assignment of the available transmit antennas to the selected terminals. All or only a subset of the active terminals may be considered for scheduling, and these terminals may be combined to form one or more sets (i.e., hypotheses) to be evaluated. For each hypothesis, the available transmit antennas may be assigned to the terminals in the hypothesis based on any one of a number of antenna assignment schemes. The terminals in the best hypothesis may then be scheduled for data transmission in an upcoming transmission interval. The flexibility in both selecting the best set of terminals for data transmission and assigning the transmit antennas to the selected terminals allows the scheduler to optimize performance by exploiting multi-user diversity environment.

In order to determine the "optimum" transmission to a set of terminals, the SNRs or some other sufficient statistics are provided for each terminal and each spatial subchannel. If the statistic is the SNR, then for each set of terminals to be evaluated for data transmission in an upcoming transmission interval, a hypothesis matrix $\Gamma$ of post-processed SNRs for this terminal set may be expressed as:

$$\Gamma = \begin{bmatrix} \gamma_{1,1} & \gamma_{1,2} & \cdots & \gamma_{1,N_T} \\ \gamma_{2,1} & \gamma_{2,2} & \cdots & \gamma_{2,N_T} \\ \vdots & \vdots & & \vdots \\ \gamma_{N_T,1} & \gamma_{N_T,2} & \cdots & \gamma_{N_T,N_T} \end{bmatrix}, \quad \text{Eq (69)}$$

where $\gamma_{i,j}$ is the post-processed SNR for a data stream (hypothetically) transmitted from the j-th transmit antenna to the i-th terminal.

In the multi-user MIMO mode, the $N_T$ rows in the hypothesis matrix $\Gamma$ correspond to $N_T$ vectors of SNRs for $N_T$ different terminals. In this mode, each row in the hypothesis matrix $\Gamma$ gives the SNR of each transmit data stream for one terminal. And in the mixed-mode, for a particular MIMO terminal designated to receive two or more data streams, that terminal's vector of SNRs may be replicated such that the vector appears in as many rows as the number of data streams to be transmitted for the terminal (i.e., one row per data stream). Alternatively, one row in the hypothesis matrix $\Gamma$ may be used for each SIMO or MIMO terminal, and the scheduler may be designed to mark and evaluate these different types of terminals accordingly.

For each terminal in the set to be evaluated, the $N_T$ (hypothetically) transmitted data streams are received by the terminal's $N_R$ receive antennas, and the $N_R$ received signals can be processed using spatial or space-time processing to separate out the $N_T$ transmitted data streams, as described above. The SNR of a post-processed data stream (i.e., after the spatial/space-time processing) may be estimated and comprises the post-processed SNR for that data stream. For each terminal, a set of $N_T$ post-processed SNRs may be provided for the $N_T$ data streams that may be received by that terminal.

If the successive cancellation receiver processing technique is used at a terminal to process the received signals, then the post-processed SNR achieved at the terminal for each transmitted data stream depends on the order in which the transmitted data streams are detected (i.e., demodulated and decoded) to recover the transmitted data, as described above. In this case, a number of sets of SNRs may be provided for each terminal for a number of possible detection orderings. Multiple hypothesis matrices may then be formed and evaluated to determine which specific combination of terminals and detection ordering provides the best system performance.

In any case, each hypothesis matrix $\Gamma$ includes the post-processed SNRs for a specific set of one or more terminals (i.e., hypothesis) to be evaluated. These post-processed SNRs represent the SNRs achievable by the terminals and are used to evaluate the hypothesis.

Figure 9A:
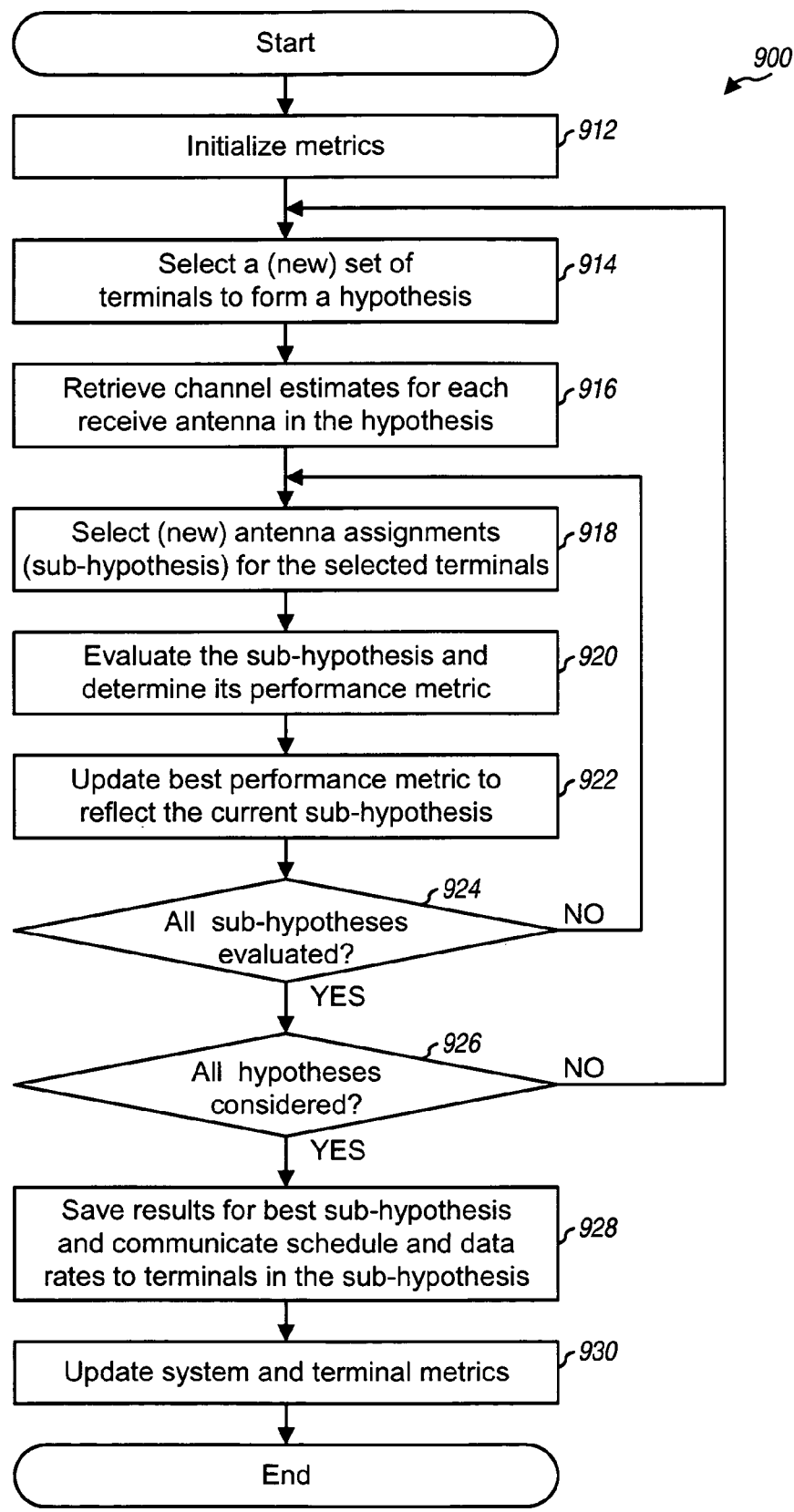
FIGS. 9A and 10A are flow diagrams of embodiments of a process to schedule terminals for downlink and uplink data transmission, respectively.

FIG. 9A is a flow diagram of an embodiment of a process 900 to schedule terminals for data transmission on the downlink in a MIMO system. Initially, the metrics to be used to select the best set of terminals for data transmission are initialized, at step 912. Various performance metrics may be used to evaluate the terminal sets and some of these are described in further detail below. For example, a performance metric that maximizes system throughput may be used.

A (new) set of one or more active terminals is then selected from among all active terminals considered for scheduling, at step 914. This set of terminals forms a hypothesis to be evaluated. Various techniques may be used to limit the number of active terminals to be considered for scheduling, which then reduces the number of hypotheses to be evaluated, as described below. For each terminal in the hypothesis, the SNR vector (e.g., $\underline{\gamma}_i = [\gamma_{i,1}, \gamma_{i,2}, \ldots, \gamma_{i,N_T}]$) is retrieved, at step 916. The SNR vectors for all terminals in the hypothesis form the hypothesis matrix $\Gamma$ shown in equation (69).

For each hypothesis matrix $\Gamma$ of $N_T$ transmit antennas and $N_T$ terminals, there are $N_T$ factorial possible combinations of assignments of transmit antennas to terminals (i.e., $N_T!$ sub-hypotheses). Thus, a particular (new) combination of antenna/terminal assignments is selected for evaluation, at step 918. This particular combination of antenna/terminal assignments forms a sub-hypothesis to be evaluated.

The sub-hypothesis is then evaluated and the performance metric (e.g., the system throughput) corresponding to this sub-hypothesis is determined (e.g., based on the SNRs for the sub-hypothesis), at step 920. This performance metric is then used to update the performance metric corresponding to the current best sub-hypothesis, at step 922. Specifically, if the performance metric for this sub-hypothesis is better than that of the current best sub-hypothesis, then this sub-hypothesis becomes the new best sub-hypothesis, and the performance metric and other terminal metrics corresponding to this sub-hypothesis are saved. The performance and terminal metrics are described below.

A determination is then made whether or not all sub-hypotheses for the current hypothesis have been evaluated, at step 924. If all sub-hypotheses have not been evaluated, then the process returns to step 918 and a different and not yet evaluated combination of antenna/terminal assignments is selected for evaluation. Steps 918 through 924 are repeated for each sub-hypothesis to be evaluated.

If all sub-hypotheses for a particular hypothesis have been evaluated, at step 924, a determination is then made whether or not all hypotheses have been considered, at step 926. If all hypotheses have not been considered, then the process returns to step 914 and a different and not yet considered set of terminals is selected for evaluation. Steps 914 through 926 are repeated for each hypothesis to be considered.

If all hypotheses have been considered at step 926, then the specific set of terminals scheduled for data transmission in the upcoming transmission interval and their assigned transmit antennas are known. The post-processed SNRs corresponding to this set of terminals and their antenna assignments may be used to select the proper coding and modulation schemes for the data streams to be transmitted to the terminals. The schedule, antenna assignments, coding and modulation schemes, other information, or any combination thereof, may be conveyed to the scheduled terminals (e.g., via a control channel), at step 928. Alternatively, the terminals may perform "blind" detection and attempt to detect all transmitted data streams to determine which ones, if any, of the data streams are intended for them.

If the scheduling scheme requires other system and terminal metrics to be maintained (e.g. the average data rate over the past K transmission intervals, latency for data transmission, and so on), then these metrics are updated, at step 930. The terminal metrics may be used to evaluate the performance of the individual terminals, and are described below. The scheduling is typically performed for each transmission interval.

For a given hypothesis matrix $\Gamma$, the scheduler evaluates various combinations of transmit antenna and terminal pairings (i.e., sub-hypotheses) to determine the best assignments for the hypothesis. Various assignment schemes may be used to assign transmit antennas to the terminals to achieve various system goals such as fairness, performance, and so on.

In one antenna assignment scheme, all possible sub-hypotheses are evaluated based on a particular performance metric and the sub-hypothesis with the best performance metric is selected. For each hypothesis matrix $\Gamma$, there are $N_T$ factorial (i.e., $N_T!$) possible sub-hypotheses that may be evaluated. Each sub-hypothesis corresponds to a specific assignment of each transmit antenna to a particular terminal. Each sub-hypothesis may thus be represented with a vector of post-processed SNRs, which may be expressed as:

$$\underline{\gamma}_{sub-hyp} = [\gamma_{a,1}, \gamma_{b,2}, \ldots, \gamma_{r,N_T}],$$

where $\gamma_{i,j}$ is the post-processed SNR for the j-th transmit antenna to the i-th terminal, and the subscripts $\{a, b, \ldots$ and $r\}$ identify the specific terminals in the transmit antenna/terminal pairings for the sub-hypothesis.

Each sub-hypothesis may further be associated with a performance metric, $R_{sub-hyp}$, which may be a function of various factors. For example, a performance metric based on the post-processed SNRs may be expressed as:

$$R_{sub-hyp} = f(\underline{\gamma}_{sub-hyp}),$$

where $f(\cdot)$ is a particular positive real function of the argument(s) within the parenthesis.

Various functions may be used to formulate the performance metric. In one embodiment, a function of the achievable throughput for all $N_T$ transmit antennas for the sub-hypothesis may be used, which may be expressed as:

$$f(\chi_{sub-hyp}) = \sum_{j=1}^{N_T} r_j, \qquad \text{Eq (70)}$$

where $r_j$ is the throughput associated with the j-th transmit antenna in the sub-hypothesis, and may be expressed as:

$$r_j = c_j \cdot \log_2(1+\gamma_j), \qquad \text{Eq (71)}$$

where $c_j$ is a positive constant that reflects the fraction of the theoretical capacity achieved by the coding and modulation scheme selected for the data stream transmitted on the j-th transmit antenna, and $\gamma_j$ is the post-processed SNR for the j-th data stream.

The first antenna assignment scheme shown in FIG. 9A and described above represents a specific scheme that evaluates all possible combinations of assignments of transmit antennas to terminals. The total number of potential sub-hypotheses to be evaluated by the scheduler for each hypothesis is $N_T!$, which may be large considering that a large number of hypotheses may need to be evaluated. The first scheduling scheme performs an exhaustive search to determine the sub-hypothesis that provides the "optimal" system performance, as quantified by the performance metric used to select the best sub-hypothesis.

A number of techniques may be used to reduce the complexity of the processing to assign transmit antennas. One of these techniques is described below, and others may also be implemented and are within the scope of the invention. These techniques may also provide high system performance while reducing the amount of processing required to assign transmit antennas to terminals.

In a second antenna assignment scheme, a maximum-maximum ("max-max") criterion is used to assign transmit antennas to the terminals in the hypothesis being evaluated. Using this max-max criterion, each transmit antenna is assigned to a particular terminal that achieves the best SNR for the transmit antenna. The antenna assignment is performed for one transmit antenna at a time.

Figure 9B:
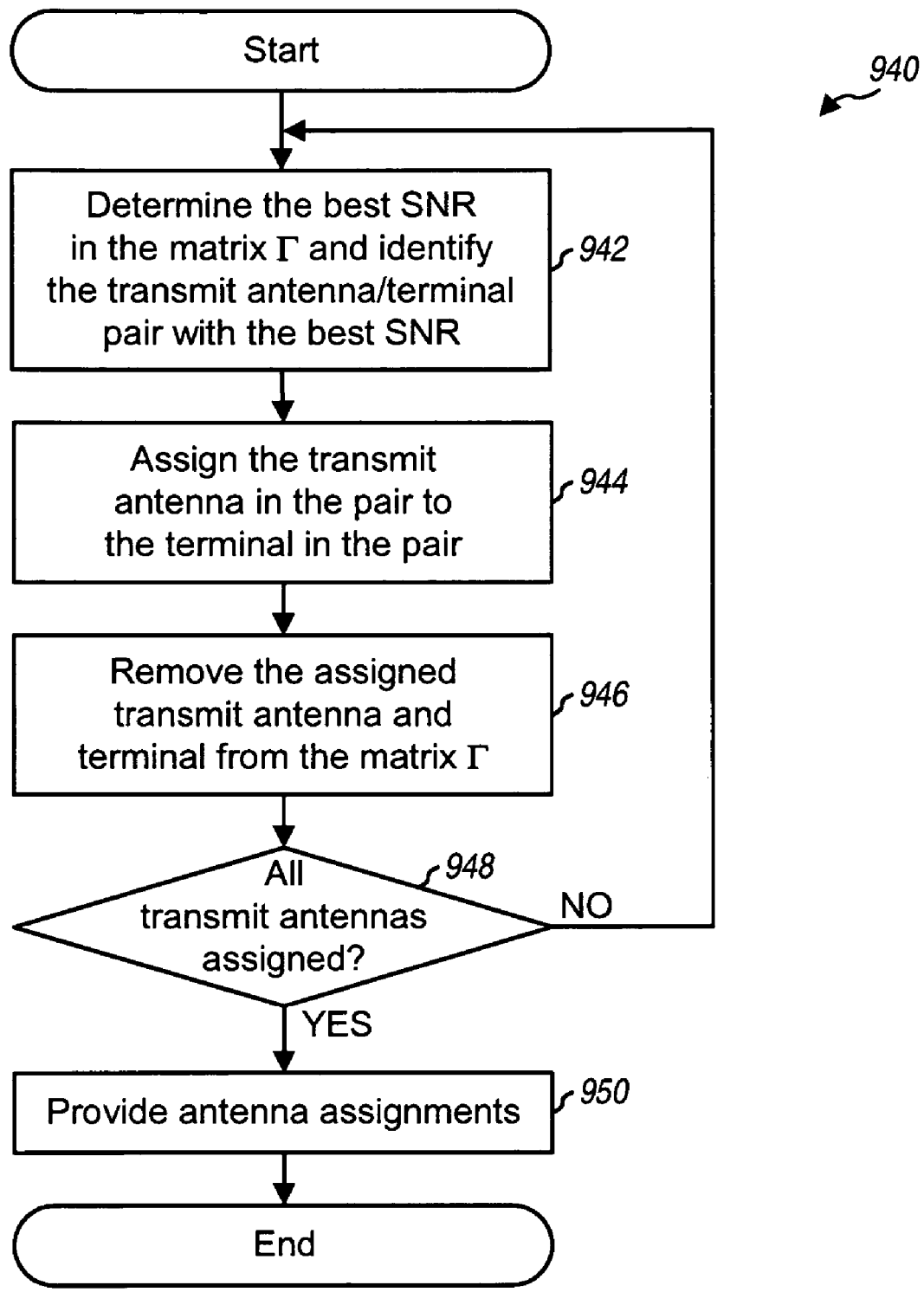
FIG. 9B is a flow diagram of an embodiment of a process to assign transmit antennas to terminals for downlink data transmission using the max-max criterion.

FIG. 9B is a flow diagram of an embodiment of a process 940 to assign transmit antennas to terminals using the max-max criterion. The processing shown in FIG. 9B is performed for a particular hypothesis, which corresponds to a specific set of one or more terminals. Initially, the maximum post-processed SNR in the hypothesis matrix $\Gamma$ is determined, at step 942. This maximum SNR corresponds to a specific transmit antenna/terminal pairing, and the transmit antenna is assigned to this terminal, at step 944. This transmit antenna and terminal are then removed from the matrix $\Gamma$, and the matrix is reduced to dimension $(N_T-1) \times (N_T-1)$ by removing both the column corresponding to the transmit antenna and the row corresponding to the terminal just assigned, at step 946.

At step 948, a determination is made whether or not all transmit antennas in the hypothesis have been assigned. If all transmit antennas have been assigned, then the antenna assignments are provided, at step 950, and the process terminates. Otherwise, the process returns to step 942 and another transmit antenna is assigned in a similar manner.

Once the antenna assignments have been made for a given hypothesis matrix $\Gamma$, the performance metric (e.g., the system throughput) corresponding to this hypothesis may be determined (e.g., based on the SNRs corresponding to the antenna assignments), as shown in equations (70) and (71). This performance metric is updated for each hypothesis. When all hypotheses have been evaluated, the best set of terminals and antenna assignments are selected for data transmission in the upcoming transmission interval.

Table 5 shows an example matrix $\Gamma$ of post-processed SNRs derived by terminals in a 4×4 MIMO system in which the base station includes four transmit antennas and each terminal includes four receive antennas. For the antenna assignment scheme based on the max-max criterion, the best SNR (16 dB) in the original matrix is achieved by transmit antenna 3 and is assigned to terminal 1, as indicated by the shaded box in the third row of the fourth column in the table. Transmit antenna 3 and terminal 1 are then removed from the matrix. The best SNR (14 dB) in the reduced 3×3 matrix is achieved by both transmit antennas 1 and 4, which are respectively assigned to terminals 3 and 2. The remaining transmit antenna 2 is then assigned to terminal 4.

TABLE 5

| SNR (dB) | Transmit Antenna | | | |
|---|---|---|---|---|
| Terminal | 1 | 2 | 3 | 4 |
| 1 | 7 | 9 | 16 | 5 |
| 2 | 8 | 10 | 12 | 14 |
| 3 | 14 | 7 | 6 | 9 |
| 4 | 12 | 10 | 7 | 5 |

The scheduling scheme described in FIGS. 9A and 9B represents a specific scheme that evaluates various hypotheses corresponding to various possible sets of active terminals desiring data transmission in the upcoming transmission interval. The total number of hypotheses to be evaluated by the scheduler can be quite large, even for a small number of active terminals. In fact, the total number of hypotheses, $N_{hyp}$, can be expressed as:

$$N_{hyp} = \binom{N_U}{N_T} = \frac{N_U!}{(N_U - N_T)! N_T!}, \qquad \text{Eq (72)}$$

where $N_U$ is the number of active terminals to be considered for scheduling. For example, if $N_U=8$ and $N_T=4$, then $N_{hyp}=70$. An exhaustive search may be used to determine the particular hypothesis (and the particular antenna assignments) that provides the optimal system performance, as quantified by the performance metric used to select the best hypothesis and antenna assignments.

Other scheduling schemes having reduced complexity may also be implemented and are within the scope of the invention. One such scheduling scheme is described below. These schemes may also provide high system performance while reducing the amount of processing required to schedule terminals for data transmission.

In another scheduling scheme, the active terminals are scheduled for data transmission based on their priorities. The priority of each terminal may be derived based on one or more metrics (e.g., average throughput), system constraints and requirements (e.g., maximum latency), other factors, or a combination thereof, as described above. A list may be maintained for all active terminals desiring data transmission in an upcoming transmission interval. When a terminal desires data transmission, it is added to the list and its metrics are initialized (e.g., to zero). The metrics of each terminal in the list are thereafter updated for each transmission interval. Once a terminal no longer desires data transmission, it is removed from the list.

For each frame, all or a subset of the terminals in the list may be considered for scheduling. The specific number of terminals to be considered may be based on various factors. In one embodiment, only the $N_T$ highest priority terminals are selected for data transmission. In another embodiment, the highest $N_X$ priority terminals in the list are considered for scheduling, where $N_X > N_T$.

Figure 9C:
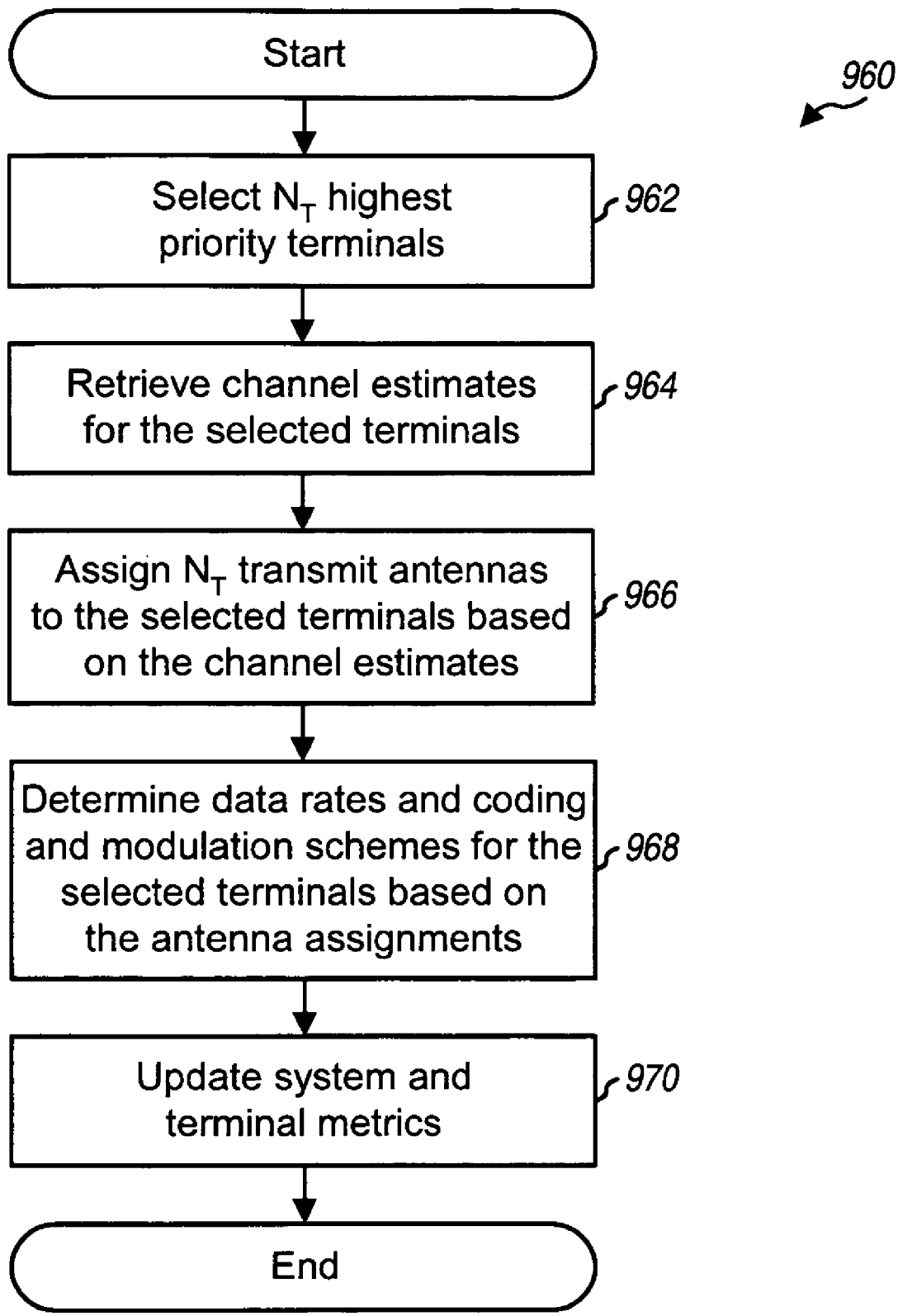
FIGS. 9C and 10B are flow diagrams of embodiments of a process to schedule a set of $N_T$ highest priority terminals for data transmission on the downlink and uplink, respectively.

FIG. 9C is a flow diagram of an embodiment of a process 960 for a priority-based scheduling scheme whereby a set of $N_T$ highest priority terminals is considered for scheduling. At each transmission interval, the scheduler examines the priority for all active terminals in the list and selects the set of $N_T$ highest priority terminals, at step 962. The remaining terminals in the list are not considered for scheduling. The channel estimates for each selected terminal are then retrieved, at step 964. For example, the post-processed SNRs for the selected terminals may be retrieved and used to form the hypothesis matrix $\Gamma$.

The $N_T$ transmit antennas are then assigned to the selected terminals based on the channel estimates and using any one of a number of antenna assignment schemes, at step 966. For example, the antenna assignments may be based on an exhaustive search or the max-max criterion described above. In another antenna assignment scheme, the transmit antennas are assigned to the terminals such that their priorities are normalized as close as possible, after the terminal metrics are updated.

The data rates and coding and modulation schemes for the terminals are then determined based on the antenna assignments, at step 968. The schedule and data rates may be reported to the scheduled terminals. The metrics of scheduled (and unscheduled) terminals in the list are updated to reflect the scheduled data transmission (and non-transmission), and the system metrics are also updated, at step 970.

Downlink scheduling for a MIMO system is described in further detail in U.S. patent application Ser. No. 09/859,345, entitled "Method and Apparatus for Allocating Downlink Resources in a Multiple-Input Multiple-Output (MIMO) Communication System," filed May 16, 2001, assigned to the assignee of the present application and incorporated herein by reference.

4. Uplink Scheduling for MIMO System

An aspect of the invention provides techniques to increase the uplink capacity of a MIMO system. Scheduling schemes are provided to schedule uplink data transmissions from SIMO terminals that employ single antenna and/or MIMO terminals that employ multiple antennas. Both types of terminals may be supported simultaneously on the same channel. The MIMO receiver processing techniques may be used to process signals transmitted from any combination of SIMO and MIMO terminals. From a base station's perspective, there is no discernable difference in processing N different signals from a single MIMO terminal versus processing one signal from each of N different SIMO terminals.

For simplicity, each terminal in the cell is assumed to be equipped with a single antenna. At a particular instant in time, the channel response between each terminal's antenna and the base station's array of $N_R$ receive antennas is characterized by a vector $\underline{h}_j$ whose elements are composed of independent Gaussian random variables, as follows:

$$\underline{h}_j = \begin{bmatrix} h_{1,j} \\ h_{2,j} \\ \vdots \\ h_{N_R,j} \end{bmatrix}, \quad \text{Eq (73)}$$

where $h_{i,j}$ is the channel response estimate from the j-th terminal to the i-th receive antenna at the base station.

Also for simplicity, it is assumed that the average received power from each terminal is normalized to achieve a common setpoint, $\gamma_{sp}$, after signal processing at the base station. The common setpoint may be achieved by a closed loop power control mechanism that adjusts the transmit power of each transmitting terminal (e.g., based on power control commands from the base station). Alternatively, a unique setpoint may also be used for each terminal and the techniques described herein may be generalized to cover this operating mode. Also, it is assumed that simultaneous transmissions from different terminals are synchronized so that the transmissions arrive at the base station within a prescribed time window.

The base station periodically estimates the channel response for the active terminals. Based on the available channel estimates, various scheduling schemes may be designed to maximize the uplink throughput by scheduling and assigning terminals to the available transmission channels such that they are allowed to transmit simultaneously. The scheduler evaluates which specific combination of terminals provides the best system performance (e.g., the highest throughput) subject to any system constraints and requirements. By exploiting the spatial (and possibly frequency) signatures of the individual terminals, the average uplink throughput may be increased relative to that achieved with a single terminal. Furthermore, by exploiting the multi-user diversity, the scheduler can find combinations of "mutually compatible" terminals that may be allowed to transmit at the same time on the same channel, effectively enhancing system capacity relative to single-user scheduling or random scheduling for multiple users.

The uplink scheduling schemes are designed to select the best combination of terminals for simultaneous transmission on the available transmission channels such that system performance is maximized while conforming to the system constraints and requirements. If $N_T$ terminals are selected for transmission and each terminal employs one antenna, then the channel response matrix $\underline{H}$ corresponding to the selected set of terminals ($\underline{u} = \{u_a, u_b, \ldots, u_{N_T}\}$) may be expressed as:

$$\underline{H} = [\underline{h}_1 \underline{h}_2 \ldots \underline{h}_{N_T}] = \begin{bmatrix} h_{1,1} & h_{1,2} & \cdots & h_{1,N_T} \\ h_{2,1} & h_{2,2} & \cdots & h_{2,N_T} \\ \vdots & \vdots & & \vdots \\ h_{N_R,1} & h_{N_R,2} & \cdots & h_{N_R,N_T} \end{bmatrix}. \quad \text{Eq (74)}$$

In an embodiment, the successive cancellation receiver processing technique may be used at the base station to receive and process the transmissions from the terminals. When using this receiver processing technique to process the received signals, the SNR associated with each transmitting terminal is a function of the particular order in which the terminals are processed at the base station. The uplink scheduling schemes take this into account in selecting the set of terminals for data transmission.

Figure 10A:
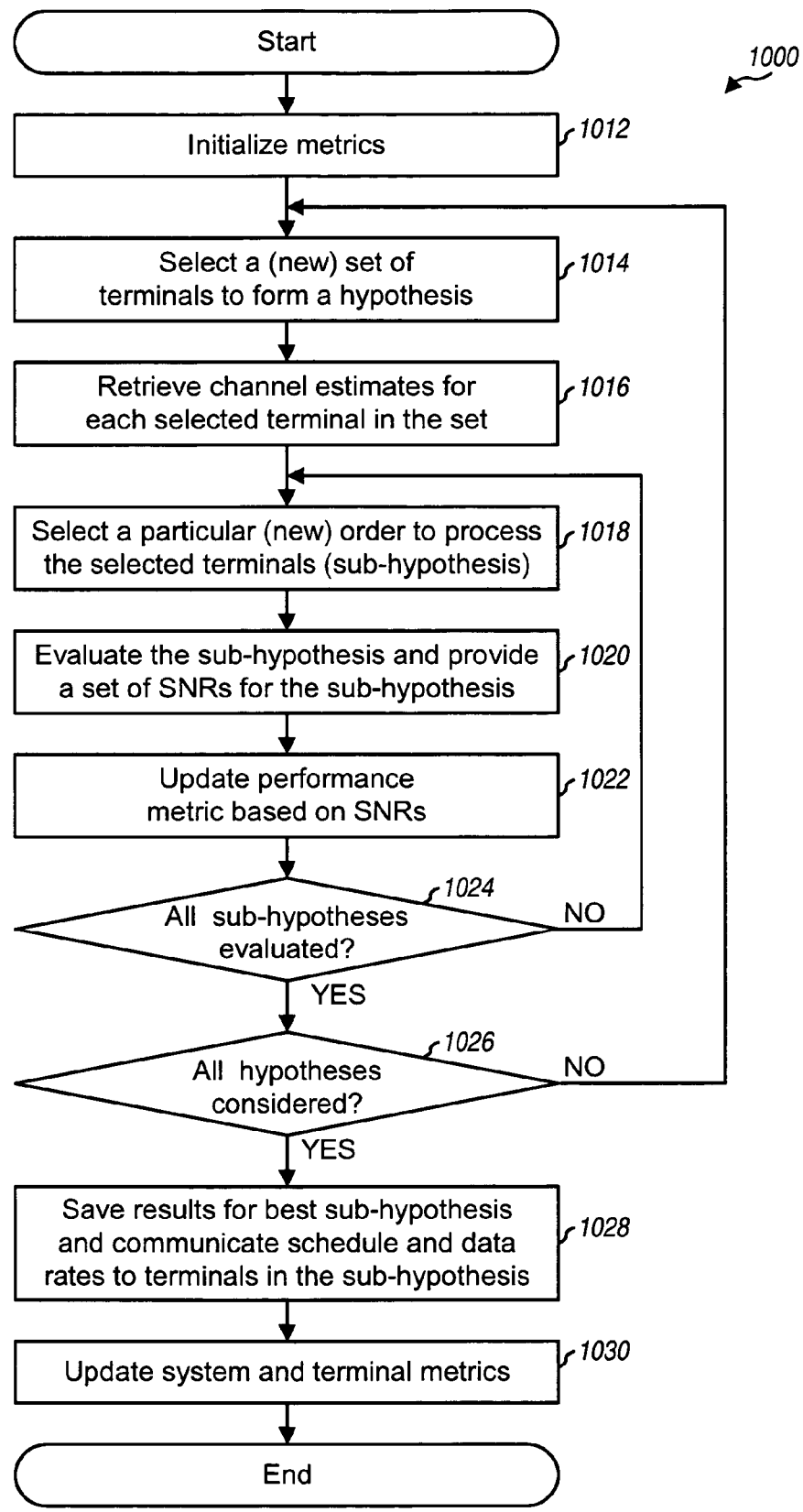

FIG. 10A is a flow diagram of an embodiment of a process 1000 to schedule terminals for transmission on the uplink. Initially, the metrics to be used to select the best set of terminals for transmission are initialized, at step 1012. Various performance metrics may be used to evaluate the terminal selections as described above.

A (new) set of active terminals is then selected from among all active terminals desiring to transmit data in the upcoming transmission interval, at step 1014. Various techniques may be used to limit the number of active terminals to be considered for scheduling, as described above. The specific set of terminals selected (e.g., $\underline{u}=\{u_a, u_b, \ldots, u_{N_T}\}$) forms a hypothesis to be evaluated. For each selected terminal $u_j$ in the set, the channel estimates vector $\underline{h}_j$ is retrieved, at step 1016.

When the successive cancellation receiver processing technique is used at the base station, the order in which the terminals are processed directly impacts their performance. Thus, a particular (new) order is selected to process the terminals in the set, at step 1018. This particular order forms a sub-hypothesis to be evaluated.

The sub-hypothesis is then evaluated and the terminal metrics for the sub-hypothesis are provided, at step 1020. The terminal metrics may be the post-processed SNRs for the signals hypothetically transmitted from the terminals in the set. Step 1020 may be achieved based on the successive cancellation receiver processing technique described above. The performance metric (e.g., the system throughput) corresponding to this sub-hypothesis is then determined (e.g., based on the post-processed SNRs for the terminals), at step 1022. This performance metric is then used to update the performance metric corresponding to the current best sub-hypothesis, also at step 1022. Specifically, if the performance metric for this sub-hypothesis is better than that of the current best sub-hypothesis, then this sub-hypothesis becomes the new best sub-hypothesis and the performance and terminal metrics corresponding to this sub-hypothesis are saved.

A determination is then made whether or not all sub-hypotheses for the current hypothesis have been evaluated, at step 1024. If all sub-hypotheses have not been evaluated, then the process returns to step 1018 and a different and not yet evaluated order for the terminals in the set is selected for evaluation. Steps 1018 through 1024 are repeated for each sub-hypothesis to be evaluated.

If all sub-hypotheses for a particular hypothesis have been evaluated, at step 1024, then a determination is made whether or not all hypotheses have been considered, at step 1026. If all hypotheses have not been considered, then the process returns to step 1014 and a different and not yet considered set of terminals is selected for evaluation. Steps 1014 through 1026 are repeated for each hypothesis to be considered.

If all hypotheses for the active terminals have been considered, at step 1026, then the results for the best sub-hypothesis are saved, the data rates for the terminals in the best sub-hypothesis are determined (e.g., based on their SNRs), and the schedule and data rates are communicated to the terminals prior to the scheduled transmission interval, at step 1028. If the scheduling scheme requires other system and terminal metrics to be maintained (e.g. the average data rate over the past K transmission intervals, latency for data transmission, and so on), then these metrics are updated, at step 1030. The terminal metrics may be used to evaluate the performance of the individual terminals.

The evaluation of the sub-hypothesis in step 1020 may be performed based on the successive cancellation receiver processing technique described in FIG. 5, if this technique is used at the base station. For this receiver processing technique, the specific order in which the transmitted signals are processed affects the outcome. Thus, using this receiver processing technique, for each hypothesis of $N_T$ terminals to be evaluated, there are $N_T$ factorial possible orderings (e.g., $N_T! = 24$ if $N_T = 4$) corresponding to $N_T$ factorial sub-hypotheses for the hypothesis. Each sub-hypothesis corresponds to a specific ordered set of terminals $\underline{u}=\{u_a, u_b, \ldots, u_{N_T}\}$, and the successive cancellation receiver processing would then process the terminals in the prescribed ordered (i.e., terminal $u_a$ first, followed by terminal $u_b$, and so on).

For each sub-hypothesis, the successive cancellation receiver processing provides a set of SNRs for the post-processed signals for the terminals, which may be expressed as:

$$\gamma_{hyp,order} = \{\gamma_1, \gamma_2, \ldots, \gamma_{N_T}\},$$

where $\gamma_j$ is the SNR after the receiver processing for the j-th terminal in the sub-hypothesis.

Each sub-hypothesis is further associated with a performance metric, $R_{hyp,order}$, which may be a function of various factors. For example, a performance metric based on the SNRs of the terminals may be expressed as:

$$R_{hyp,order} = f(\gamma_{hyp,order}),$$

where $f(\cdot)$ is a particular positive real function of the arguments within the parenthesis.

Various functions may be used to formulate the performance metric. In one embodiment, a function of the achievable throughputs for all $N_T$ terminals for the sub-hypothesis may be used, which may be expressed as shown in equations (70) and (71).

For each sub-hypothesis to be evaluated, the set of SNRs provided by the successive cancellation receiver processing may be used to derive the performance metric for that sub-hypothesis, e.g., as shown in equations (70) and (71). The performance metric computed for each sub-hypothesis is compared to that of the current best sub-hypothesis. If the performance metric for a current sub-hypothesis is better, then that sub-hypothesis and the associated performance metric and SNRs are saved as the metrics for the new best sub-hypothesis.

Once all sub-hypotheses have been evaluated, the best sub-hypothesis is selected and the terminals in the sub-hypothesis are scheduled for transmission in an upcoming transmission interval. The best sub-hypothesis is associated with a specific set of terminals. If successive cancellation receiver processing is used at the base station, the best sub-hypothesis is further associated with a particular receiver processing order at the base station. In any case, the sub-hypothesis is further associated with the achievable SNRs for the terminals, which may be determined based on the selected processing order.

The data rates for the terminals may then be computed based on their achieved SNRs, as shown in equation (71). Partial CSI (which may comprise the data rates or the SNRs) may be reported to the scheduled terminals, which then use the partial CSI to accordingly adjust (i.e., adapt) their data processing to achieve the desired level of performance.

The uplink scheduling scheme described in FIG. 10A represents a specific scheme that evaluates all possible orderings of each possible set of active terminals desiring to transmit data in the upcoming transmission interval. The total number of potential sub-hypotheses to be evaluated by a scheduler can be quite large, even for a small number of active terminals. In fact, the total number of sub-hypotheses can be expressed as:

$$N_{sub-hyp} = N_T! \binom{N_U}{N_T} = \frac{N_U!}{(N_U - N_T)!}, \qquad \text{Eq (75)}$$

where $N_U$ is the number of active terminals to be considered for scheduling. For example, if $N_U=8$ and $N_T=4$, then $N_{sub-hyp}=1680$. An exhaustive search may be used to determine the sub-hypothesis that provides the optimal system performance, as quantified by the performance metric used to select the best sub-hypothesis.

Various other uplink scheduling schemes may also be used which have reduced complexity in the processing to schedule terminals. In one such uplink scheduling scheme the terminals included in each hypothesis are processed in a particular order that is determined based on a particular defined rule. In one embodiment, for each iteration, the successive cancellation receiver processing technique recovers the transmitted signal having the best SNR after equalization. In this case, the ordering is determined based on the post-processed SNRs for the terminals in the hypothesis. In another embodiment, the terminals in each hypothesis are processed based on a specific order. The processing order may be based on the priority of the terminals in the hypothesis (e.g., with the lowest priority terminal being processed first, the next lowest priority terminal being processed next, and so on, and the highest priority terminal being processed last), the user payload, latency requirements, emergency service priority, and so on.

In another uplink scheduling scheme, the terminals are scheduled based on their priorities. For each frame, a particular number of terminals in the list may be considered for scheduling. In one embodiment, only the $N_T$ highest priority terminals are selected to transmit on the $N_T$ available transmission channels. In another embodiment, the $N_X$ highest priority terminals in the list are considered for scheduling, with $N_U > N_X > N_T$.

Figure 10B:
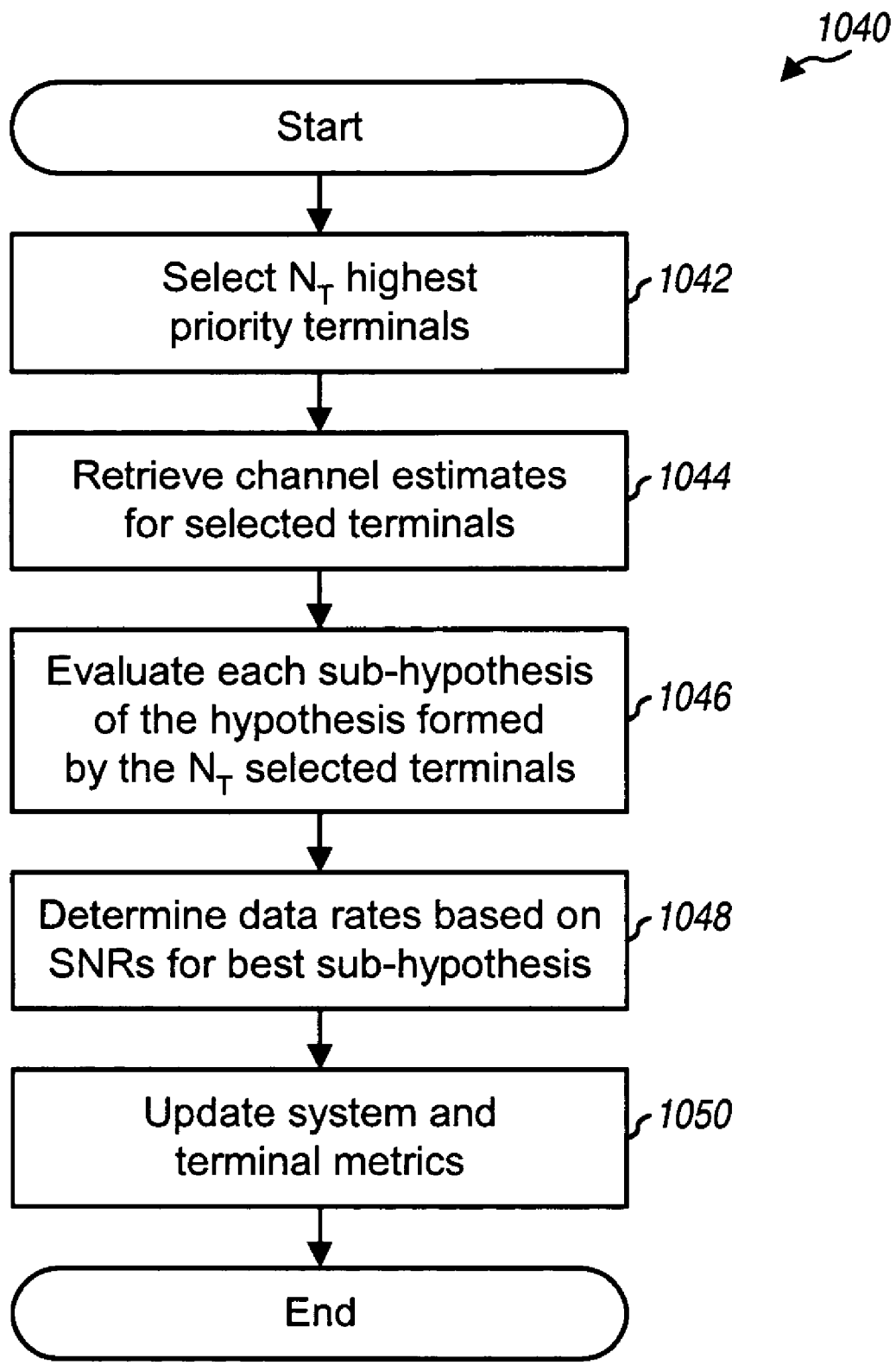

FIG. 10B is a flow diagram of an embodiment of a process 1040 for a priority-based scheduling scheme whereby $N_T$ highest priority terminals are scheduled for transmission on the uplink. For each transmission interval, the scheduler examines the priorities for all active terminals in the list and selects the $N_T$ highest priority terminals, at step 1042. In this embodiment, the remaining $(N_U-N_T)$ terminals in the list are not considered for scheduling. The channel estimates $\underline{h}$ for each selected terminal are retrieved, at step 1044. Each sub-hypothesis of the hypothesis formed by the $N_T$ selected terminals is evaluated, and the corresponding vector of post-processed SNRs, $\underline{\gamma}_{hyp,order}$, for each sub-hypothesis is derived, at step 1046. The best sub-hypothesis is selected, and data rates corresponding to the SNRs of the best sub-hypothesis are determined, at step 1048. Again, the schedule and the data rates may be reported to the terminals in the hypothesis. The metrics of the terminals in the list and system metrics are then updated, at step 1050. In one embodiment, the best sub-hypothesis may correspond to the one that comes closest to normalizing the priority of the terminals after their metrics are updated.

Uplink scheduling for a MIMO system is described in further detail in U.S. patent application Ser. No. 09/859,346, entitled "Method and Apparatus for Allocating Uplink Resources in a Multiple-Input Multiple-Output (MIMO) Communication System," filed May 16, 2001, assigned to the assignee of the present application and incorporated herein by reference.

For a (downlink or uplink) scheduling scheme in which terminals are selected and scheduled for transmission based on their priorities, it is possible for poor terminal groupings to occur occasionally. A "poor" terminal set is one that results in strong linear dependence in that hypothesized channel response matrix $\underline{H}$, which then results in low overall throughput for each terminal in the set. When this happen, the priorities of the terminals may not change substantially over several frames. In this way, the scheduler may be stuck with this particular terminal set until the priorities change sufficiently to cause a change in membership in the set.

To avoid the above-described "clustering" effect, the scheduler can be designed to recognize this condition prior to assigning terminals to the available transmission channels, and/or detect the condition once it has occurred. A number of different techniques may be used to determine the degree of linear dependence in the hypothesized matrix $\underline{H}$. These techniques include solving for the eigenvalues of $\underline{H}$, solving for the SNRs of the post-processed signals using a successive cancellation receiver processing technique or a linear spatial equalization technique, and others. The detection of this clustering condition is typically simple to implement. In the event that the clustering condition is detected, the scheduler can reorder the terminals (e.g., in a random manner) in an attempt to reduce the linear dependence in the matrix $\underline{H}$. A shuffling scheme may also be devised to force the scheduler to select terminal sets that result in "good" hypothesized matrices $\underline{H}$ (i.e., ones that have minimal amount of linear dependence).

VI. Performance

The use of the techniques described herein can provide improved system performance (e.g., higher throughput). Simulations have been performed to quantify the possible improvement in system throughput with some of these techniques. In the simulation, the channel response matrix $\underline{H}$ coupling the array of transmit antennas and receive antennas is assumed to be composed of equal-variance, zero-mean Gaussian random variables (i.e., "independent complex Gaussian assumption"). The average throughput for a random selection of $N_T$ ($1 \times N_R$) channels is assessed. Note that throughput is taken to be 50% of the channel capacity as determined by Shannon's theoretical capacity limit.

Figure 11A:
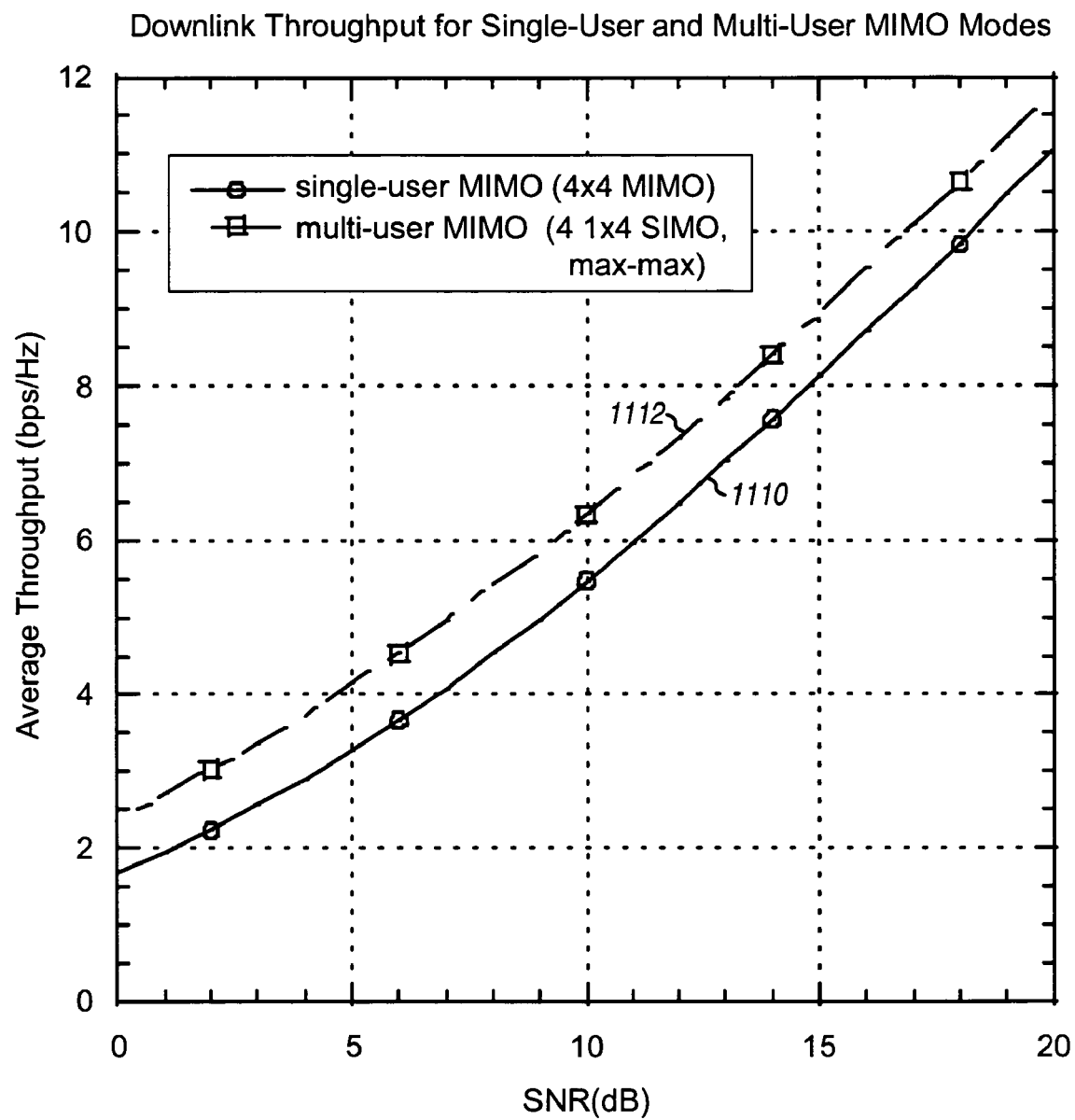
FIG. 11A shows the average downlink throughput for a MIMO system with four transmit antennas and four receive antennas per terminal for a number of operating modes.

FIG. 11A shows the average downlink throughput for a MIMO system with four transmit antennas (i.e., $N_T=4$) and four receive antennas per terminal (i.e., $N_R=4$) for the single-user MIMO mode and the multi-user MIMO mode (i.e., N-SIMO mode). The simulated throughput associated with each operating mode is provided as a function of the average post-processed SNR. The average throughput for the single-user MIMO mode is shown as plot 1110, and the average throughput for the multi-user MIMO mode is shown as plot 1112.

As shown in FIG. 11A, the simulated throughput associated with the multi-user MIMO mode using the max-max criterion antenna assignment shows better performance than that achieved for the single-user MIMO mode. In the single-user MIMO mode, the MIMO terminals benefit by using successive cancellation receiver processing to achieve higher post-processed SNRs. In the multi-user MIMO mode, the scheduling schemes are able to exploit multi-user selection diversity to achieve improved performance (i.e., higher throughput) even though each terminal uses linear spatial (e.g., MMSE) processing technique. In fact, the multi-user diversity in the multi-user MIMO mode results in an average downlink throughput that exceeds the throughput achieved by dividing a transmission interval into four equal-duration sub-slots and assigning each MIMO terminal to a respective sub-slot.

The scheduling schemes used in the simulations for both single-user and multi-user MIMO modes were not designed to provide proportionate fairness, and some terminals will observe higher average throughput than others. When a fairness criterion is imposed, the differences in throughput for the two operating modes may diminish. Nevertheless, the ability to accommodate both single-user and multi-user MIMO modes provides added flexibility in the provisioning of wireless data services.

Figure 11B:
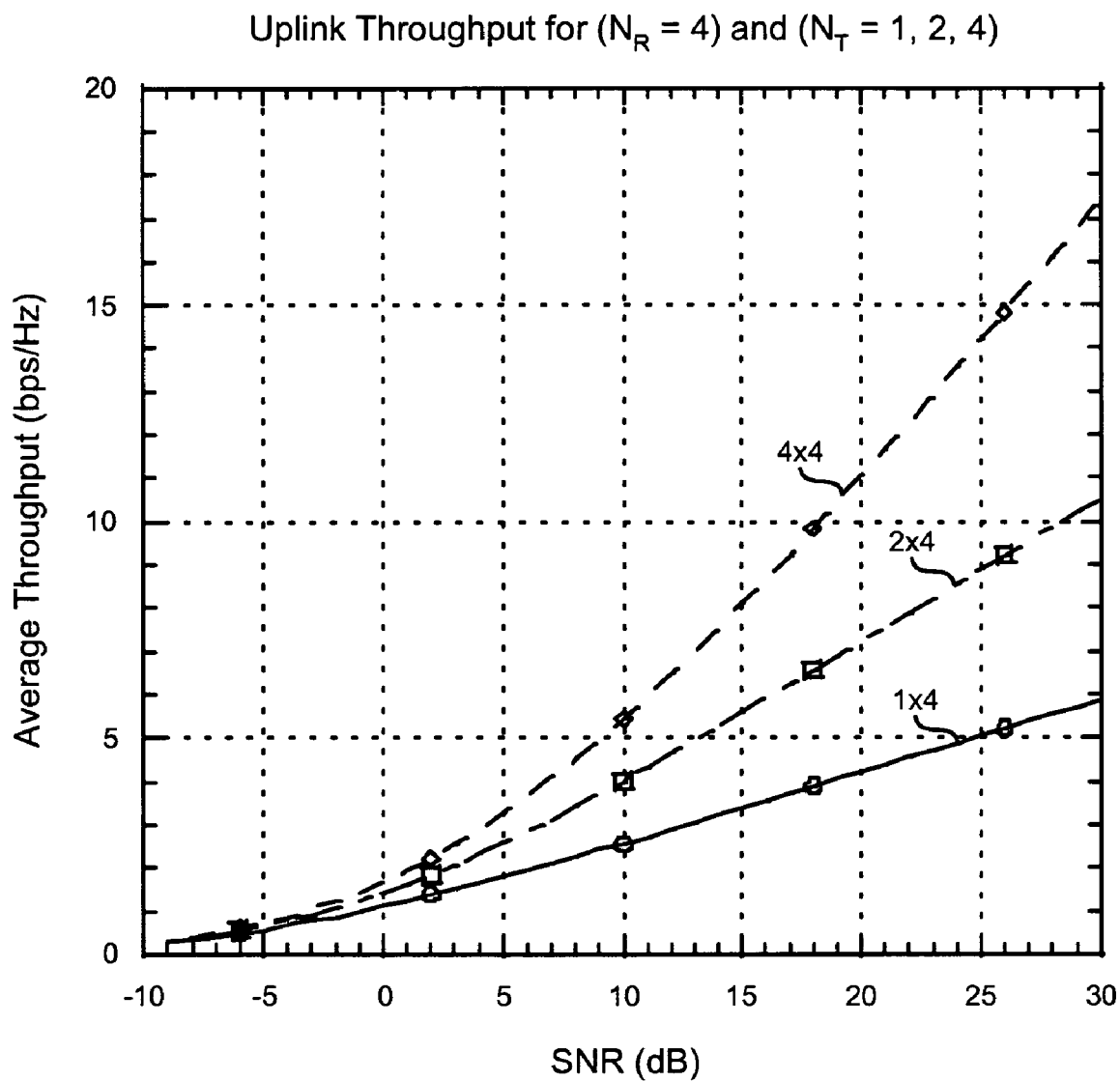
FIG. 11B shows the average uplink throughput associated with four receive antennas and various numbers of single-antenna terminals.

FIG. 11B shows the average uplink throughput associated with four receive antennas (i.e., $N_R=4$) and various numbers of single-antenna terminals (i.e., $N_T=1$, 2 and 4) for an independent complex Gaussian assumption in an interference-limited environment (i.e., the interference power is much greater than the thermal noise power). The case of four transmit antennas (i.e., $N_T=4$) has greater capacity than the case of one transmit antenna (i.e., $N_T=1$), with the gains increasing with SNR. At very high SNRs, the capacity of the $N_T=4$ case approaches four times that of the $N_T=1$ case. At very low SNRs, the gain between these two cases reduces and becomes negligible.

In a low or no interference environment (e.g., thermal noise-limited), the throughput of the $N_T=4$ case is even greater than that shown in FIG. 11B. In the thermal noise-limited environment, the interference power is low (e.g., approaches zero) and the SNR achieved is essentially 6 dB greater than that given in FIG. 11B for the $N_T=4$ case. As an example, when a single terminal is received at an SNR of 10 dB, the average throughput achieved for this terminal is 2.58 bps/Hz. When four terminals are permitted to transmit simultaneously, the total throughput achieved is equivalent to the $N_T=4$ curve at an SNR=10 dB+$10 \cdot \log_{10}(4)$=16 dB. Thus, in the thermal noise-limited environment, the total throughput for four terminals is 8.68 bps/Hz, or approximately 3.4 times that of a single terminal transmitting.

In interference-limited systems such as a cellular network, the throughput per cell afforded with multiple SIMO transmissions in conjunction with the successive cancellation receiver processing at the base station is a function of the setpoint selected for the terminals. For example, at 10 dB SNR, the capacity is more than doubled when four 1×4 SIMO terminals are allowed to transmit simultaneously. At 20 dB SNR, the capacity increases a factor of 2.6 times that achieved with a single 1×4 terminal. However, the higher operating setpoint typically implies a larger frequency reuse factor. That is, the fraction of cells using the same frequency channel simultaneously may need to be reduced to achieve the required SNR corresponding to the higher operating setpoints, which may then reduce the overall spectral efficiency (as measured in bps/Hz/cell). In maximizing network capacity for this scheme, there is thus a basic tradeoff between the selection of the particular operating setpoint and the required frequency reuse factor.

Figure 11C:
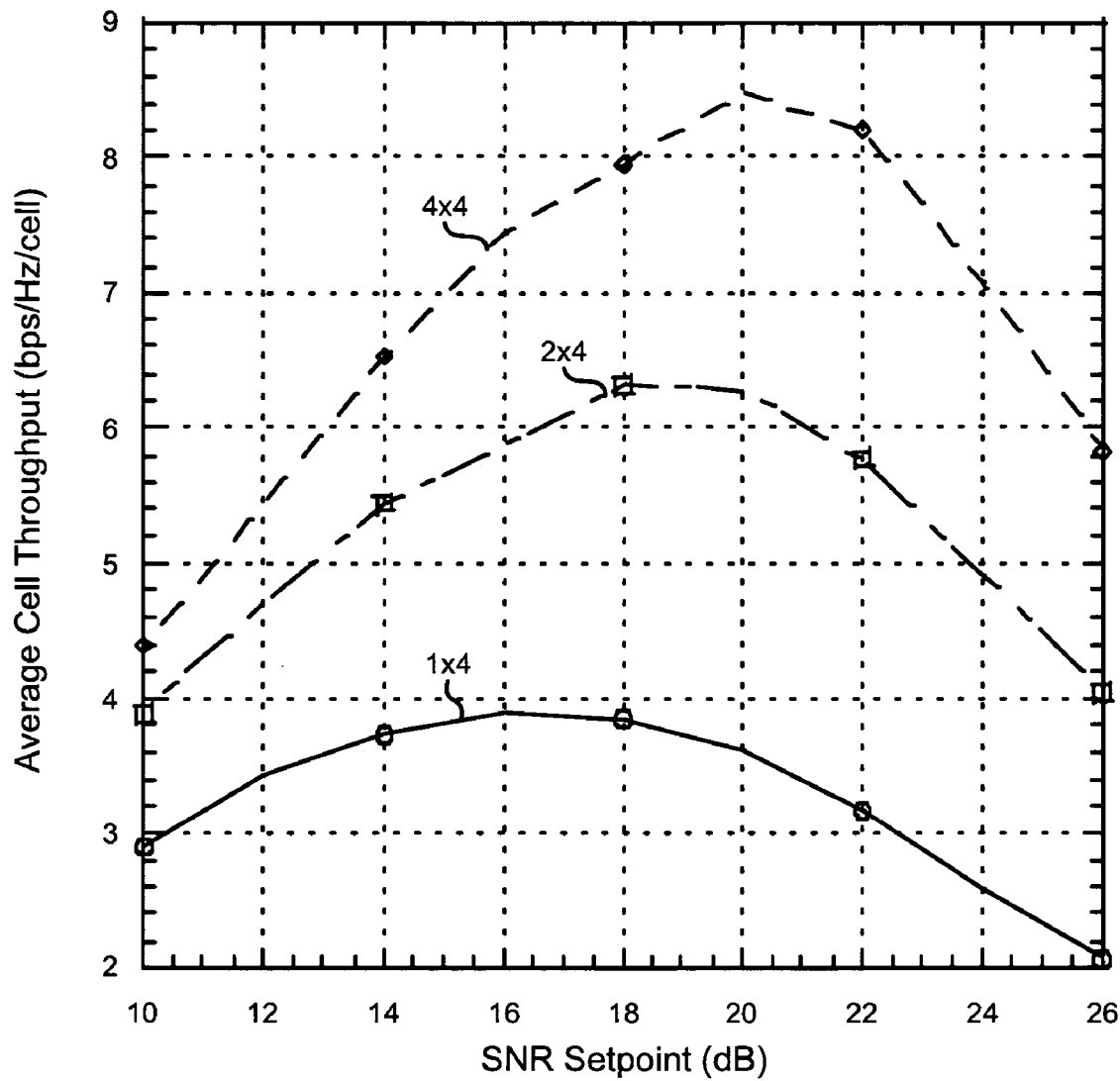
FIG. 11C shows the cell throughput for a simulated network of cells with 1, 2, and 4 transmit antenna terminals simultaneously transmitting.

FIG. 11C shows the cell throughput for a simulated network of cells with $N_T=1$, 2, and 4 simultaneous terminals. Each cell employs $N_R=4$ receive antennas. All terminals are power controlled to achieve a given setpoint. Inspection shows that there exists a range of SNR setpoints for which the cell throughput for $N_T=4$ terminals is more than double that achieved when only a single terminal is allowed to transmit.

The elements of the transmitter and receiver units may be implemented with one or more digital signal processors (DSP), application specific integrated circuits (ASIC), processors, microprocessors, controllers, microcontrollers, field programmable gate arrays (FPGA), programmable logic devices, other electronic units, or any combination thereof.

Some of the functions and processing described herein may also be implemented with software executed on a processor.

Certain aspects of the invention may be implemented with a combination of software and hardware. For example, the spatial processing, space-time processing, successive cancellation receiver processing, full-CSI processing, derivation of the CSI (e.g., the channel SNRs), scheduling, and so on may be performed based on program codes executed on a processor (controllers 230 and/or 270 in FIGS. 2A and 2B). The software codes may be stored in a memory unit (e.g., memories 232 and/or 272) and executed by a processor (e.g., controllers 230 and/or 270). The memory unit may be implemented within the processor or external to the processor, in which case it can be communicatively coupled to the processor via various means as is known in the art.

Headings are included herein for reference and to aid in locating certain sections. These heading are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data in a multiple-access multiple-input multiple-output (MIMO) communication system, comprising:

updating at least one parameter utilized to schedule transmission for each of a plurality of terminals;

ranking the terminals for scheduling based upon the at least one parameter, wherein the ranking is determined based at least upon average data throughput of the terminals such that terminals with lower average data throughput receive higher priority;

selecting terminals for data transmission based upon the ranking;

assigning channels for data transmission for the terminals that were selected, wherein assigning includes assigning a spatial multiplexing mode for data transmission for each terminal;

and performing data transmission for the selected terminals.

2. The method of claim 1, wherein performing comprises transmitting data to the terminals.

3. The method of claim 1, wherein performing comprises receiving data transmissions from the terminals.

4. The method of claim 1, wherein at least one of the spatial multiplexing modes assigned is a multi-user MIMO mode characterized by use of the plurality of transmit antennas for data transmission to a plurality of the terminals collectively having a plurality of receive antennas.

5. The method of claim 1, wherein at least one of the spatial multiplexing modes assigned is a mixed mode characterized by use of the plurality of transmit antennas for data transmission to a combination of terminals having a single receive antenna and terminals each having a plurality of receive antennas.

6. The method of claim 1, wherein at least one of the spatial multiplexing modes assigned is a diversity mode characterized by use of the plurality of transmit antennas for reliable transmission of a single data stream to a single terminal having a plurality of receive antennas.

7. The method of claim 1, wherein at least one of the spatial multiplexing modes assigned is a transmit diversity mode characterized by use of the plurality of transmit antennas for data transmission to a single terminal having a single receive antenna.

8. The method of claim 1, wherein updating comprises updating channel state information (CSI).

9. The method of claim 8, wherein updating CSI comprises processing received CSI from the terminals to update the CSI.

10. The method of claim 8, wherein updating CSI comprises processing transmission from the terminals to determine CSI to update the CSI.

11. The method of claim 1, further comprising adjusting at least one characteristic of modulated signals prior to performing data transmission for the selected terminals.

12. The method of claim 11, wherein adjusting comprises adjusting a transmit power.

13. The method of claim 11, wherein adjusting comprises adjusting data rates.

14. The method of claim 1, further comprising determining power levels for transmitting data for the terminals based upon one or more power back-off factors indicative of maximum allowed power levels.

15. The method of claim 14, wherein the one or more power back-off factors are selected to reduce interference to adjacent cells.

16. The method of claim 14, wherein the one or more power back-off factors are selected based on system loading.

17. The method of claim 14, wherein the one or more power back-off factors are selected based on achievable performance by terminals within the system.

18. A base station in a multiple-access multiple-input multiple-output (MIMO) communication system, comprising:
   a controller configured to update at least one parameter utilized to schedule transmission for each of a plurality of terminals;
   a scheduler operative to rank the terminals for scheduling based upon the at least one parameter, the ranks are determined based at lest in part on average data throughput of the terminals such that terminals with lower average data throughput rank higher, select terminals for data transmission based upon the ranking, and assigning channels for data transmission for the terminals that were selected, wherein assigning includes assigning a spatial multiplexing mode for data transmission for each terminal;
   a TX data processor operative to process data for the one or more terminals; and
   a plurality of transmit antennas configured to transmit data transmission to the selected terminals.

19. The apparatus of claim 18, wherein at least one of the spatial multiplexing modes assigned is a multi-user MIMO mode characterized by use of the plurality of transmit antennas for data transmission to a plurality of the terminals collectively having a plurality of receive antennas.

20. The apparatus of claim 18, wherein at least one of the spatial multiplexing modes assigned is a mixed mode characterized by use of the plurality of transmit antennas for data transmission to a combination of terminals having a single receive antenna and terminals each having a plurality of receive antennas.

21. The apparatus of claim 18, wherein at least one of the spatial multiplexing modes assigned is a diversity mode characterized by use of the plurality of transmit antennas for reliable transmission of a single data stream to a single terminal having a plurality of receive antennas.

22. The apparatus of claim 18, wherein at least one of the spatial multiplexing modes assigned is a transmit diversity mode characterized by use of the plurality of transmit antennas for data transmission to a single terminal having a single receive antenna.

23. The apparatus of claim 18, wherein controller updates the at least one parameter by updating channel state information (CSI).

24. The apparatus of claim 18, wherein the controller determines power levels for transmitting data for the terminals based upon one or more power back-off factors indicative of maximum allowed power levels.

25. The apparatus of claim 24, wherein at least one of the spatial multiplexing modes assigned is a multi-user MIMO mode characterized by use of the plurality of transmit antennas for data transmission to a plurality of the terminals collectively having a plurality of receive antennas.

26. The apparatus of claim 24, wherein at least one of the spatial multiplexing modes assigned is a mixed mode characterized by use of the plurality of transmit antennas for data transmission to a combination of terminals having a single receive antenna and terminals each having a plurality of receive antennas.

27. The apparatus of claim 24, wherein at least one of the spatial multiplexing modes assigned is a diversity mode characterized by use of the plurality of transmit antennas for reliable transmission of a single data stream to a single terminal having a plurality of receive antennas.

28. The apparatus of claim 24, wherein at least one of the spatial multiplexing modes assigned is a transmit diversity mode characterized by use of the plurality of transmit antennas for data transmission to a single terminal having a single receive antenna.

29. The apparatus of claim 24, wherein the means for updating comprises means for updating channel state information (CSI).

30. The apparatus of claim 24, further comprising means for adjusting at least one characteristic of modulated signals prior to performing data transmission for the selected terminals.

31. The apparatus of claim 24, further comprising means for determining power levels for transmitting data for the terminals based upon one or more power back-off factors indicative of maximum allowed power levels.

32. An apparatus comprising:
   means for updating at least one parameter utilized to schedule transmission for each of a plurality of terminals;
   means for ranking the terminals for scheduling based upon the at least one parameter, the means for ranking include means for ranking based upon an average data throughput of the terminals such that terminals with low average data throughput rank higher;
   means for selecting terminals for data transmission based upon the ranking;
   means for assigning channels for data transmission for the terminals that were selected, wherein assigning includes assigning a spatial multiplexing mode for data transmission for each terminal; and
   means for performing data transmission for the selected terminals.

33. A memory unit including program codes thereon that may be executed by one or more processors, the program codes comprising:

program codes for updating at least one parameter utilized to schedule transmission for each of a plurality of terminals;

program codes for ranking the terminals for scheduling based upon the at least one parameter, the ranks are based at least in part on average data throughput of the terminals such that terminals with lower average data throughput rank higher;

program codes for selecting terminals for data transmission based upon the ranking;

program codes for assigning channels for data transmission for the terminals that were selected, wherein assigning includes assigning a spatial multiplexing mode for data transmission for each terminals; and program codes for performing data transmission for the selected terminals.

\* \* \* \* \*

UNITED STATES PATENT AND TRADEMARK OFFICE
CERTIFICATE OF CORRECTION

PATENT NO. : 7,636,573 B2 Page 1 of 1
APPLICATION NO. : 11/332059
DATED : December 22, 2009
INVENTOR(S) : Walton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Twenty-first Day of December, 2010

David J. Kappos
*Director of the United States Patent and Trademark Office*